US012651281B2

(12) United States Patent
Khoury et al.

(10) Patent No.: US 12,651,281 B2
(45) Date of Patent: *Jun. 9, 2026

(54) SYSTEMS, DEVICES, AND METHODS FOR AUTONOMOUS COMMUNICATION GENERATION, DISTRIBUTION, AND MANAGEMENT OF ONLINE COMMUNICATIONS

(71) Applicant: SOCI, Inc., San Diego, CA (US)

(72) Inventors: Afif Khoury, San Diego, CA (US); Alo Sarv, San Diego, CA (US)

(73) Assignee: SOCi, Inc., San Diego, CA (US)

( * ) Notice: Subject to any disclaimer, the term of this patent is extended or adjusted under 35 U.S.C. 154(b) by 836 days.

This patent is subject to a terminal disclaimer.

(21) Appl. No.: 17/740,265

(22) Filed: May 9, 2022

(65) Prior Publication Data

US 2022/0405805 A1 Dec. 22, 2022

Related U.S. Application Data

(63) Continuation of application No. 17/105,984, filed on Nov. 27, 2020, now Pat. No. 11,544,744, which is a (Continued)

(51) Int. Cl.
*G06Q 30/0251* (2023.01)
*G06N 5/04* (2023.01)
(Continued)

(52) U.S. Cl.
CPC ........... *G06Q 30/0269* (2013.01); *G06N 5/04* (2013.01); *G06N 20/00* (2019.01); *G06Q 10/40* (2026.01);
(Continued)

(58) Field of Classification Search
CPC ........... G06Q 30/0269; G06Q 30/0264; G06Q 50/01; G06Q 30/0203; G06Q 30/0205;
(Continued)

(56) References Cited

U.S. PATENT DOCUMENTS 8,626,575 B1 1/2014 Gong
8,930,832 B2 * 1/2015 Greer .................... H04L 65/611
715/810

(Continued)

OTHER PUBLICATIONS

Flora Amato, Sos: A multimedia recommender System for Online Social networks, 2019 (Year: 2019).*

(Continued)

*Primary Examiner* — Tarek Elchanti
(74) *Attorney, Agent, or Firm* — James Scott Nolan

(57) ABSTRACT

This document describes the autonomous collection, generation, distribution, and management of online web content. The devices, systems, and methods described herein can be used to collect and generate online web content and communications in an automatic and autonomous manner. Specifically, the disclosed methods, devices, and systems may be employed to produce one or more communications and/or advertising campaigns, as well as for monitoring, managing, defining the efficiency, effectiveness, and workability of the campaign with respect to generating predicted user engagements, thereby accurately determining the cost benefits of the communication campaign. The system may track, evaluate, and provide analytic results that may then be used to better guide the system parameters for customizing autonomous communications directed one or more characteristics of a defined target audience.

17 Claims, 18 Drawing Sheets

Related U.S. Application Data continuation-in-part of application No. 16/986,193, filed on Aug. 5, 2020, now Pat. No. 11,379,883.

(60) Provisional application No. 62/941,680, filed on Nov. 27, 2019, provisional application No. 62/885,177, filed on Aug. 9, 2019.

(51) Int. Cl.

| | |
|---|---|
| *G06N 20/00* | (2019.01) |
| *G06Q 10/40* | (2026.01) |
| *G06Q 50/00* | (2024.01) |
| *H04L 67/12* | (2022.01) |

(52) U.S. Cl.
CPC .......... *G06Q 30/0264* (2013.01); *H04L 67/12* (2013.01)

(58) Field of Classification Search
CPC .......... G06Q 30/0211; G06Q 30/0246; G06Q 30/0249; G06Q 30/0254; G06Q 30/0267; G06Q 30/0272; G06Q 30/0276; G06Q 30/0277; G06Q 30/0282; G06Q 10/103; G06N 5/04; G06N 20/00; G06N 5/022; G06N 5/025; H04L 67/12
USPC .................. 705/14.61; 709/204, 245; 725/35
See application file for complete search history.

(56) References Cited

U.S. PATENT DOCUMENTS

| | | | |
|---|---|---|---|
| 9,420,121 | B2 | 8/2016 | Grosz et al. |
| 2008/0060003 | A1* | 3/2008 | Nocifera ................ G06Q 30/02 |
| | | | 725/35 |
| 2010/0036970 | A1* | 2/2010 | Sidi .......................... G06F 15/16 |
| | | | 709/245 |
| 2011/0093453 | A1 | 4/2011 | Frayman et al. |
| 2012/0130800 | A1 | 5/2012 | Pradeep et al. |
| 2013/0346172 | A1 | 12/2013 | Wu |
| 2014/0280556 | A1* | 9/2014 | Kazi ....................... H04L 51/52 |
| | | | 709/204 |
| 2015/0382068 | A1 | 12/2015 | Shimy |
| 2018/0012253 | A1* | 1/2018 | Gavlovski .......... G06Q 30/0251 |
| 2018/0189074 | A1* | 7/2018 | Kulkarni ................. G06F 9/451 |
| 2018/0374122 | A1* | 12/2018 | Greer .................. G06F 16/4393 |
| 2021/0058666 | A1 | 2/2021 | Kim et al. |
| 2024/0086975 | A1 | 3/2024 | Khoury et al. |

OTHER PUBLICATIONS

Gil, Alberto et al. Personalized multimedia touristic services for hybrid broadcast broadband mobile receivers, 211-219 (2010).

Haupt, Johannes et al. Robust identification of email tracking a machine learning approach, School of Business and Economics, Humboldt University of Berlin, 33 pages (2018).

Kardan, Ahman A. et al. Targeted advertisement in social networks using recommender system, IEEE, 13 pages 2013.

* cited by examiner

Compilation + Storage

Equips Bot with Location Specific Data

Bot Interacts with Multiple Location

Equips Bot with User Specific Data

New and Update Leads pushed back to CRM

CRM

Conversations taking place at the Local Level, specific to customer

SYSTEMS, DEVICES, AND METHODS FOR AUTONOMOUS COMMUNICATION GENERATION, DISTRIBUTION, AND MANAGEMENT OF ONLINE COMMUNICATIONS

CROSS REFERENCE TO RELATED APPLICATIONS

The present application is a continuation of U.S. patent application Ser. No. 17/105,984 filed Nov. 27, 2020, which claims priority from U.S. Provisional Patent Application No. 62/941,680, filed Nov. 27, 2019, entitled "Systems, Devices, and Methods for Generating, Distributing, and Managing Online Communications". U.S. patent application Ser. No. 17/105,984 filed Nov. 27, 2020 is a continuation-in-part of U.S. patent application Ser. No. 16/986,193 filed Aug. 5, 2020, which claims priority from U.S. Provisional Patent Application No. 62/941,680, filed Nov. 27, 2019, entitled "Systems, Devices, and Methods for Generating, Distributing, and Managing Online Communications" and U.S. Provisional Patent Application No. 62/885,177, filed Aug. 9, 2019, entitled "Systems, Devices, and Methods for Generating, Distributing, and Managing Online Communications", the disclosure of which is incorporated herein by reference in its entirety.

TECHNICAL FIELD

The subject matter described herein relates to the generating and distributing of online, e.g., web, content, autonomously and automatically.

BACKGROUND

Online content may include emails, websites, messages, blogs, articles, posts, images, animations, and all forms of social media content, as well as other forms of communication posted to internet pages. Such online content often contains information relevant to the commercial activities, social standing, reputation, and/or general interests of companies, organizations, their consumers, advertisers, and other internet influencers and users (herein collectively "Users"). It is, therefore, important for growing businesses to reach potential consumers by publishing online content. However, it is no longer enough to simply publish content on a social media platform. Today, brands need to engage with consumers in a meaningful way, and thus, are beginning to invest in promoting more personalized content to more efficiently reach their top-performing locations and audiences in order to drive reach, engagement, and revenue.

Particularly, with the decline of organic social reach and engagement, brands are investing in paid social to get in front of their most engaged audiences in a more meaningful manner so as to drive growth. However, there is a problem in that the national ad campaigns of brands are having difficulty reaching their local audiences in a meaningful way. With a majority of buying decisions happening online and at the local level, it's more important than ever for multi-location brands and agencies to reach local audiences with localized messaging if they want to effectively grow and scale, and appropriately manage their communications as they do so.

Even when adept at online communications, it is extremely difficult and cost prohibitive in terms of time and resources for large brands to individually manage hundreds or thousands of local ad accounts. As an example, if a medium sized brand having 15,000 locations desires to spend $300 in ad spend to generate and deploy individualized advertisements for each location, they would need to generate 15,000 individualized advertisements at a cost of 4.5 million, and if they wanted to run a new ad each month the cost would be 54 million. The sheer size and cost of such a venture is a practical problem in need of a solution. Designing and running such an advertising campaign is problematic for the most adept of brand managers, but for small business owners it is a herculean task.

In view of these difficulties, the digital advertising industry has become a huge industry that continues to grow. Particularly, in view of the decline of organic social reach and engagement, and in light of these absorbent costs, businesses are turning to a variety of social media modalities that have become an essential foundation for brands and businesses to drive growth through paid social media advertisements. However, it is simply not enough to publish content on various publisher's webpages, sellers of goods and services must now advertise on social media platforms, in a manner that is relevant to the diverse interests of their consumers, in their local markets, if they wish to remain competitive in the market place.

For these purposes, many social media platforms provide powerful management tools that allow brands to manage their media engagement. However, these tools are difficult to use, often requiring specially trained skill sets, and are costly to employ. Hence, such management tools for optimizing brand reach require paid professionals and large advertisement campaign budgets, and even then, the tools and their use can be overwhelming for a large amount of users. More importantly, many social media platforms do not offer localized ad solutions for multi-location brands and businesses, which produces a previously unrecognized problem in need of a solution.

Consequently, in adapting to this new online market place, today's brands have allocated large budgets for investing in targeted, paid social media advertising so as to more efficiently reach their top audiences and locations in order to drive reach, engagement, and revenue. More particularly, in one estimate, FACEBOOK® has generated $23 billion in U.S. ad revenue in 2018 (and $54.4 billion globally, an increase of 36.3% from 2017). GOOGLE® is projected to generate nearly $42 billion in U.S. advertising spend. Combined, the two companies are projected to account for about 57.7% of all money spent on digital advertising in 2018. Further, AMAZON® and other social media platforms, such as SNAPCHAT®, other tech companies, including APPLE® and MICROSOFT®, are exploring advertising. Streaming television services, including services like NETFLIX®, which hasn't relied on advertising, are predicted to jump into the game in 2019. All of these platforms, therefore, represent huge advertising possibilities for the sellers of goods and services by which to increase their reach and ability to meaningfully connect with potential consumers.

However, there are several further difficulties inherent to employing these platforms for performing advertising. For instance, one such difficulty is managing content across several different platforms. Specifically, it is difficult to generate consistent advertising across modalities, and with respect to all of the different local markets a given brand may service. More specifically, it is typical in the industry to employ several brand representatives whereby each representative is responsible for the messaging posted to a single social media platform, but because different team members manage different platforms, often times the messaging becomes inconsistent and sometimes contradictory.

Likewise, when a brand, such as a nationwide brand, is servicing a multiplicity of regions having a plurality of local markets, then a larger number of representatives are necessary to manage all of these different markets, and the problem of inconsistent messaging becomes exponentially more difficult. But even still, even with a large number of representatives, it is unlikely that they will be able to generate advertisements directed to each particular location servicing each particular geographic region and with respect to each social media modality. More specifically, it would be extremely cumbersome to log into each local social media modality of each specific location so as to generate and distribute a unique advertisement for each regional location, and each localized consumer therein, and this cannot be done by logging into a unitary interface at the corporate and/or local level. Particularly, given the fact that many national brands have hundreds to thousands of offices, or franchises, spread out over the entire nation, and even globally, there is a tension between the centralized national objectives of the organization, as a whole, and the objectives of each local franchise.

For instance, the home office may be concerned with increasing reach and driving overall sales, whereas each local office may be concerned with establishing more substantial connections to their local communities, and because of this the messaging to be advanced by the central office, especially with respect to sales, may at times be diametrically opposed to the messaging sought to be advanced by one of the dispersed local offices. However, it is a practical impossibility for a brand to effectively control the messaging of the entire organization, so as to meet the demands of the central office, while at the same time as meeting the particular needs of each individual local office.

For example, major brands typically don't have a problem setting up and deploying a nationwide advertisement campaign. What is problematic, however, is determining how to deploy hundreds to thousands of unique locally focused advertisements at a reasonable cost. In such instances, even spending \$100-\$200 per advertisement can amount to hundreds of thousands of dollars of advertising spend, such as where the brand has a thousand or more locations servicing a thousand or more local communities. This becomes even more expensive when the corporate brand, e.g., promoter of the sales of goods or services, desires to send out new and individualized advertisements on a monthly basis. Accordingly, it is expensive to generate such advertising, and even more so when such advertising needs to be generated manually and particularized to each local market. In fact, to do so is so labor intensive as to be cost prohibitive.

Specifically, the cost of generating advertising that is relevant to each local market, and consistent across platforms, would be so expensive that any revenues generated thereby would simply not justify the spend. To help minimize costs corporate brands attempt to employ software to create and promote advertisements, but typically, they only use a single account, e.g., the corporate account, to conduct messaging nationwide. In such instances, the messaging is not catered to any given particular location. Rather, the advertisements they create are deployed at the nation-wide, e.g., group level. In such instances, corporate franchises and local offices may be granted access to the corporate account, and may be instructed to follow corporate advertising guidelines so as to promote consistency in messaging. However, these decentralized franchises often times cater the corporate messaging to their particular localities and in doing so the messaging becomes inconsistent and can often times be contradictory, especially, when the advertisements are promoted at the group level, but are paid for at the local level.

An additional problem is that such a multi-social media advertising regime may in some form be employed by the bigger consumer brands, but for the large majority of sellers, the complexity and expense of generating and distributing online advertising is so great as to limit their access to the online market place, and thus, poses a substantial barrier to market entry, thereby, reducing their competitiveness and overall competition. Particularly, local business owners simply cannot handle devising and running a comprehensive advertising campaign, such as with regard to creating an audience, writing copy, building a creative, e.g., an advertisement, setting up a targeted distribution regime, and determining results, especially where each of these steps is performed individually and manually. Specifically, what they desire is an automated system, whereby they can set their budget, and have each of the forgoing steps happen automatically and/or autonomously.

What is needed, therefore, and provided herein is a platform by which the above referenced problems may be resolved, and namely, solves the problems that nationwide and local sellers face when managing advertisement budgets for multiple locations, and for empowering decentralized locations to more easily cater and promote advertisements set up by their centralized corporate offices or agencies. Particularly, the present technologies are directed to solving the gap in message management across social media platforms so as to make it possible and easy for multi-location brands and their agencies to create dynamic localized ads, store, and share ad creative across teams, and instantly promote localized ads to hundreds or thousands of locations or local social media pages and/or other interfaces.

Accordingly, what is needed is an intuitive, easy to use platform for advertisement generation and deployment across social media modalities and throughout the various divisions of global brands. Hence, provided herein is an advertisement generation platform that includes unique templated and containerized configurations for specialized advertisement generation that can be catered to local markets, but scalable globally. In various iterations, the platform may be implemented in association with a robust artificial intelligence module that is adapted for executing an automated process for dynamic and automatic advertisement generation and distribution. In particular instances, the presented platform functions to ensure message consistency, vastly increasing reach across social media modalities, while reducing production cost, thereby allowing a greater portion of advertising spend to be allocated to increasing reach and lift while reducing production costs.

SUMMARY

As set forth above, there exist a pernicious problem faced by nationwide brands attempting to reach potential consumers. Particularly, decisions to purchase goods and services are made locally. Hence, even for megalithic worldwide brands, their consuming audience is local. For instance, from browsing an online offering, clicking on a company's website or walking into the local store, buying decisions typically happen at a local level. However, despite this unrecognized fact, national ad campaigns are not reaching local audiences with local messaging. Further, given the complexity of generating and running an advertisement campaign across a variety of social media platforms, many small independent goods and service sellers are simply not capable of effectively competing with major brands in local markets.

The present technology recognizes that local messaging can prove to be more effective at driving demand, leading to greater sales, higher prices, and better advertising results. But current agency practice cannot manage the tens to hundreds or thousands of local ad accounts, as it would be too labor and cost prohibitive. For example, it is simply too costly even for most major brands to deploy even $100 per location, such as where there are 15,000 locations such as on a monthly basis, let alone local business owners who simply cannot generate and run an advertising campaign for themselves.

Particularly, the vast majority of small, and even big business owners, do not have the technical expertise required for generating ad creatives, creating audiences, setting up a targeted distribution methodology, writing copy, and/or determining results manually. Accordingly, what is needed is an intuitive, automated system that is capable of autonomous communication, e.g., advertisement, campaign generation, workflow implementation, and maintenance, especially with respect to the generation of media rich advertisements and the running and evaluating of an advertisement campaign form a centralized and/or decentralized platform.

This disclosure, therefore, includes implementations of methods, apparatuses, systems, and computer program products related to facilitating the evaluation, generation, and distribution of web content, such as for the implementation of an advertisement campaign. Particularly, this disclosure is directed to implementations of apparatuses, systems, their methods of use, and computer program products related to generating online content, facilitating its efficient distribution, the tracking, monitoring, and evaluating of its effectiveness, which may be performed manually or autonomously by the system itself and its components. More particularly, provided herein is a communications platform that includes a dashboard interface that may be presented to a client computing device, such as over a network connection, whereby a user of the platform may generate, or at least participate in the generation of, a communications campaign.

Specifically, the system may include a plurality of modules of computing elements arranged as individual sets of processing engines that are configured for performing the various methods of the present disclosure. Such methods may include one or more of tracking, reviewing, reputation monitoring and protecting, and responding to various communication engagements. In such instances, not only may content be evaluated, such as for use in communication generation, but in certain implementations, communication recipients may also be evaluated, such as for determining and generating particularized attention and communications to be transmitted to the communication recipient. Hence, the methodologies presented herein, as well as the articles provided for the implementation of such methodologies may further include manual or autonomous communication generation, evaluation of communication engagement as well as auto-responding thereto, including content and persona scoring, which may further include predictive analyses, and may additionally include both content recommendation and communication direction and funneling. Further, in various embodiments, these methodologies may be implemented by one or more smart bot communication engines. Likewise, the system may provide for determining an ideal time for communication distribution, such as based on the person being messaged, the platform upon which the messaging is to be communicated, and the content of the message itself. Furthermore, an approval module may also be provided so as to allow a system user to approve or disapprove, and/or to edit, communications prior to its distribution, and a conflicts engine may provide additional review prior to posting.

The methods disclosed herein and the apparatuses for performing the disclosed methods, therefore, may include the scoring of such web content, the reporting of the same, as wells the assessment and maintenance of the online presence of web-based content providers, such as commercial entities, publishers, advertisers, market influencers, and other interested third parties. Some of the advantages of such a platform is that it solves many of the gaps that presently plague sellers and advertisers in the market place, thereby making it easier for non-sophisticated sellers to implement a comprehensive advertising campaign as well as an advertising regime that services a variety of locations so as to drive growth and reach.

Specifically, the present platform simplifies local social advertising for multi-location brands and agencies. More specifically, the present technologies solve the problem of manually employing a social media platform for deploying a large number of communications across a wide variety of locations while not requiring specialized training and without being cost prohibitive, e.g., minimizing the cost per ad spend per location across all locations, such as from tens to thousands of locations. Consequently, employing the present platform, national and local business owners and/or marketing teams can efficiently manage their social media accounts, e.g., FACEBOOK®, TWITTER®, INSTAGRAM®, TIKTOK®, and other social media ad campaigns across hundreds or thousands of local business pages, while staying on-brand. By using the platform to invest in their growth, brands can more easily get in front of their local audiences with relevant and timely ads that cater to their local business objectives. A unique feature of the platform is an intuitive generating, distributing, tracking, and reporting dashboard, as well as a series of automatic and/or autonomous communication generation engines that allows a user and/or the system itself to generate, deploy, and regulate ad spend and performance at the national, regional, and local levels so as to gain key insights, develop, and elevate advertising strategies.

Particularly, such growth may be advanced by the devices and systems disclosed herein as well as by their methods of use, which provide for the manual and/or semi- and/or autonomous generation and distribution of highly individualized communications and advertisements to specifically targeted recipients so as to reach local consumers with advertisements that are catered to them individually. More particularly, the use of automated content generators as well as the template based communication architecture allows for ad creatives to be both shared across an organization, but also customized so as to be highly relevant to each local market, to each particular recipient, and to each specific communication, e.g., social media, platform, which allows for both consistency in messaging but also individualization across the marketplace, without causing duplication and/or conflict in messaging, thereby meeting the needs of both national and local business representatives of an organization.

Likewise, in this manner, communication spend can be amplified and spread over a greater proportion of the company, while at the same time being more specifically tailored to each location's and/or recipient consumer's particular social environments. Further, because of the layered and containerized manner by which the advertisement architectures are distributed, the system is configured to both generate and broadcast advertisements dynamically, on the fly, and substantially real-time, which advertisements may be distributed to hundreds and thousands or even hundreds of thousands or more of recipients, such as simultaneously, and can be easily editable and updated in a one to many context.

Accordingly, in one aspect, provided herein is a system for executing an advertisement generation pipeline for generating an advertisement from one or more media elements, such as a template and a media component, for instance, where the media components include a text component and/or an image component. For example, the present system may be configured for collecting media elements, which media elements once collected may then be scored and stored in a memory, such as a media repository, which in various embodiments, may be a structured library. Hence, the system may include a memory that is configured for storing the plurality of media elements including a collection of media templates and a collection of media components, such as where the media components include a text and/or an image component, which may be integrated together to form the advertisement, such as by the processes of a computing device, for example, implemented by a central processing unit, graphics processing unit, and/or a server including one or more of the same.

For instance, the system and devices herein described may be configured for producing and implementing a dynamic text and/or imaging protocol, such as for employing dynamic text and images, including stills and video, for the generation and distribution of advertisements. In such an instance, the content collected, e.g., texts and images, can be general in nature, such as collected from an organization's corporate webpages, e.g., generic corporate content, and/or may be localized content, such as collected from a local company's webpage, or from a social media, or other modality's website, where content of interest may be collected. In this manner, communications such as advertisements may be generated from scratch. In other instances, the communications may be generated by, or at least assisted, by the automated systems provided herein.

Particularly, such communication generation may be implemented as an automated process for creating a variety of unique, global advertisements where each ad has a local look and feel, such as where the advertisement is generated automatically and/or autonomously, e.g., at one time by the system, and thus, has a global appearance, but where each advertisement includes individual and unique text and/or images that gives each ad a unique local look, without having to make hundreds or thousands of iterations. For instance, in various embodiments, the advertisement may be generated from a collection of layers having a variety of containers therein, whereby one container can be a universal container that is adapted such that a change to the content of the universal container gets propagated to one or more subservient containers, such as substantially simultaneously.

In a manner such as this, a corporate brand can create, promote, and distribute advertisements to and from all of its locations, such as by using one, centralized global account, such as at the group level, where the advertising spend is paid for at the group level. Likewise, a plurality of localized accounts may be employed, such as at the local franchisee level, for instance, where the franchisee is granted access to the brand's ad accounts and follows their advertisement guidelines set by the brand to create and promote ads for their independent locations. These de-centralized franchises promote ads at the group level and may pay for them at the location level. In either of these instances, the content across the brand can be controlled such as in a cascading manner whereby changes made to universal templates get automatically made to all associated local templates.

The system, therefore, may include a CPU, GPU, or the like, which have a memory interface configured to access the memory, and further includes a set of processing engines, where each processing engine is configured to perform one or more steps in a content collection and advertisement generation, evaluation, and/or distribution pipeline, such as on the collected and/or scored media elements. For instance, the set of processing engines may be configured as one or more processing modules, such as a data collection module, a media component evaluation module, a communication generation module, and the like. Particularly, the system may include a data collection and/or evaluation, and/or recommendation module configured for collecting the media elements including the plurality of media components, such as where the plurality of media components include one or more of a text element, an image element, and/or metadata pertaining to the media elements and/or the websites and webpages from where the media elements were collected, can evaluate them, score them, and/or recommend their use in the generation of new communications.

Hence, the system may include a media element evaluation module that is configured for evaluating, e.g., scoring, the plurality of media elements, e.g., media components, where the evaluation is based on one or more metric data so as to produce scored media elements. The media evaluation module may also be configured for transmitting the scored media elements, e.g., components, to the memory for storage thereby. Additionally, an advertisement generation module may be included, such as where the advertisement generation module is configured for accessing the memory and selecting both a media template and a media component for integration within the media component. In various embodiments, the integration may be performed by an integration module. In such an instance, the advertisement generation and/or integration module may include one or more of a project dashboard, an advertisement builder, a compiler, a formatter, and a distributor.

For instance, the advertisement generation module may include a server for constructing a project dashboard that is configured for producing a graphical user interface that may be presented at a display of a client computing device of a system user, such as a system at an advertiser or company seeking to generate and distribute advertisements. In such an instance, the project dashboard may include controls for allowing the user to view and select the media template and the media component for integration therewith. An advertisement builder for accessing the memory and building the advertisement may also be included, such as based on the media template and media component selected by the user, or by the system itself. In such an instance, the communications builder may include one or more autonomous communications generation engines, which may be configured as one or more smart chat bots for autonomous communication generation.

The communication generation module may further include a compiler for integrating the selected media component into the selected media template so as to generate the advertisement, and may include a formatter for formatting the advertisement for display at a graphical user interface of either or both of a stationary and a mobile computing device. The system may additionally include a distributor, e.g., a distribution program, configured for distributing and/or broadcasting the formatted advertisement to one or more of social media modalities in a format capable of being viewed by a user in one or more formats, en masse without being subjected to filtering. The system may also include an advertisement evaluation module for evaluating the effectiveness of the distributed advertisement.

Accordingly, an advantage of the present system is that it allows for the global administration and/or generation of advertisements, while at the same time providing for local contexts, looks, and feels. Particularly, presented herein is a powerful communication generation platform for manually and/or autonomously generating and distributing advertisements both locally and globally. More particularly, the present system allows a single user, or the system itself, to create and deploy communications, e.g., advertisements, across a wide variety of social media modalities and amongst a large number of social media accounts with customized language and images, e.g., with just a few clicks of a button.

For instance, using the template, layered, and/or containerized system, a global company can generate advertisements to be deployed at global scale but with a local contexts, and then can distribute the advertisements to targeted, well characterized recipients via a large number of social media pages, all from a single interface and/or being deployed by one or more smart chat bots. Likewise, using the devices, systems, and methods disclosed herein, communications and advertisements cannot only be generated and deployed, e.g., autonomously and on the fly, but given the layered and containerized nature of the building, the distributed advertisements can also be edited and updated real time and on the fly. In a manner such as this, national advertisement campaigns can be uniquely catered to reach local audiences, e.g., with local messaging, which messaging has been shown to drive higher sales rates.

Provided herein, therefore, is a device, a system, and a method of their use for generating and distributing advertisements, such as social ads, real-time, and on the fly, in a manner to reflect both national corporate as well as localized business interests. Specifically, the social advertisement platforms disclosed herein provide the ability for a single, or multiple users, e.g., from a common interface, to promote a business through one or more social networks. Such social media modalities are important because they provide one of the quickest and most effective ways to specifically target a large number of consumers who use social media modalities as their primary interface with others. Particularly, advertising represents a massive part of the economic market whereby companies allocate ever increasing budgets to the implementation of advertising campaigns.

However, such advertising is typically performed through an external advertising exchange involving a bidding process, whereby content providers dictate the bidding process. The present systems and processes described herein, on the other hand, put communicating and/or advertising directly back in the hands of the producers and sellers of goods and services, as well as their advertisers, by providing them a platform that allows them to generate and distribute advertisements directly to consumers without having to go through an advertisement exchange and/or bidding process. While suitable for use in conjunction with a typical advertisement exchange system, in various embodiments, the present advertisement generation and distribution system may be employed so as to transmit advertisement directly to end users via a social media platform. However, in various other embodiments, the system may be used to submit generated advertisement to an advertisement exchange, such as where having recourse to the structured libraries of media components described herein, the advertisements may be generated on the fly and catered to the direct needs of the advertisement bid requests of an advertisement exchange.

Provided herein, therefore, is a system that includes one or more client computing devices that are configured for communicating over a suitably configured internet network connection to one or more servers, whereby a graphical user interface showing a dashboard may be presented at the client computing device for the configuring of an advertisement campaign and/or for the generation of an advertisement and/or one or more elements to be included therein. Specifically, in one aspect, provided herein is an apparatus for executing an advertisement generation pipeline for generating an advertisement from one or more collected and scored media elements. For instance, a system may be provided wherein the system includes an apparatus, such as a server that may be associated with a memory, such as a structured library of a database, which is configured for storing the collected and/or otherwise generated media elements, such as a media template and a media component. In various instances, metadata related to the collected content and/or the process of collecting it, as well as data pertaining to the websites and webpages from which the data is collected may also be retrieved and stored in the memory.

Particularly, the apparatus may include one or more central or graphics processing unit (CPU or GPU), such as a server containing the same. For example, a CPU or GPU may be provided where the CPU or GPU is configured for collecting and scoring the media components, which are to be stored in the memory, e.g., either an onboard or off board memory. Further, the CPU and/or GPU may be configured for employing one or more of the stored media components in generating the advertisement, such as where the CPU or GPU includes a set of set of processing engines.

More particularly, the set of processing engines may include a first processing engine that is configured for collecting a plurality of media components, such as a plurality of media components that include one or more of a text element, an image element, an animation element, a carousel element, a video element, and the like. A second processing engine may also be included whereby the processing engine is configured for evaluating the plurality of media components so as to produce scored media components, such as scored with respect to their ability to effectuate a given outcome, such as increased user, e.g., consumer, approval and engagement, increased user activity, increased lift, increased impressions, conversions, views, likes, upvotes, posts, reposts, forwards, and the like. A third processing engine may be included and be configured for generating and/or selecting a template and a scored media component, and/or for integrating the scored media component into the template so as to generate the advertisement. A fourth processing engine may be provided for formatting the advertisement, such as for display at a graphical user interface, such as at either, or both, of a stationary and/or a mobile computing device. Likewise, a fifth processing engine may also be provided for distributing and/or broadcasting the formatted advertisement, such as to a plurality of social media modalities and/or an advertisement exchange server, in a format capable of being viewed by a user at a third party client computing device. Additionally, a sixth processing engine may be provided for tracking and/or evaluating the effect the advertisement has on the consumer after the user is exposed to the advertisement. A seventh processing engine may also be provided for scoring and/or recommending content for use in generating further advertisements based on content scoring with respect to its success in a given environment and over a large variety of locations.

Further, in particular embodiments, additional processing engines may be provided where at least one of the processing engines is configured for generating a project dashboard that is adapted for presenting a graphical user interface, such as at a display of a client computing device. Specifically, in various embodiments, the project dashboard may include one or more controls for allowing the consumer to view and select the media template and the media component for integration therewith. In specific embodiments, the project dashboard is configured for allowing the user to select an objective, a budget, a target audience, and/or a geographical distance within which the advertisement is to be distributed.

Accordingly, provided herein is a simple to use, intuitive user interface that simplifies the process of generating and launching an advertisement down to just a few clicks of a button, making the process swift and comprehensive. Hence, presented herein is a dashboard, generated at a graphical user interface, that is useful for configuring, administrating, approving and managing advertisement campaigns on both a national and local level, such as with regard to dynamic advertisement content generation and incorporation into an advertisement, audience and location targeting, and for providing the tracking and evaluating effectiveness. One or more notifications or suggestions may also be provided as a result of one or more analyses being performed on any of the collected data.

In various embodiments, the system and/or an apparatus thereof may include an artificial intelligence module that may be associated with one or more of the modules, servers, CPUs/GPUs, processing engines, and the like, disclosed herein. For instance, the system may include a structured database and an artificial intelligence (AI) module, e.g., associated with the data collection, media element evaluation module, advertisement generation module, and/or advertisement evaluation module, such as for implementing one or more processes disclosed herein, such as for implementing a data collecting, evaluating, scoring, and/or generation protocol for collecting, generating, evaluating, and scoring the various media components and their use in advertisements. In particular embodiments, the AI module may be associated with machine learning module as well as an inference engine module for evaluating content and making one or more predictions of the ability of a generated communication to achieve a determined goal. In more particular embodiments, the AI module may be coupled to an advertisement integration module, and may be configured for selecting and/or suggesting the template, content, and the media component class for generating the advertisement, such as where the selecting and/or suggesting is based on results of the scoring. Likewise, in various embodiments, the AI module may be configured for generating, or at least assisting in the generating, and distributing, of the advertisement, which may be generated and distributed automatically and/or autonomously at real time and on the fly upon the occurrence of a triggering event.

Additionally, in another aspect, provided herein is a multimedia communication platform for administering an advertisement campaign, such as where the multimedia communication platform includes a memory, a server, and a client computing device which may be coupled one to another via an internet network connection. For instance, the memory may be a structured memory having one or more libraries that are configured for storing a plurality of scored media elements, based on one or more identifiable and/or searchable features, which media elements may include a media template, and a media component, a media class, such as an image, a media rich image, an animation, a video, and the like, where one or more of the media templates and the media components may be classified and/or stored in accordance with one or more categories, tags, and/or may include a score. Further, the server may have a communications module that includes a network internet connection to communicate with the memory, and may include one or more engines.

For example, the server may include a data collection engine for obtaining and extracting data from a web page. In such an instance, the data collected may include a plurality of media components, such as a text element and an image or video element that may be used as an advertising component of the system. In various instances, the data collection engine may further be configured for collecting metadata, such as metadata pertaining to one or more of the webpage from which the data was collected and metadata pertaining to the collected data itself. The server may also include a media component evaluation engine that is configured for evaluating the plurality of media components, such as based on metric data so as to produce scored media components, and for transmitting the scored media components to the memory for storage thereby.

As indicated, the server and/or client computing device may be coupled to a memory and/or other client computing device via the network internet connection. The client computing device may be configured for generating and/or for selecting the components for generating an advertisement, such as from one or more of the collected and scored media components. The server and/or client computing device may receive and/or include a project dashboard that is configured for presenting a graphical user interface at a display of the computing device, such as where the project dashboard includes controls for allowing a user to view and select a media template and a media component for integration therewith. Additionally, the server and/or client computing device may include or otherwise be associated with an advertisement builder for accessing the memory and building the advertisement based on the selected media template and media component.

Further, the server and/or client computing device may include an advertisement generation engine that is configured for retrieving content, transforming that content into a content class, such as in a text, image, animation, video, or other media rich class, integrating the selected media component, e.g., with respect to the advertisement class, into the selected template so as to thereby generate the advertisement and for transmitting the generated advertisement to a recipient and/or to the memory for storage thereby. In such an instance, the server may include a distribution engine, for retrieving the generated advertisement from the memory and distributing the advertisement to a plurality of social media modalities, such as in a form suitable for being presented for display thereby to a user of the system.

Accordingly, in another aspect, a multimedia communication method is provided. The method may include providing, such as from a computing device and/or server computer, via an Internet network connection, an input screen to a graphical user interface of a display of a client computing device that is coupled to the server computer via the Internet. In various instances, the input screen presents a collection of content, media templates, a collection of media components, and/or media rich classes to a user, e.g., an advertiser seeking to build an advertisement, whereby the user may engage with one or more controls provided thereby so as to select one or more of a media content, template, a media component, and/or a media rich class, such as where the media component may include one or more dynamic text elements and one or more dynamic image or other media rich elements. For instance, in particular instances, the text and image elements may be presented in ranked order, such as where the order is determined by a score representing the effectiveness of the media component.

Accordingly, the method may further include receiving, at the server computer, or other computing device, e.g., via the input screen of the graphical user interface and via the Internet, a user selection for the content, the template, a media component, and/or a media rich class, such as where these components, e.g., template and media components, are accessible on the graphical user interface on a display associated with the server and/or client computer. In various embodiments, one or more of these elements may be presented via the dashboard interface as a suggestion made by the system for use in generating a communication, e.g., upon approval by the communication generator. Additionally, the method may include forming the media components into the appropriate class type and/or compiling, by the server or other computer, the selected template and selected media components to generate an online advertisement in the appropriate class, such as where the advertisement may include a plurality of slides defined by one or more of a grouping of design layers, design elements, and content containers. Further, the method may include formatting, by the server computer, or other computing device, the online advertisement according to a selected media rich class and in an electronic distribution format specified on the graphical user interface. In various embodiments, the electronic distribution and/or broadcasting format may be selectable from a set of options of an electronic mail, a web page, a post, a banner, an electronic brochure, a text ad, a mobile ad, an in-stream ad, an in-video ad, an animated video file, an expandable video file, and an animated file for display on a computer, and the like.

Furthermore, the method may include distributing the generated advertisement to a social media modality, such as at a determined ideal time, an advertisement system server, or publishing server for publishing thereby. Additionally, the method may include presenting a communication, or a portion thereof, for review and approval by a system operator. Further still, the multimedia communication method may include evaluating, by the server or other computer, the collection of media components, and storing the plurality of media components based on metric data so as to produce scored media components to produce scored media components, and for transmitting the scored media components to the memory for categorization, scoring, and/or storage thereby.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF THE DRAWINGS

These and other aspects will now be described in detail with reference to the following drawings.

DETAILED DESCRIPTION

Figure 1A:
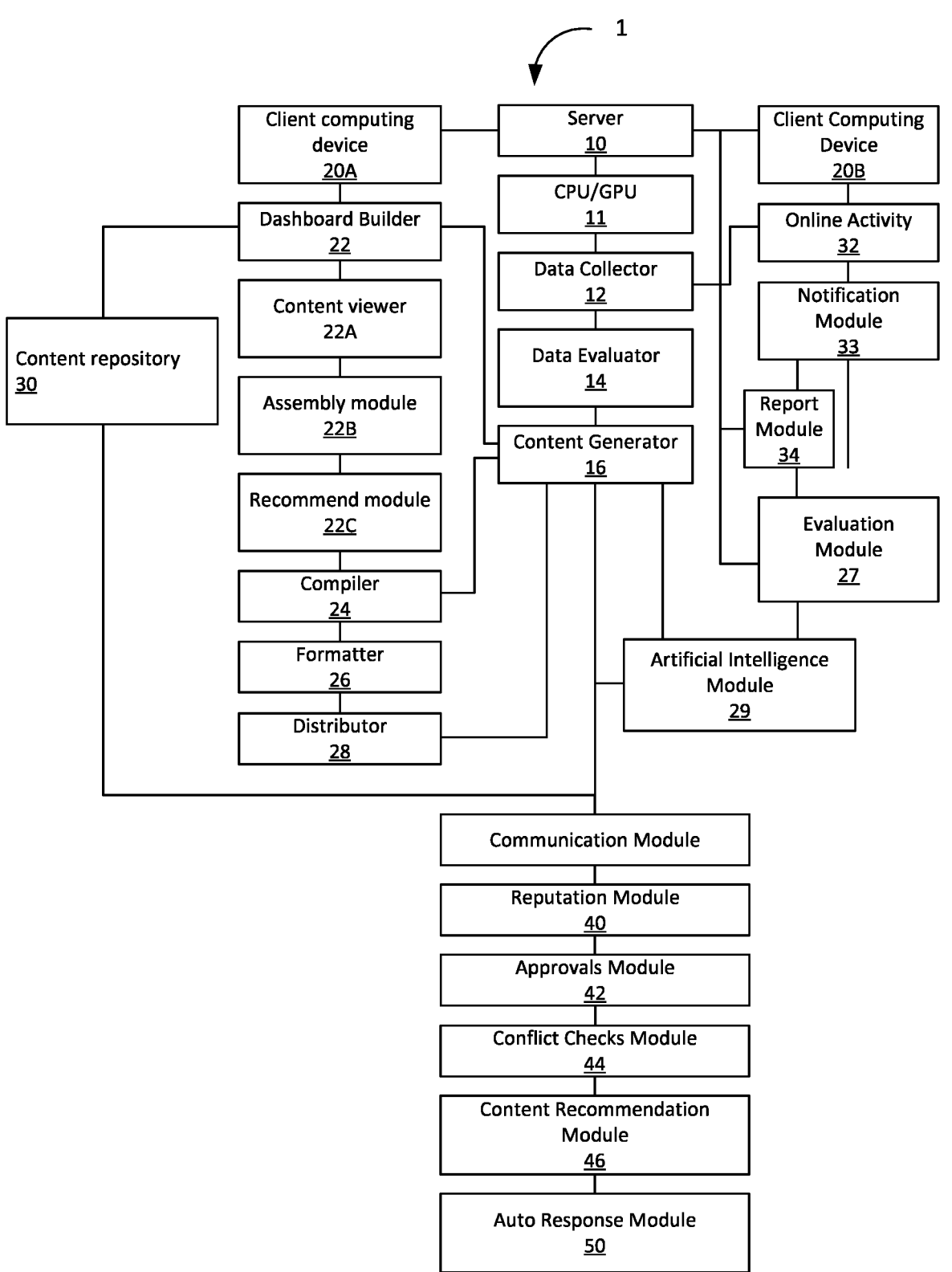
FIG. 1A is a diagram illustrating a first iteration of a system for generating an online communication.

This document describes the generating, evaluating, scoring, distributing, tracking, monitoring, and/or management of online web communications. The devices, systems, and methods described herein can be used to collect, evaluate, score, and generate online web content and communications, for example, advertising, personal or business webpages, blogs, social media posts, etc., as well as evaluating and/or scoring those who engage with such communications. In various instances, the collected content can be transformed from one content type to another, such as from a text-based content to an image and/or animation, and/or video content classification, and in other instances, the collected content can be used to generate new communications. Particularly, the system provides a platform for generating, evaluating, reviewing, and distributing communications, as well as for tracking, monitoring, scoring, and predicting the outcome of such communications as well as the persons who receive and/or engage with the distributed communications. In various embodiments, the system further provides for the autonomous recommendation and/or generation of the communications to be transmitted.

Accordingly, the subject matter described herein can be utilized by commercial entities, corporations and companies, service providers, advertisers, publishers, market influencers, and/or other suppliers of web content to produce one or more marketing and/or advertising campaigns. Particularly, the system provides a platform by which transmitted communications can be monitored, e.g., social listening, and managed, and can be used in defining the efficiency, effectiveness, and workability of a communication campaign with respect to generating user engagement or other objective, thereby accurately determining the cost benefits of the campaign. Further, the system includes an analytics module that may be utilized in providing guidance for the generation of original web content, such as for the purposes of enhancing customer or follower experience, driving or funneling business communications, and for customizing advertising campaigns. Additionally, web content that is in the public domain, and determined to perform well, can be reproduced, referenced, or otherwise referred to, in the context of promoting or presenting the user's web content.

In view of the above, in various embodiments, the devices, systems, and their methods of use, as described herein, are beneficial for independent, sole-proprietors, as well as for multi-location brands, and their agencies, for generating and distributing media content, such as advertisements, which may be deployed on a multiplicity of social media modalities so as to service both local and nationwide localities. Particularly, provided herein are devices, systems, and their methods of use for autonomously and/or dynamically generating advertisements, in certain instances, automatically. More particularly, the system provided herein can include one or more processing modules for running a communications campaign, including the generating, tracking, and reviewing of communications, as well as monitoring the effects of those communications on communication recipients. In certain embodiments, a content and/or persona scoring module may also be included. Additionally, an analytics module may be provided for predicting the results of such communications prior to or after distribution.

In the manners disclosed herein, a single communication may be created in a manner to include one or more media elements, such as a template and one or more media components. A unique feature of this dynamically templated methodology is that the template may be formed of various layers that may include one or more container elements such that once the advertisement template has been created, various of the different media components, e.g., dynamic text and/or images, can be removed from and/or exchanged for other media components within the containers of the layered template, and may be converted from one media rich type to another. In various embodiments, the template is comprised of coding that is configured for calling one or more media components into one or more of its containers of one or more layers of the template and/or for changing the form of the media content component, such as from a graphic to an animation, an animation to a video, and the like.

Further, as described herein below, the media elements and components thereof, such as the communications template and media component, may include content that is collected and/or scored from the internet, or it may be generated by the system. For instance, collected media components may include one or more of a text element and an image element, where the image element may include a digital photograph, a carousel element, a video element, a graphic, an animation, and the like. In such a manner as this, a communication, e.g., an advertisement, may be generated so as to be easily edited, updated, or otherwise changed, e.g., dynamically and/or on the fly, such as for use across a variety of geographically disperse locations, on a variety of different social media platforms, and/or to achieve multiple objectives per advertisement structure.

Specifically, the communications, e.g., generated communications, of the disclosure may be composed of one or more templates that include one or more layers having one or more containers that include media components, such as dynamic text and images, and are therefore easily editable and capable of mass deployment. For instance, the main body of a templated advertisement may be composed of text copy, there may be a headline, and one or more URLs may be included, such as a website URL, e.g., for a landing page, or a display link, such as including URL text that may be displayed in a shortened or reformatted manner. A link description including supporting copy may also be included and displayed, e.g., under headline. Accordingly, the present devices, systems, and their methods of use may include the retrieving, evaluating, scoring, and storing of content, such as online content, that has been collected for possible use as a media element or component in the generation of a communication, such as an advertisement. Hence, using the systems and methods herein, a multiplicity of different advertisements, in a variety of media rich content types, may be generated and/or deployed using the same media elements, e.g., from the same or similar templates, containers, design layers, and the like, as described herein below.

Accordingly, as can be seen with respect to FIG. 1A, in one aspect, provided herein is system 1 including a collection of apparatuses for executing a communication generation pipeline for generating a communication, e.g., an advertisement, from one or more collected and/or scored media elements. The system 1 may include a computing apparatus, such as a server 10, having a processing unit, such as one or more central and/or graphics processing units (CPU or GPU) 11, and may include an onboard memory or repository 30, or at least a memory interface for coupling to an external memory. Particularly, in various embodiments, the computing apparatus 10 may include or otherwise be associated with a memory 30, such as a structured memory or library, which is configured for storing media elements, such as including one or more of a media template, a media component, and/or one or more layers and/or slides, such as a slide defined by one or more of a grouping of design layers, design elements, and content containers.

The one or more central or graphics processing units (CPU or GPU) 11 are configured for searching, evaluating, collecting, manipulating the form of, and/or scoring, media components, e.g., texts, images, videos, and the like, which may be stored in the memory 30, such as in a ranked order based on a determined scoring. In various implementations, the CPU and/or GPU 11 may be utilized for accessing the memory 30, selecting, and employing one or more of the stored media elements, e.g., communication components, in generating the communication. In one embodiment, the one or more CPUs and/or GPUs 11 may be implemented as one or more cores within a server 10. However, in other embodiments, the CPU and/or GPU may be implemented, at least in part, by a client computing device 20.

Specifically, as can be seen with respect to FIG. 1A, in one aspect, presented herein is a system 1 for executing an communication generation pipeline for generating a communication, e.g., an advertisement, such as from one or more collected and/or scored media elements. For instance, the system may include a memory, such as a content repository 30, that is configured for storing a plurality of content items and/or media elements, such as where the media elements include a media template and/or a media component, such as a text component and/or an image element, such as one or more images, or a carousel element, a video element, and the like.

Additionally, the system 1 may include a central or graphics processing unit or server 10 having a memory interface to access the memory 30 and, which may include a set of processing engines, where each processing engine may be configured to perform at least one step in an communication generation pipeline, such as on the collected and/or generated communication and/or media elements. In such an instance, the computing system 10 may include a set of processing engines that include a data collection module 12, for collecting media elements such as media components, and/or may include a media component evaluation module 14 that is configured for evaluating the collected media components, such as where the plurality of media components include one or more of text elements and image elements.

In various instances, the data collection module 12 may include one or more collection processing engines 16 that are configured for collecting data from one or more web pages of a website and/or for generating communication content out of the collected content. Specifically, one or more sets of processing engines may be included and configured for generating one or more content items, sentiments, and/or communications. For instance, in certain instances, one or more, graphics processing engines may be provided whereby one or more media content components may be generated, such as ab initio or from a collection of retrieved content, and/or may be converted from one media type to a media rich content types, such as for converting texts to images, animations, graphics, videos, and vice versa.

Such data collection may be performed by a plurality of processing modules, such as in implementing a parallel and/or serial processing regime. Accordingly, the system may be configured for collecting preliminary and/or finalized versions of advertisements, across accounts, batching them, and distributing them, e.g., in batches, or distributing them individually, such as item by item, recipient by recipient, and the like, such as via one or more social media platforms. However, a social media platform may set limits on what can be posted based on the ad account level and/or the distribution requirements upon which the communication is to be distributed. Nevertheless, the present system 1 can be configured for overcoming various of such limitations. For example, the system may be configured for allowing a multiplicity of accounts to be managed at a single dashboard interface 22, all at one time. Once distributed the results of the transmission can then be collected and evaluated, e.g., by a communication evaluation module 27, with respect to one or more factors, such as with regard to effectiveness of obtaining one or more defined objectives.

Consequently, in one aspect, provided herein is a multimedia communication platform 1 for administering an advertisement campaign, such as where the multimedia communication platform includes one or more computing devices, such as a server 10 having one or more CPU and/or GPU cores 11, and/or one or more client computing devices 20, where the one or more computing devices may be coupled to one or more memories 30, via a suitably configured network internet connection. For instance, the multimedia communication platform may include a server 10, such as a server having a set of processing engines 12 that are configured for extracting and obtaining data from one or more web pages.

Particularly, the CPU and/or GPU 11 may be configured to include a set of data collection engines 12. For example, the processing unit may include a first processing engine that is configured for collecting a plurality of media elements, such as media components. A processing engine may optionally be provided for converting a media component from one type to another such as from a text to an image, an image to a graphic, a graphic to an animation, an animation to a video, and likewise in the opposite direction, e.g., a video to an image and/or text, and the like. A second processing engine 14 may also be provided such as where the processing engine is configured for evaluating the collected media components so as to produce a set of scored media elements and components. A third processing engine 22b may additionally be included and configured for selecting a template and a scored media component, and for integrating the scored media component into the template so as to generate the advertisement.

In various embodiments, these processing engines may be arranged in a manner so as to form a processing net, e.g., neural-net, so as to provide for the autonomous and automatic generation of communications, such as in a manner to form a smart chat box. In particular instances, a further processing engine may be provided for recommending content 22c to be used within a communication to be generated. In such an instance, an additional processing engine 14 may be provided for scoring content and/or a communication recipient, which may be utilized by the recommendation engine 22c in evaluating and recommending content for use in communication generation.

The collected data may be evaluated, scored, and stored in the memory 30, such as in a structured format. The memory 30 may be any memory configured for storing instructions for execution by one or more of the data processors of the system 1. For instance, the memory 30 may be a volatile random access memory (RAM), a FRAM, a ROM, a NAND or flash memory, and the like. The memory 30 may temporarily or permanently store instructions that cause at least one processor, e.g., of the CPU or GPU 11, to perform one or more of the operations described herein. The instructions may be implemented by one or more data processors either within a single computing system or distributed among two or more computing systems.

Particularly, the memory 30 is configured for storing a plurality of media elements, such as scored media elements, which may include a media template and a media component, where either may have been evaluated, scored, tagged, and stored in a hierarchical manner. Such collected data may include one or more, e.g., a plurality of media components, such as one or more of a text element and an image element. In particular instances, the data collection engine 12 may further be configured for collecting metadata, such as metadata pertaining to the collected data as well as to one or more of the webpage from which the data was collected.

Accordingly, the server 1 may also include a media element evaluation engine 14 that is configured for evaluating the media elements, e.g., components, which in some instances, may be based on a variety of different metrics so as to produce a scored media element, and once evaluated, e.g., scored, the scored media elements may be transmitted to the memory 30 for storage thereby. Specifically, in various embodiments, the metric data may include metadata, and the media evaluation engine 14 may be configured for evaluating the collected content items based on the metadata. Further, the platform may include a client computing device 20, such as may be coupled to the server 10 and associated memory 30 via the network internet connection.

Particularly, the platform may be composed of a computing system 1 that may include one or more servers 10 and one or more client computing devices 20. Such servers and clients are generally remote from each other and typically interact through a communication network. This relationship between client and server arises by virtue of computer programs running on the respective computers, implementing instructions, and having a client-server relationship to each other. Consequently, such computing systems, as described herein, can be connected and can exchange data and/or commands or other instructions or the like, via one or more connections, including but not limited to a connection over a network (e.g. the Internet, a wireless wide area network, a local area network, a wide area network, a wired network, or the like), via a direct connection between one or more of the multiple computing systems, etc.

Hence, one or more systems of the platform may include a communications module such as a suitable transmitter and/or receiver, e.g., transceiver. For example, a typical transmitter may be a radio frequency (RF) transmitter, a cellular transmitter, WIFI, and/or a Bluetooth, such as a low energy Bluetooth transmitter unit. Specifically, in various embodiments, the server 10 may be a cloud based server having a network and/or wireless internet connection so as to communicate with one or more recipient computing devices 20, which computing device may be a client computer, a recipient computer, a desktop computer, laptop computer, a tablet computing device, or other mobile computing device such as a cellular phone having online or other computing functionalities.

As indicated one or more of the server 10 and/or the client computing device 10 may be configured for generating or recommending a communication, e.g., an advertisement, from one or more collected and scored media components, wherein the computing apparatus may include one or more of a project dashboard 22, which may include a viewer element 22a, a communication builder 22b, and an advertisement generation module 16, such as including one or more generation engines. For example, one or more of the server 10 and client computing device 20 may include, or otherwise be configured for generating, a project dashboard 22 that is adapted for presenting a graphical user interface, e.g., a viewer element, at a display of the computing apparatus.

In particular instances, the project dashboard 22 may include, or otherwise generate, a project viewer 22a and/or a control interface for allowing a user, e.g., a communication generator, like an advertiser or a promoter or seller of goods and services, to view and select a media template and a media component for being integrated within the template so as to generate the communication, e.g., advertisement. In more particular instances, the viewer element 22a may be configured for displaying the media elements, e.g., during advertisement construction, and/or may be configured for playing the advertisement once constructed and generated. As such the viewer element 22a may be embedded within a communication builder 22b and may be configured to render one or more core file types so that the user, e.g., communication generator, can edit desired content in the containers. Likewise, the viewer element 22a may be configured for rendering content files into a variety formats such as .swf, .pdf, xml, html, txt, and/or other formats, as disclosed herein.

Accordingly, a communication builder 22b may be configured for accessing the memory 30, retrieving the selected template and media component, and for building the communication, e.g., based on the selected media template and media component. In various implementations, the communication to be generated may include a collection of slides, such as where the collection of slides includes one or more of: a design layer, a design elements, and a container. For instance, the generated communication may include more elements than merely the template and media asset. The containers are the elements that reside on the edge and into which the templates are inserted and the media components fetched, such as from the media repository. The various design layers may be configured to accommodate a plurality of design arrangements of the media elements, collected content, and/or other elements useful for generating and distributing of the advertisement. Such design layers may include background, main, foreground, navigation, and the like. Slide classes may be used to organize communication content types, such as by the quantity and type of content displayed at each slide in the class.

Using the dashboard viewer 22a, a user of the platform can view, fabricate, edit, and comment on communications and their components, content can be recommended, e.g., by the system, and/or communications themselves can be provided for display and potential selection by the user for communication and distribution. Hence, through the configurations and functionalities set forth herein the various design layers may be assigned and the templates configured so as to provide the user context within the design so content can be configured and assigned to appropriate containers. As indicated, the various slide types may be employed to organize the quantity and type of content that will be displayed on any given slide. For instance, a text container, an image container, a graphics container, an animation container, and/or a video container may be included, such as where the text container includes text components used for displaying HTML formatted text, the image container includes image components used for displaying images, such as .swf files, and the video container includes video components, such as is configured to display streaming video, and the like.

Additionally, the presented communication dashboard 22 is configured to generate a project viewer 22a for not only previewing the communication and its elements to be selected for building a communication, but also for selecting the parameters of a communication campaign. The project viewer 22a may allow a user to preview and select communication, e.g., advertisement, objectives, define a budget and allocate how it is to be dispersed, e.g., set a custom budget per ad or entire campaign budget, and to select a duration for the communication campaign. Communication elements, components, and communication themselves may also be presented to the user via the communication dashboard 22 such as for selection and use as a communication of the disclosure.

Accordingly, in various embodiments, a computing apparatus of the disclosure may be configured as, or may otherwise include, a communication builder 22b, such as implemented by one or more of the processing engines provided herein that are configured for producing a project dashboard 22 for presentation at a graphical user interface at a display of a client computing device 20. Consequently, the project dashboard 22 may include or otherwise generate one or more controls for allowing a user, e.g., a communication generator, of the computing apparatus to view and select the media elements, e.g., the template and media component, for generating the communication, such as where the communication is being generated and/or reviewed manually. The controls of the project dashboard 22 may further be configured for allowing the user to further select one or more of a media rich content type, an objective, a budget, a target recipient or audience, and a geographical distance within which the advertisement is to be distributed. The controls may further be used to select and/or edit content recommended by the system to be included in the communication.

In certain instances, the communications and/or advertisements to be generated may be particularized to the individual locations they are to be distributed, to the recipient they are to be targeted to, and/or they may be particularized or otherwise focused based on a determined campaign objective. In specific embodiments, the communications to be crafted may be particularized to one or more communication recipients. For instance, as indicated, a focus of the advertisement may be to gain reach, drive traffic, enhance engagement, and/or increase lift within one or more target consumer groups. The determining and/or setting of an objective may be of particular usefulness when recommending and/or distributing advertisements across one or more social media modalities, which may require the locking in of at least one objective per campaign. Particularly, the devices, systems, and their methods of use disclosed herein may be useful for executing multiple objectives to be employed in creating and implementing an advertisement campaign, all of which can be selected and controlled at the dashboard builder interface 22.

In various embodiments, where the advertisement elements are encoded but not fully combined into an advertisement, but stored at least partially individually, they can be combined automatically by the system, and in like manner, the user can create automated rules for the communications and the communication campaigns, so as to regulate the parameters of component integration, e.g., compiling, ad creation, deployment, range, budget, ad elements, and the like, all of which can be automated by the system and may be adjusted by the dashboard controls, so as to be manually or automatically deployed and/or adjusted such as on the occurrence of certain selected conditions. In this manner, automated rules for organizing and running a communication campaign can be determined and selected by the user, e.g., content generator. Particularly, the computing system 1 e.g., a server 10 and/or a client computing device 20, may include a communication builder 22 that is configured for accessing the memory 30 and building the communication, e.g., advertisement, which building may be based on a suggested and/or selected media template and a media component that is presented at the dashboard 22 and selected by a user of the system 1 or by the system itself.

Accordingly, a compiler 24 may be included where the compiler 24 is configured for integrating and compiling the suggested and/or selected media component into the suggested and/or selected media template so as to compile the corresponding codes and generate the communication. In a particular instance, one or more campaign objectives and/or parameters can be determined at this stage, such that the determined and/or selected texts, images, media rich assets may be called, e.g., by the project builder 22 and/or compiler 24, or otherwise be populated into designated data fields or containers of one or more layers of a selected template.

A single template architecture can be used to generate a wide variety of communications, such as by calling and/or otherwise pulling a number of different creatives, e.g., dynamic texts or images, which may then be populated into the various design layers of the template architecture so as to generate the advertisement. Specifically, one or more processing engines of the system 1 may be configured for receiving or otherwise implementing instructions that are adapted for calling, e.g., from a database 30 associated with the system 1, media assets and populating the various fields and/or containers of the template architecture, with such called media asses, e.g., media rich content, so as to compile the communication components to generate a communication.

Particularly, with respect to calling media elements, various of the media content can be tagged with keywords and/or other data, e.g., metadata, that function to allow the media creative to be searched, identified, called, transmitted, inserted, and compiled to an identified container of the template architecture. In a specific embodiment, the media content may include embedded coding configured for allowing it to be called and fitted within one or more containers of one or more design layers of the template architecture, functionalized, and compiled. More particularly, in various embodiments, the numerous creatives of the system may be stored in an architectural repository or database 30 that is capable of being queried, such as via associated metadata, so as to identify not only the item to be selected but further identifying containers and/or items within a container of the template to be replaced by the selected media asset. To effectuate efficient generation, the directions, html, xml, or other coding, governing the template and that of the media asset, e.g., personal home page coding, may be compiled, e.g., in conjunction with a hypertext preprocessor, together in a corresponding manner so as to generate the media rich advertisement.

Further, a formatter 26 for formatting the communication for display at a graphical user interface of a computing device 20 may also be provided. Particularly, in certain instances, the system may include a processing engine 26 for formatting the advertisement for display, such as at a graphical user interface of either or both of a stationary, e.g., desktop, laptop, and/or a mobile computing device. The communication may be configured so as to have a format that is composed of one or more image and/or text elements that can be entered and uploaded, functionalized, such as by being embedded with coding, and/or may be selected from a library of images and or text elements. In some instances, the images and/or texts may be viewed, such as via a preview display 22a, selected, e.g., from a variety of elements in an image or text library, and can be inserted into the template so as to generate the communication, such as by selection by a user of the system, or by the system itself, e.g., automatically and autonomously. For instance, using the dashboard interface 22, a variety of selectable images and/or texts can be presented to the user, from which one or more selections may be made. In other instances, the images and/or texts may be generated and/or retrieved, automatically and/or autonomously by the system itself.

In either instance, the delineated images and texts may be encoded and/or inserted and/or otherwise be integrated, such as via compiling, into one or more correspondingly encoded containers and/or design layers of the template architecture.

In particular instances, as described herein above, the images may be photos, videos, animations, and the like, which images may be in a selected format, such as in a single or multi-image format, including as a carousel, slideshow, or collection of images and/or videos. And as indicated, such images may also be generated by the system and be selected individually by the user, or may be selected and/or retrieved and integrated into the template dynamically, e.g., autonomously, by the system itself, such as in accordance with various selected criteria.

Furthermore, the computing system may also include a distributor 28 for distributing the formatted advertisement to a plurality of social media modalities in a format capable of being viewed by a user. Specifically, distribution and/or publishing of the generated communication may be performed in a number of different manners, such as via broadcasting. Hence, once the parameters for creating the communication have been determined, then the distribution, e.g., targeted broadcasting, of the communication may be implemented. For instance, upon distribution, one or more containers of one or more layers of the advertisement may call and be populated by the defined creatives so as to generate the advertisement.

In various instances, the distribution may be directed to one or more targeted recipients. Particularly, the system 1 may be configured for determining target recipients and mass distributing, e.g., broadcasting, the generated communications, e.g., advertisements, across a multiplicity of social media modalities, advertisement system servers, and/or publisher servers, especially where one or more of the individual modalities typically blocks such mass deployment, or otherwise requires going in to every single ad account individually to change the ad and/or objective and/or for distributing the same. In a particular implementation, the apparatus, system, and methods presented herein may be configured for layering an advertising container and/or template that may be layered on top of a social media modality and deployed en masse.

Hence, the system may include a formatting 26 and/or distribution 28 engine for formatting and distributing the communications to one or more, e.g., a plurality, of social media modalities, such as in a format capable of being viewed by a user at a third-party client computing devices 20. Likewise, an additional processing engine may be included and configured for reviewing communications prior to their distribution. In certain embodiments, one or more additional processing engines may be provided such as for tracking and evaluating an effect the communication, e.g., advertisement, has on the communication recipient after the recipient is exposed to the communication. Consequently, the system 1 may include a set of processing engines for tracking and/or monitoring communications once distributed as well as those who engage with the communication.

Particularly, one or more processing engines of the system 1 may be configured for determining target recipients and mass distributing, e.g., broadcasting, the generated advertisements across a multiplicity of social media modalities, advertisement system servers, and/or publisher servers, especially where one or more of the individual modalities typically blocks such mass deployment, or otherwise requires going in to every single ad account individually to change the ad and/or objective and/or for distributing the same. In a particular implementation, the apparatus, system, and methods presented herein may be configured for layering an advertising container and/or template that may be layered on top of a social media modality and deployed en masse. Further, the format of the generated advertisement, such as for delivery to a desktop or mobile or other messaging device and/or modality may also be selected.

Further still, in various embodiments, the system 1 may include an advertisement evaluation module 27 for evaluating the effectiveness of the distributed advertisement. In particular embodiments, the evaluation module 27 may include a tracking processing engine such as for tracking a user's engagement with the distributed advertisement. For instance, the evaluation module 27 may be configured for determining incremental lift. In various instances, the evaluation module 27 may be configured for working in combination with an analytics system, e.g., AI module 29, such as for performing one or more of the analytics disclosed herein. In certain embodiments, the system 1 may further include a reporting module 34 that is configured for generating and distributing one or more reports related to one or more of the generation of the advertisement, the distribution of the advertisement, and the effectiveness of the advertisement. Specifically, the system may be configured for receiving both inputs and approvals, for advertisement generation and distribution, but also providing reports with respect to the performance thereof.

Particularly, one or more aspects of the process can be detailed and one or more notifications concerning the same can be sent so as to ensure that system users are informed as to system and process functioning. For instance, the system 1 may include a notifications module 33 for analyzing content and/or generating one or more notifications reporting campaign and/or communication effectiveness. The notification can include any variety of data, including a characterization of how the communication was made, how it was distributed, how it was received, the type and quality of engagement, as well as the velocity of engagement, who engaged with the content, how they engaged with the content, one or more of their characteristics, as well as the results of engagement with the communication.

Particularly, a report as to the effectiveness of the generated and distributed communications may be generated, whereby such effectiveness can be determined in relation to a number of different parameters, such as based on a scoring of the communication, its contents, and/or its recipients, e.g., weighted in such a manner to favor one or more selected objectives. More particularly, the notification can include the pertinent information for determining how successful the communication was, whether the communication succeeded or failed to meet the campaign objectives, the effects of the budget that was deployed, and one or more system generated evaluations and/or recommendations may be made, and the like. In particular embodiments, the system may include an analytics module 27 for evaluating communication effectiveness, which analytics component 27 may be associated with an artificial intelligence module 29.

Specifically, an analytics component 27 may be included and configured for performing one or more analytics that may be run on the data so as to make one or more recommendations of how to better effectuate and/or meet one or more determined campaign objectives. For instance, the system may include an analytics module 27, which may be coupled to an AI module that may include one or more machine learning and/or inference engines that form an Artificial Intelligence module 29 of the system. In one implementation, the analytics module 27 may be configured for determining one or more objectives of a communication campaign. For instance, the analytics module 27 may be configured for determining and configuring a budget for the campaign, and therefore, may perform a budget analysis that can be made to determine what the communication spend should be, e.g., based on a determined or predicted return on investment, and may further be configured for analyzing what effectiveness resulted.

Particularly, the amount of money that was or is to be spent so as to achieve one or more determined results and/or other recorded objectives, e.g., sales, may be determined. In various instances, a prediction of how effective a communication can be and/or how effectiveness could be increased may be made, such as where it is determined that by increasing the ad spend, an increase in sales may result. Such predictions may then be made and tested. As indicated, any or all of these data may be reported to system users, e.g., communication generators, via one or more of the referenced notifications. More particularly, in view of these data, one or more system parameters may be changed, such as by a system user or the system itself, so as to better effectuate the campaign goals.

Specifically, in particular instances, the collecting and/or generating of the content data may include querying one or more webpages of one or more websites, e.g., social media modalities, based on one or more filters, such as where the one or more filters may include: a keyword filter, a character filter, a number filter, a language filter, a text-recognition filter, an image recognition filter, an image filter, a sentiment filter, a geolocation filter, an antonym filter, a chronological filter, a characteristic filter, and the like. In certain instances, the collected data may include content data that includes a media component, such as a text element and/or an image element. For instance, the image element may include one or more of a JPEG file, a GIF file, a GIPHY file, a collection, slideshow, a collection, slideshow, carousel element, a video element, and other ad media formats, and the like. In particular embodiments, the text element may be collected from a corporate webpage and the image element is collected from a local webpage, they may each be transformed and/or otherwise functionalized, and may be used in generating an advertisement, such as a media rich, multimedia advertisement.

In various instances, the collected data may further include metadata, such as metadata associated with one or more of the content data, a collection of content data, geographic data, website data, webpage data, metric data, and the like. In such an instance, the metric data may include characteristic data characterizing one or more characteristics of the content data, the collection of content data, the content recipient, the geographic data, as well as the website data and the webpage data from which the content was collected and/or to be posted, and the like. Specifically, in a specific instance, data pertaining to one or more characteristics of the message recipient may also be collected and analyzed. For instance, in particular embodiments, the metric data may include a number of webpages and/or content items viewed and/or collected, a time of content item views and/or collection, or other engagements, a number of webpages and/or content items viewed, a sentiment in response to the webpages and/or content items viewed, an engagement with the webpages and/or content items, a comment pertaining to the webpage and/or content item, a re-posting and/or sending of one or more of the content items, a number of times the content items are used, the size of the webpage and/or content items, a number, a frequency, and a consistency of content item views, collections, commenting, postings, and sending.

Particularly, the metric data may include parameter data, such as including one or more of: a character value, a numerical value, and a symbol value, the symbol value including one or more of a "like," "dislike," "tweet," "retweet," "favorite," "+1," "upvote," "downvote," "view," "unique view," "fan," "follow," "forward," "viral posting," "paid posting," "storyteller posting," "click," "hit," "hide," "comment," "share," and the like. Where webpage data is included, the webpage data may include a page title, a page description, a page content, a hyperlink, and the like. In various embodiments, metric data may be directed to one or more characteristics of the message recipient and/or characteristics of their engagement with online content, such as with respect to their having seen, viewed, and/or engaged with the communication content in a positive or negative manner. Such data may include parameter data pertaining to sentiments or engagements they expressed with regard to online content they have interacted with such as engagements that show they liked or didn't like a communication, if they favorited it, up or down voted it, they forwarded or re-tweeted it, shared it, commented on it, viewed it, and/or made a purchase after having viewed it or otherwise engaged with the communication.

Further, as indicated, a media component evaluation module 14, an analytics module 27, and/or an artificial intelligence module 29 may be included, such as where these modules include one or more evaluation processing engines that are configured for predicting and/or evaluating the effectiveness of a media component of the content item generated and/or collected. Particularly, the evaluating of the plurality of media components and/or message recipients may be based on metric data, such as metric data collected with respect to the collected and/or generated media elements, media components, communications, and/or the webpages from which they are collected, as well as metric data pertaining to how these communication elements affected the communication recipients. Hence, in particular instances, the media component evaluation 14, analytics 27, and/or AI 29 modules may be configured as a score generator so as to produce scored media elements, including scored media components, and may further be configured for transmitting the scored media content to the memory for storage thereby.

The scoring of the media elements, e.g., the communication and/or media component, and/or message recipient, by the media element evaluation, analytics, and/or AI modules 14, 27, and 29 may include evaluating the media component by one or more parameters of the metric data so as to produce a media element and/or message recipient with a score, e.g., where the score represents effectiveness, such as effectiveness of a campaign to meet one or more objectives, or the amenableness of the recipient to such communications with respect to that objective. In particular instances, such effectiveness and/or amenableness may be determined by evaluating one or more of a user engagement, a user review, a user commentary, results of a user questionnaire, an impression, a conversion, a recipient action, a recipient view, a recipient like or dislike, a recipient up vote or down vote that is associated with the media element, and the like.

Further, as indicated, the computing system 1 may also include a communication generation module 16 that is configured for accessing the memory and selecting both a template and a media component, for integration into the template, for generating the communication, such as in response to a manual or autonomous generation operation. In such an instance, the communication module 16 may be configured as a content generation engine. Particularly, the communication generation module 16 may include or otherwise be configured for generating a project dashboard 22 that is configured for presenting a graphical user interface at a display of a client computing device 20A and 20B for use in manually generating a communication, or for setting up the parameters by which a communication can be autonomously generated. Hence, the system 1 may include one or more client computing devices, 20A and 20B, such as where a first client computing device 20A is provided such as for generating and distributing an advertisement, and may further include a second client computing device 20B, such as for receiving and viewing the advertisement and/or for responding thereto.

In such an instance, the project dashboard 22 may include a graphical user interface, for visualizing and viewing media elements, including media templates and media components, communications and communication recommendations, and controls for allowing a user, such as an advertiser, to view, select, and/or approve the media template and the media component for integration therewith to produce a communication, and geographic regional identifiers, for selecting a geographical range within which the advertisement is to be distributed. In particular embodiments, the dashboard may be employed for a number of purposes, such as for allowing a user to generate and/or view an advertisement, or other communication, for viewing media elements, such as content, for scoring and/or selecting scored content, for determining and applying a campaign objective, such as for determining a budget, for generating, reviewing, and/or distributing analytics, reports, and the like. In one particular iteration, the system 1 may be employed for use in generating a communication.

Figure 1B:
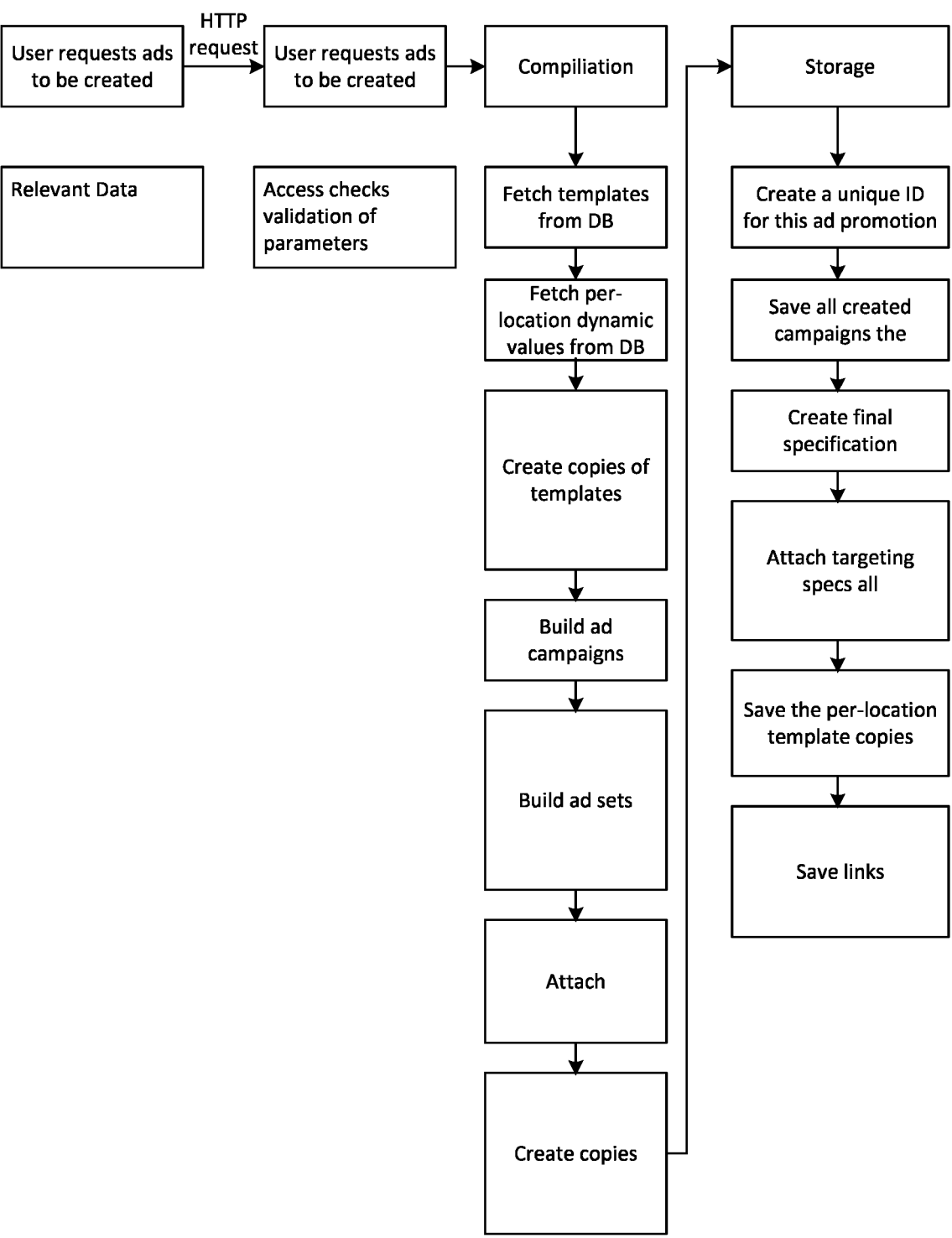
FIG. 1B is a process diagram illustrating an exemplary methodology for generating an advertisement in accordance with the teachings of the disclosure.

Particularly, as can be seen with respect to FIG. 1B, in generating a communication, e.g., an advertisement to be disbursed, either manually or automatically, a user may make a request, at a project dashboard 22 generated and presented at a local computing 20 resource of the system, that a communication be generated, such as via an HTTP request entered at a browser interface. The request may be made in the form of entering responses to an online interview, or may be made by presenting selections to a user via one or more, e.g., a series, of drop down menus, or may be made on an intuitive basis by the system suggesting information by which the advertisement is to be generated. In various instances, the request may be made in a free form manner, such as by entering what kind of advertisement and/or advertisement type is desired to be generated. Likewise, in particular instances, the communication can be entered into a text box of the dashboard, and as content is entered into the system, suggested and recommended content can be presented to the user, e.g., content generator, for their selection and use in crafting the communication.

For instance, in various embodiments, the system may solicit user input so as to determine which type or form of creative content, template and/or media rich assets are to be employed, what the objective of the advertisement is, how much is to be spent, e.g., budget per ad, the duration of the advertisement campaign, and who the target recipients are. This information may be employed in generating an advertisement. For example, in one implementation, a template reflecting the universal look and feel of a national brand can be employed, while information pertaining to each of the localized franchisees and/or the products and services they offer that have been determined to be of interest to one or more target recipients, as well as their parameters for servicing a localized market, can be retrieved and inserted into the communication template, e.g., at one or more defined containers of one or more layers of the template, so as to generate a variety of advertisements that all have the same look and feel, but where each is uniquely catered to the local audience and/or recipients to which they are to be distributed, such as by posting on one or more social media modalities unique to each market.

Once the request is made, a pre-processing step may take place, such as where the system may be configured for performing one or more data and/or parameter checks so as to validate that the entered, recommended, and/or selected or derived content comports with one or more selected or derived communication campaign parameters. Such access checks may include ensuring that the selected objective(s) is supported, the recommended and/or selected content, content type, and/or creative template exists or may be generated, and/or the determined media assets are available for use, e.g., that there would be no conflict in its usage. For instance, where the template is to include local media assets, the information to be collected that is unique to each market may include the name, city name, address, phone number, name of the local company serving the local society, a local offer, and the like. This data may then be collected, assessed, and/or validated by the system, such as for authenticity. Additionally, one or more images pertaining to the local market may also be collected, scored, transformed from one form to another, inserted into a container of a design layer of the template to generate the communication, which communication can then be sent for review, editing, and/or approval, such as prior to be distributed in an integrated format as part of an advertising campaign. This process can be repeated, e.g., in an automated fashion, for a number of different communication campaigns, and thus, thousands and thousands of communications may be generated and distributed, each having a corporate format, but also containing particularized locally relevant information.

Particularly, once content, a content type, a template, and/or media asset, or category thereof, has been identified, and prior to, or upon distribution of the advertisement, the advertisement components may be compiled. For instance, a content item may be collected, parsed, evaluated, scored, and/or generated and/or transformed, a template may be fetched from a system associated library or other database, such as where the fetched template is an identified global and/or location specific template having dynamic value fields associated therewith. In such an instance, a variety of copies of templates per location may be used or otherwise generated, and various of the dynamic identifiers may be replaced with substituted values, such as with local values. Accordingly, in various embodiments, the collected information may be stored in a repository in a manner to be easily accessed and retrieved.

In particular instances, the collected and stored information pertain to one or more, e.g., each, of the local franchises, and their local markets, including the employees serving that market and/or the message recipients that make up that local market, which information can then be used to generate the unique communications of the disclosure. These universal and individualized, unique communications can be generated en masse in real-time, on the fly, and for multiple locations and across a variety of social media modalities, such as for substantially simultaneous distribution to grouped or individualized message recipients. Accordingly, in particular embodiments, one or more of the generated communications can be distributed in a targeted manner. In various embodiments, the system is configured for autonomously generating and distributing a media rich advertisement.

For example, with respect to advertisement generation, a user or the system itself may access one or more libraries 30 storing content relevant to the administering of a communications, e.g., advertisement, campaign and/or with respect to building an advertisement. The advertisement to be used in a campaign can be a pre-fabricated advertisement or one that is to be generated by a user or system selection and/or in accordance with a transformation protocol. In various embodiments, the advertisement may be automatically and/or autonomously generated by the system. Hence, the advertisements can be prefabricated or dynamic, e.g., generated on the fly. Typically, the advertisement may include, or may be made to include dynamic text and images, where such image content can include digital photos, a carousel of images, videos, animations, GIFs, JPEGS, GIPHY's, and the like. In various instances, a database and/or library of prefabricated content may include a carousel of advertisements or content thereof of different categories and types, such as text, image, carousel, videos, and the like, which may be made available to a communication generator for selection in the generation of a communication.

More particularly, as can be seen with respect to FIG. 1B, in addition to building the communication, e.g., advertisement, the system may also build a communication campaign, e.g., via a system generated interview process, such as where data pertaining to the advertisement campaign may be stored in the memory. A useful element of a generated advertisement campaign is the allocation of a budget, that is an amount of spend per advertisement per location. Consequently, in generating the advertisement, the system may additionally build one or more content types and/or ad sets, whereby the system may calculate the per ad spend in accordance with the generated advertisement and ad campaign, such as based on one or more predicted models. The generated per-location template copies can then be attached to the ad sets. Additionally, copies of optional assets, e.g., media rich assets, such as videos, forms, csv lists, and the like that can be distributed can also be created, stored, and recommended in a system library and/or database.

Storage of the collected, evaluated, scored, and/or generated data, including advertisements and their components, may be performed in an enriched, structured manner. For instance, communication components, as well as the communications themselves, may be scored, tagged, flagged, and/or embedded with data, e.g., metadata, so as to be stored within one or more structured categories, such as where the database is a structured database, and the scoring is used to evaluate content for use in recommending and/or generating a communication. For example, a unique identification may be generated for the communication and/or its components and used for cataloging the content and communication for storage as well as recommendation and/or generation.

In various instances, the communication data may be stored in accordance with data pertaining to a generated communication campaign, advertisement, or promotion, and/or may be based on location data, recipient data, and the like. In various instances, all created campaign and communication data may be transferred to the database for storage, such as via bulk insertion. Particularly, in various instances, the per location template copies and ad creatives may be stored using bulk insertion. Additionally, the links between the created ad sets, ad creative, and components thereof as well as message recipient data may also likewise be stored. Various metadata may be written, associated with the media components and/or message recipients, and used for storing and recalling each data component.

As indicated above, in generating a communication, such production may be performed by inserting information and/or other data of a selected and/or generated type into a template, e.g., a defined container thereof, which data may set forth various of the particulars of the communication campaign and/or the advertisement to be generated. For instance, in initiating of the building of the communication, the system may generate a series of prompts or queries to be presented to the user at a generated dashboard interface, which prompts are designed to elicit from the user the appropriate information for determining the content for recommendation, selection, and/or insertion into the communication template so as to build the template and/or generate the communication. For example, the prompts can elicit texts to be presented for recommendation and/or to be entered, with regard to the messaging of the communication, the media rich content type to be employed, and likewise such queries may be used to define one or more targeted recipients and/or audiences.

Likewise, the prompts may present one or more images, such as presented at the graphical user interface, for selection by a user, e.g., a communication generator, of the system. Particularly, the system may present a prompt directed to the name of an organization for which the advertisement is to be generated, and the system may then prompt the further entry of locations, people, and/or services to be provided, and may further provide message recipient data, which data may then be populated as one or more data fields in the communication template. In various embodiments, once one or more of these data fields have been populated, the system may perform a search, such as of one or more databases of the system, or an online search, so as to be able to auto-populate the other data fields. Further, one or more additional features, such as for configuring the communication and its delivery may also be selected. These features may include audience characteristics, e.g., creating an audience to be targeted, such as the number of recipients, the characteristics and/or demographics of the recipients, as well as the geographical region within which the recipients are located, and/or characterizations of the product with which they are interested.

Accordingly, in creating a communication campaign, a first step may include the generating of a communication such as an advertisement. In such an instance, a template may be generated, where the template may include targeting specifications so as to define a recipient or group of recipients, e.g., an audience, to be targeted, and/or inform the type or class of media components to be employed. Particularly, criteria for target recipient and/or audience selection include: interest, behaviors, demographics, language spoken, locations, and the like. Hence, a localization feature may be included so as to allow a user to choose various audience demographic and/or geographical options within which a generated advertisement may be targeted. Specifically, a target may be one with a physical location within a particular defined area or region, or the targeted audience may be one that has social or other connections of interest and/or that are within a geographic area to be targeted.

Consequently, in various instances, one or more target audiences may be defined by demographics and/or one or more geographical regions, and likewise one or more persons, such as within the geographical region can be identified, and all of their social contacts within that geographical region may also be identified, collected, and then may be targeted themselves, such as via an access and/or search of their online contacts. Further, the social network of the social contacts within the region may also be targeted. In a manner such as this, a user can create demographic targeting that will apply to a variety of locations, but may also target a number of social networks of people within the geographical locations, such as via one or more user's social media interface. For instance, the audience for receipt of the communications may be selected based on the geographical region within which they live, based on selection from a map, based on their presence on a predefined list, such as with respect to a defined radius, based on their demographics or other characteristics, and the like. Particularly, the recipients of the advertisement may be determined automatically by the system, such as based on the online usage data of the prospective recipients and its correspondence with one or more characteristics of the advertisement elements.

Once a target and/or audience has been defined, then the platform may be used to generate the campaign creatives for fashioning an advertisement that may be created in a manner so as to be of particular interest to the recipient and/or audience being targeted. For instance, the platform may provide a variety of tools for generating advertisement creatives so as to produce templated advertisements capable of transmitting media rich files, including dynamic texts, dynamic images, videos, animations, graphics, links, calls to action, patterns, and the like, such as based on a correspondence between the products and goods being offered and the characteristics of one or more communication recipients. In various embodiments, the creatives can also be particularized to location such that available content can be catered to pull and provide content that pertains to the location and the people within that location to be targeted.

Particularly, the template may include dynamic creative fields, such as dynamic text and image fields that can pull data from a variety of resources, e.g., databases, webpages, other online content, and the like, within the defined geographical region, which content can be pulled, evaluated by the system, stored, e.g., within a structured database, and provided to a user of the system for presentation at one or more data fields within the template. Hence, in a manner such as this, a creative template may be provided having dynamic fields whereby content can be replaced one with another depending on the defined location and/or with respect to the targeted audience such as to include location relevant content.

Thus, a variety of advertisements that all have a similar look and feel, may be generated, where each individual advertisement has been particularized to each targeted demographic and/or location, such as with respect to dynamic creative, including dynamic text and images, and may be catered to each individual recipient. Consequently, instead of generating a single advertisement having a single set of creatives, a multiplicity of advertisements can be created with a variety of different creatives, whereby a single, or multiple, containers can be loaded with different texts, images, and the like. In this manner, a plurality of different advertisements each having localized creatives, text, images, videos, and the like, may be produced and distributed. This may be performed with respect to single text or image files or a carousel of texts and image files, which may be engrafted into one or more containers of one or more design layers of the template.

In another instance, communications may be generated autonomously by the system, in which instance, various parameters for dynamic auto-population may also be set at the user dashboard 22, such as with respect to the content to be employed and from which libraries and/or databases various of the communication components and design elements are to be selected. Such selectable elements and associated data may include data pertaining to the subject of the communications such as biographies and characteristic data describing the recipients to be targeted with the communications, and the like. Particularly, the biographical data may include name, location, online profile, history of online usage, engagement, organizations they are a part of, photos, and biographies of the relevant recipients. These data may be used as keys or access points by which to search and local relevant advertisement information, and/or offer information that corresponds to the biographical data, or vice versa. Both biographical and/or advertisement data may be entered, e.g., free-form, as a data field or may be collected and auto-populated into a communication to be generated by the system.

More particularly, as indicated, in various embodiments, once these communication parameters have been set, the system itself can then select one or more particular content and/or data elements, may select one or more template and media asset types, and the product thereof may be configured for insertion into the template, such as from a collection of pre-approved and/or selectable text, image, video files, and the like, so as to recommend and/or generate a media rich advertisement. Data particularizing the communication to one or more recipients may also be selected, evaluated, and/or otherwise employed in generating the communication. Other data elements may also be added, including a logo, a website URL, a biography, interactive map component, and the like. The system may also include one or more controls for configuring various characteristics of the data fields, such as with respect to size, color, font, and the like. Additionally, one or more objectives, as described herein, can be selected. Accordingly, once all of the design parameters, advertisement elements, biographical data, and control features have been selected, the system may then auto-populate various design layers of the template, such as with respect to generating an advertisement or other communication.

For instance, the controls of the project dashboard 22 may further be configured for allowing the content generator, e.g., system user, to select an objective, a budget, a target audience, target characterizations and demographics, and a geographical distance within which the communication is to be distributed. Objectives may include actions to be taken by communication recipients, e.g., consumers, having been exposed the communication, including electronic actions, such as impressions and conversions, e.g., clicking on and/or viewing the communication, e.g., advertisement, visiting the website of the advertisement promoter, downloading a promoted element, such as an app, as well as physical actions taken, such as visiting the promoter's store, and/or purchasing the promoted goods or services, either physically or via an electronic catalogue. Other post exposure and/or post conversion and engagement activities can also be tracked and communicated to the system.

As indicated, in various embodiments, a communication template and/or media component, such as a media asset, may be functionalized, such as to be embedded with coding. For instance, the system may be configured for manual and/or automatically functionalizing, generating, and broadcasting a number of different communications and/or advertisements, where each advertisement is unique to each local market and/or with respect to each particular message recipient. Particularly, the system may generate and/or store one or more profiles, including biographies, for each communication recipient in an identified market and/or in a determined location being served by a local organization for which the communication is to be produced. This data may be collected and/or entered into the system by a system operator, or by retrieval and auto generation by the system itself. In either instance, once a profile for one or more data elements of the communication and/or communication recipient have been entered and stored in a database of the system, the system may then pull data from respective profiles for entry into one or more templates for the auto-generation of a unique ad creative, which ad creative may include different data sets that are particularized to each market, each communication recipient, and each service provider within each market across a variety of geographical regions and localities within the geographical regions.

Hence, in manners such as these, users and/or the system itself can create local ad creative libraries that contain various of the different media elements, entered, collected, transformed, and/or generated content, and/or communication recipient profiles, which can then be used by the system to generate a communication, either manually or autonomously. For instance, one or more categorized and searchable libraries may be set up, such as where the one or more libraries may include the profiles for the various companies and franchisees and employees thereof, as well as for content describing the goods and services being proffered and promotional content regarding the same, and may further include the characteristics of one or more communication recipients that form an audience to be targeted. Particularly, such profiles can include a photo, a video, and information about the local office, the employees thereof, their proffered business solutions and services and/or goods they offer, and available print copy that can be used in generating a communication, and may include recipient data to be employed in tailoring the communication to recipients to be targeted.

Particularly, once created, the advertisement may be published or otherwise transmitted, e.g., via a suitably configured distribution engine 28 to one or more social media platforms, such as FACEBOOK®, INSTAGRAM®, TWITTER®, TIKTOK®, and the like, for distribution thereby, for example, by a single or multiple corporate or local account. In one exemplary embodiment, communication publishing may be performed at the group, e.g., corporate, level, such as from two to thousands of locations, and in other embodiments, a single corporate and/or local account can be employed for the purpose of distributing the communication to a much smaller local level. Publishing may be performed in accordance with various different parameters, such as based on a determined budget allocation, and based on one or more selected communication campaign objectives.

For instance, budgeting can be determined based on a fixed budget evenly split across distribution locations, recipient classes, or a floating budget based on a performed or perceived cost benefit analysis, such as where more budget is allocated to those locations that are best suited for generating a greater return on investment within a defined recipient class. As indicated above, distribution can be performed in accordance with one or more objectives, such as: Brand awareness, impressions, conversions, engagement, likes, reach, traffic, views, lead generation, and the like. One or more audiences may also be set up for targeting, which targeting may be based on one or more of: age, gender, language, demographics, interests, a commonality of characteristics, and/or behaviors. Broadcasting and/or distribution may be based on location, such as for geo-targeting, such as to a specific geographical region, e.g., a town, municipality, city, county, state, region, country, and the like, such as within a certain determined radius of one or more of those locations. As indicated, the generated advertisements may be published through one or more centrally located corporate accounts, or one or more individual, local accounts.

During the communication generation and distribution process, a target audience may be defined. For instance, a target audience may be generated from one or more lists, derived from one or more online, or internal database, searches, or may be selected from amongst a number of pre-identified audiences saved in a library, such as in customer resource management database, point of sale database, and/or other target recipient characteristic database. The audience may be defined by one or more shared or non-shared attributes amongst its members, such as with respect to age, gender, language, demographics, interest, and/or behaviors.

Likewise, an audience can be selected via geotargeting, such as based on a specified location, for instance, within a given radius, e.g., from about 1 to 50 or 100 miles or more, from a specified address, or within a defined region, such as within a city, county, state, region, country, and the like. Further, with respect to budgeting, a budget can be determined, such as on a global or location by location or recipient by recipient basis, such as where the spend between locations and/or amongst recipients is divided either evenly or disproportionally. Furthermore, such distribution and/or broadcasting can be configured and/or performed along various pre-set or selected parameters, such as with respect to determined campaign objectives, audience targeting, and/or in accordance with a pre-defined budget and/or spend allocation.

With regard to distribution, after communication generation, tagging, categorizing, and/or storing, and upon the appropriate approvals and/or triggers, the communication may be sent for approval and subsequent broadcasting, or other distribution, to one or more target recipients. Particularly, once created, the communications can be distributed across a variety of communication platforms, such as one or more social media platforms. For instance, once a communication has been created, it may be stored in a database of the system, which communication may then be tagged and/or embedded for storage, such as in a hierarchical structure so as to be easily identified by the system and provided for selection by a user or the system itself when approval and distribution is desired.

Specifically, the communication may be embedded or otherwise include metadata that identifies the communication content and/or created communication into one or more classes. A user of the system, e.g., a communication generator, may engage a graphical user interface whereby the user may be presented with a number of content and/or communication recommendations, which may be employed in building a communication that is designed to elicit one or more particular actions from the recipient or group of recipients. Once defined, the communication can be distributed.

In this manner, one or more communications, e.g., advertisements, may be generated and/or otherwise be presented to the user for selection for use in implementing an advertisement campaign, may be sent to an approval and/or conflicts module, and upon approval, and the absence of a determined conflict, the communication may be transmitted for distribution. In various instances, such as during the approval process, one or more conditions or other criteria with respect to configuring the advertisement may be selected, such as whether to use an advertisement with generalized creatives, e.g., centralized texts or images, or to use an advertisement with particularized creatives, e.g., decentralized texts or images, which can be generated before or immediately upon distribution or may be pre-fabricated.

As indicated above, in such instances, the graphical user interface (GUI) of the dashboard 22, may be configured to perform an interview process that allows a user to configure the system based on various parameters, such as with respect to recommending, generating, targeting, distributing, and/or tracking a generated communication, which user interface may be accessed at an individual or group account level. Likewise, the GUI may be employed for configuring one or more communications and/or communication elements, which may be edited, reviewed, evaluated, and/or approved for distribution, and from which interface the communication may targeted to one or more particularized recipients and/or be tracked once distributed. For instance, a number of characteristics of one or more business entities, products or services to be offered, communication elements, and/or communication recipient characteristics can be used in determining content to be recommended and/or used in generating, targeting, and distributing communications, so as to focus communications to a limited audience, e.g., within a defined demographic and/or a limited geographical region and/or having one or more defined characteristics of interest.

In various instances, the targeting may be pre-set, such as when it is desired that an advertisement from a national brand be targeted to all locations, or where it is desired that a select set of distributed franchisees or independent locations be targeted, such as based, on or at least similar to the social media platform's endogenous targeting. Likewise, targeting may be pre-set around or within a selected geographical location, such as within a selected radius of a determined location. For instance, the system may be configured so that a user can set the radius around each location where ads will be distributed. Additionally, targeting may be based on one or more recipient characteristics, such as their demographics, online usage data, previous impression and/or conversion data, as well as their engagement history.

Further, in various embodiments, the system may include a tracking module 35 configured for tracking and/or comparing the performance of the campaigns at the individual location or group level. Particularly, the system may be configured to track the effectiveness of the communications, and/or components thereof, such as with respect to the advertisement's ability to become an impression, e.g., influence a consumer's desire to view the advertisement, and/or to become a conversion, e.g., influence the consumer to make a purchase of the advertised goods or services.

More particularly, the system may be configured to elicit or otherwise receive recipient response data back from the social media platform and/or communication recipient, such as where the response data pertains to the effectiveness of the advertisement to achieve a defined objective, such as reach, looks or views, clicks, impressions, engagements, transactions, conversions, shares, up votes, and the like. In such an instance, the response data may be collected from all those who receive the messaging, such as those within or outside of the sender's defined social network. In reaction to this response data, the database and tagging modality can be updated with respect to future use. One or more notifications may then be generated so as to notify the system user, e.g., administrator, how the communication and/or campaign may be running. Where the engagement is as expected, system weighting may be arranged to reflect the successfulness, and if the results are not at a level expected, system weighting may be modified, e.g., increased or decreased, and the communication may be modified and/or re-sent one or more times, e.g., 3, 5, 10 or more times, if desired or if the system determines it is beneficial to extend the campaign.

The system may also track the amount that was spent and track the effectiveness of the communications deployed so as to determine an accurate return of investment, such as at the individual location level and/or with respect to the individual recipient or group of recipient levels. During this process, one or more objectives per advertisement may be selected or otherwise determined. In such an instance, a variety of ad campaign objectives for tracking and evaluation may include enhancing brand awareness, increasing impressions and/or conversions, page views, page likes, reach, traffic, text, image, and/or video views, lead generation, and the like.

Specifically, in various embodiments, the system may be configured for receiving data pertaining to who was served a communications, and further, of those served a communication, who actually were converted by the communication or advertisement, and made a purchase, or performed some other act, such as in response to having been served the advertisement. More specifically, in a particular embodiment, the system server may include one or more APIs from which to receive content and data from other system servers, e.g., social media servers, such as with respect to the deployment of advertisements, e.g., on their platforms, and may also include APIs for receiving content and/or data, such as from sellers of products or services, which are the subjects of the advertisement, where the received data pertains to the consumers who performed an act in response to having been exposed to the advertisement, e.g., a conversion, such as by making a purchase. Likewise, such data may be transmitted to the system server from a partnered social media customer relations management (CRM) system, point of service (POS) system, or other such interface for transmitting advertisement and conversion data and analytics.

In particular embodiments, the methods presented herein may include one or more of tracking, reviewing, scoring, reputation monitoring and protecting, and responding to various communication engagements. In such instances, not only may content be evaluated, such as for use in communication generation, but in certain implementations, communication recipients may also be evaluated, such as for determining and generating particularized attention and communications to be transmitted to the communication recipient. Hence, the methodologies presented herein, as well as the articles provided for the implementation of such methodologies may further include manual or autonomous communication generation, tracking and evaluation of communication engagement as well as auto-responding thereto, including content and persona scoring, which may further include predictive analyses, and may additionally include both content recommendation and communication direction and funneling. Further, in various embodiments, these methodologies may be implemented by an automated communication generator 16, which as described herein below, may be implemented as one or more smart bot communication engines.

In addition, the system may include a tracking module 35 that may be configured for tracking the results of the targeted communications so as to determine communication effectiveness, such as by following conversations, filtering for keyword use, monitoring reputation, collecting data pertaining to the evaluations of the advertisements and its contents, and for transmitting the evaluations to the system server 10. This data may then be aggregated and evaluated such as for scoring and storing within the media repository 30. As indicated, this data along with collected content can be evaluated, scored, and saved as one or more categories, tables, and/or lists within the repository, so as to allow for ease of searching, selecting, and integration within one or more templates for the purpose of building future follow on advertisements. In various instances, metadata pertaining to the collected data can also be collected and used to score and rank campaign effectiveness.

For instance, communications and their elements can be ranked and stored in the database in a hierarchy, e.g., in ad sets, such as in a hierarchy in accordance with campaigns and their objectives, e.g., in single or multiple campaigns. In such an instance, the highest scoring and/or highest-ranking content can be presented higher up in the categories, such as in a prioritized manner, and/or first in a carousel so as to be seen first. Particularly, in this manner single text or image elements, can be grouped into high performing categories and be displayed as ranked lists, or carousels, whereby the best performing content can be presented first. Any number of texts or images may be loaded and formed into a list or carousel, such as 2, 5, 10, 15 20, or more, e.g., in ranked order.

Accordingly, in various embodiments, a variety of analytics may be performed and reports thereon generated and distributed, such as on an account, group, and/or location level. For example, one or more analytics may be run on collected content, distributed communications, and/or each recipient within each region, on each proposed recipient, and with respect to each business entity, employees thereof, and/or those associated with the same, so as to determine the greatest opportunities to convert the communication, e.g., advertisements, into sales. Specifically, once the advertisements have been deployed, the results provoked by the advertisement can be collected by the system and used in one or more of the analytic processes.

For instance, the system may be configured for determining one or more factors related to attribution. Particularly, as described herein, once the communications are deployed, the system can be configured for determining what sales can actually be attributed to a consumer having seen the transmitted communication. Such attribution may be determined in a variety of manners, for instance, the system may be configured for determining the return on investment attributed to communications and/or components thereof. Hence, in such instances, the system may be configured to track and evaluate the performance of the communications, e.g., advertisements, and based on this evaluation may make suggestions based on the determined performance, such as with respect to the selection of communication elements that have been scored and been proven to have a beneficial impact, such as with respect to increasing impressions and conversions, e.g., lift, where such analysis may be performed on the corporate or local level.

Accordingly, such evaluation and scoring may be used by the system to rank, order, and select content, both text and image based content, for inclusion within an advertisement, such as an advertisement template described herein. This is advantageous because the system is configured to allow users to quickly reach their top-performing audiences, with their top performing content, within a targeted radius so as to optimize messaging and more accurately determine the return on their advertising investments amongst advertisements and messaging as well as across all locations. The system, therefore, may include one or more analytics modules, such as analytics modules 14, 26, and 29 that include one or more processing engines that may be configured for collecting, analyzing, and presenting the analyzed data.

The data to be collected and analyzed may pertain to one or more locations, content information related to a generated and/or distributed advertisement and/or its effectiveness, various discussions being held about the advertisement, the products or services proffered, and/or its audiences, recipient data, discussions about the advertised company, the reputation of the company, data pertaining to the creative elements, data about ad plus and/or boost functions, and reports generated with respect thereto. Such data collection and analyses may be performed by a collection of the processing engines acting individually or collectively, such as in a pipelined manner.

In view of the forgoing, one or more analytics modules may be configured for performing one or more evaluations so as to generate analytics with regard to how a communication campaign is performing, the results of which may be presented for review by a user. In such embodiments, these various analytics may be generated and displayed, e.g., at the dashboard viewer 22a, such as with respect to performance of the communication per designated location, based on its contents, e.g., its particular media elements, the type of conversations being generated based on the communication, who is engaging with the communication, how engagement with the advertisement is affecting the reputation of the subject company, and how the creatives are performing generally.

Hence, the various insights modules of the system may be configured for tracking social advertising and performance, such as at the national and/local levels. A reporting module 34 may also be included so that along with campaign parameters and effectiveness tracking, the results thereof may be reported. Additionally, the one or more system determined insights may also be reported, which insights may be customized to the user, the campaign, the advertisement, to its elements, its recipients, and the like, such as for measuring effectiveness, and other such metrics. Such insights and reporting allow the system to leverage campaign reporting and key insights at all account levels.

In such a manner as this, top performing creatives, such as with respect to one or more of impressions, conversions, engagements, reach, lead generations, and the like, can be tracked, monitored, and used in the building of new advertisements. The number of advertisements executed, e.g., per campaign, can also be tracked and optimized. Additionally, performance by objective may be determined and tracked, such as with respect to the progress thereof. A cost per result may also be determined. The insights module, therefore, can be used to increase efficiency and return on investment, such as with respect to objective attainment and customized advertisement building. Notifications and alarms with respect to these evaluations and reporting thereon can also be set.

Additionally, in addition to, or substitution for, a first analytics module 27, the system 1 may include an artificial intelligence (AI) module 29, such as an AI module that is configured for implementing one or more evaluations and/or scoring protocols for evaluating and scoring collected media elements, such as one or more media components, communications, and/or communication recipients. In various implementations, the AI module 29 may include a machine learning engine as well as an inference engine that are configured for interacting with one or more of the system processing engines such as for the purpose of generating and/or evaluating communications, communication content, and/or communication recipients as well as their response to communications. Particularly, with respect to communication generation, the AI module 29 may be configured for autonomously selecting the template and the media component such as where the selecting may be based on results of one or more evaluations, analyses, and/or scoring protocols being run on communication content.

For example, in one particular implementation, the AI module 29 may be associated with the project dashboard 22a, and may be configured for determining communication content to be included in a communication and/or one or more of an objective, a budget, a target audience, and/or a geographical distance, all of which may be configured in designing and implementing a communication campaign. Once the communication is generated, it may autonomously be distributed automatically, at real time and on the fly, upon the occurrence of a triggering event. Particularly, the system 1 may include an artificial intelligence (AI) module 29 that may be associated with one or more of the sever 10 and/or client computing device 20, and may be configured for autonomously conducting communications from one to the other.

More particularly, the AI module 29 may be associated with one or more of the data collection module 12, data evaluation module 14, advertisement generation module 16, and/or advertisement evaluation module 27. In particular implementations, the AI module 29 may be configured for developing a communications campaign and implementing one or more collection, scoring, generating, and/or evaluation protocols. Specifically, the AI module 29 may be associated with the content collection module 12 and/or evaluation module 14, and may be configured for collecting, evaluating, and/or scoring the content to be collected and/or used in generating communications.

In particular embodiments, the AI module 29 may be associated with the advertisement integration module 24, and thus, may be configured for selecting the template and/or the media component and/or for generating the communication, such as where the selecting process is based on the results of the above evaluation and/or scoring. In such instances, the content items may be collected, scored, and/or the advertisement generated and/or distributed automatically, at real time, and on the fly, e.g., upon the occurrence of a triggering event. In particular instances, one or more of these steps, e.g., generation and/or distribution, may be performed autonomously. Specifically, in one instance, the AI module may be associated with the project dashboard 22 and may be configured for determining one or more of an objective, a budget, a target audience, and the geographical distance, such as for determining the particulars of a communication campaign.

For instance, various different campaign objectives may be selected, manually or autonomously, from brand awareness, reach, page likes, web conversations, lead generation, web traffic, image views, advertisement previews, and the like. For example, in a particular embodiment, an objective of a communication campaign may be to increase reach, impressions, conversions, and/or engagement. In such an instance, a user of the platform can create a communication, e.g., an advertisement, or other message, that is designed to support or otherwise promote engagement as an objective, whereby the AI may play an instrumental role in generating content that is particularly focused on in creating communication engagement amongst one or more target recipients.

Specifically, the system 1 provides a project viewer 22a, e.g., presented at the project dashboard 22, whereby a communication generator may engage with the interface, such as at a portal presented at a graphical user interface of a client computing device 20, may select one or more premade and approved advertisements, or may select a template and/or one or more media elements for an ad to be generated, and/or may begin typing in a free-form communication to be crafted. Likewise, the content generator may enter a budget or amount desired to be spent per communication or per location, may select one or more campaign objectives, and may select amongst the conditions by which the communication is to be sent to one or more target recipients, however, in various embodiments, these steps may be performed autonomously. In these regards, the user may further select and/or determine one or more recipients to target with the communication. Hence, via the graphical user interface, an authorized user of the system, e.g., goods or services promoter, may set the conditions by which a communication may be generated and edited, and the system can track the changes as well as the amounts spent per advertisement and per location and per recipient. In particular embodiments, the AI of the system may further track these entries, and can provide one or more predictive outcomes as to the likelihood of a determined objective being accomplished based on the selected communication parameters selected or otherwise entered, e.g., via the dashboard 22 interface.

Figure 1C:
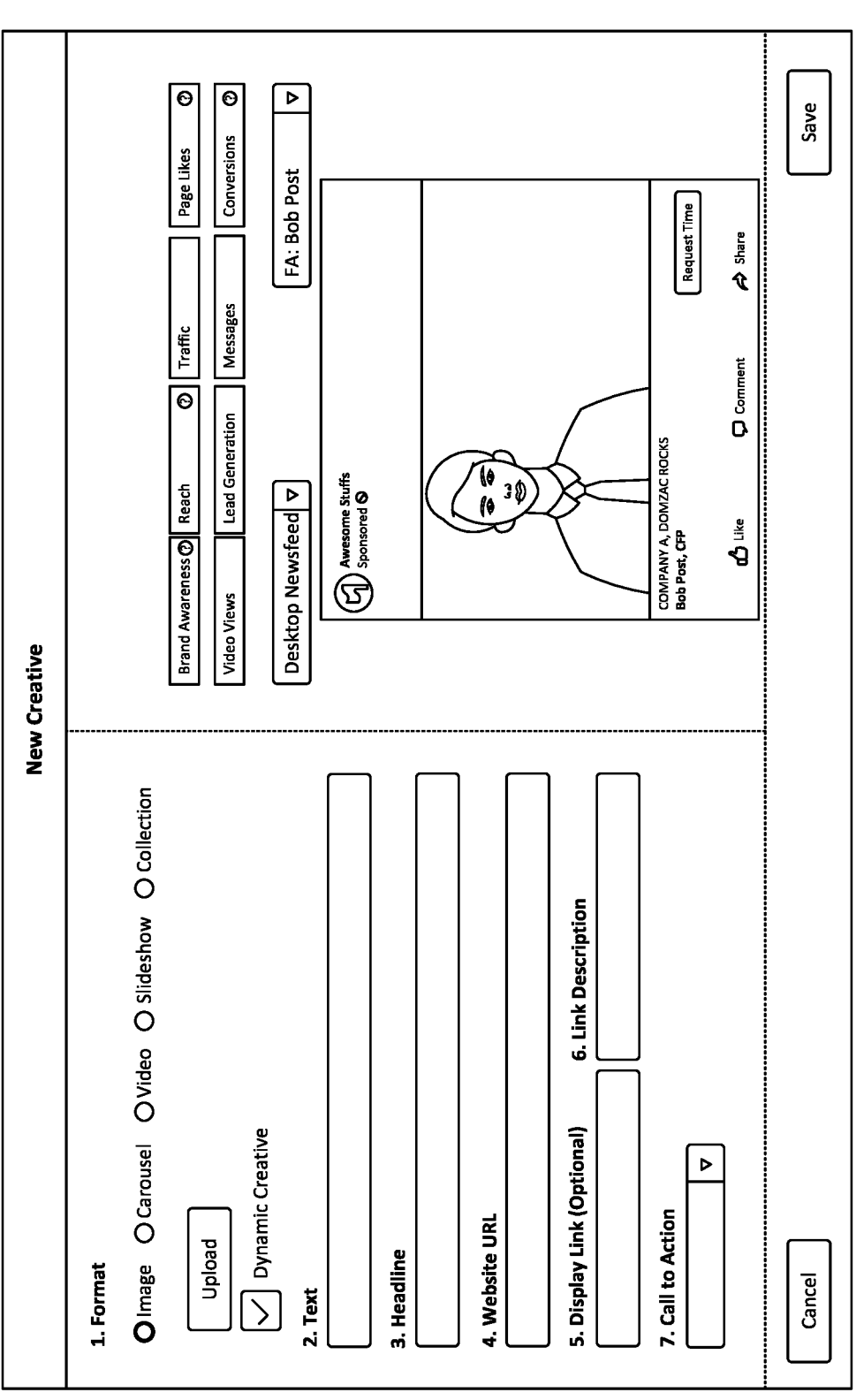
FIG. 1C is an exemplary dashboard interface presented at a display of a computing device for use in setting the rules by which a new communication campaign can be engendered and used to generate, e.g., dynamically, a communication.

For example, as can be seen with reference to FIG. 1C, using the dashboard interface 22 presented at one or more client computing devices 20, a communication campaign may be set up, and an advertisement created, such as by interacting with a series of online interrogatories and/or manipulative text and/or image boxes. Particularly, when setting up a communication, e.g., an advertisement campaign, a graphical user interface (GUI) may be presented to the user via a client computing device 20 of the system 1, whereby the GUI may include a dashboard 22 for configuring an advertisement campaign and/or for generating a communication, e.g., an advertisement. In certain instances, the dashboard interface may present a user with a list of options and/or interrogatories that may be presented for selecting amongst the various options for configuring the campaign and/or for creating the advertisement.

Particularly, using the dashboard interface, the format, images, texts, URLs, links, a call to action, and an objective can all be configured. The advertisement may be composed of a variety of components that may be combined together to form a dynamic advertisement having interchangeable assets. Specifically, the advertisement may include a framework that contains a variety of assets, such as a template architecture having one or more design layers, into which one or more media rich assets may be inserted and/or otherwise integrated so as to form the advertisement.

As indicated, in various instances, one or more media assets to be used in advertisement generation may be collected by the system, such as from an online source, and/or may be uploaded into the system, such as via a suitably configured application programming interface (API). The dashboard interface may be used to select one or more media elements, such as one or more templates and one or more media assets, e.g., graphical images, photos, videos, other digital image files, jpegs, gifs, gigphy's, thumbnails, and the like, as well as, text based elements. Specifically, these media elements may all be presented at the graphical user interface as a media component that is selectable for incorporation into a selected media template. Further, one or more formats can be selected, such as media, text, website URL, headlines, CTA, single images, an image carousel, single video, carousel of videos, and the like.

Accordingly, the dashboard 22 will allow the various data collected to be sorted and searched, or otherwise filtered, such as by key category indicators and date ranges. For instance, in various embodiments, the system 1 may include an artificial intelligence module 29 that can be used to assist in the performance of the one or more evaluations disclosed herein. Likewise, the system 1 may include an analytics module 27 for determining the effectiveness of an advertisement to provoke a response from a communication recipient, such as where the communication has been distributed for viewing by the client computing device 20B. In such an instance, one or more metrics may be collected by the online activity module 27, e.g., once the advertisement or other communication, has been presented to the users computing device 20B, and either been engaged with or ignored thereby. Such data to be collected and evaluated can include views, impressions, conversions, engagements, and/or other actions or the like.

In various instances, the dashboard interface may further be configured to allow a user to enter texts into the system, e.g., free-hand, which may then be used in generating the advertisement. A headline may also be determined and an interactive website URL may be entered and once the advertisement has been generated and presented for viewing, e.g., to a consumer, the URL may be interacted with, e.g., clicked on, whereby the user may be presented with a website of the product or services being sold. The link may optionally be displayed, and a description may be provided. In various embodiments, the generated advertisement may include a call to action toggle, whereby an interactive tagline calling for some determined action may be incorporated into the advertisement. Likewise, one or more objectives for the advertisement campaign may also be selected or otherwise determined. In a manner such as this, once various advertisement parameters have been determined, one or more templates and/or media assets may be selected and used in generating the advertisement. In various instances, the advertisement may be generated in a variety of functionalized layers.

Particularly, in a first layer of an advertisement to be generated, information to be inserted into the template architecture may be captured, such as where the information to be captured regards universal data that forms a global context of the communication. Such information can be collected, such as by a web-crawler, or may be retrieved from a database, or uploaded via an API of the system. In either instance, the retrieved data may be entered into the system in a number of different manners, such as by association with one or more specified accounts. Specifically, a user's social media, e.g., FACEBOOK®, INSTAGRAM®, or other account can be used to transmit the advertisement data, e.g., the advertisement creative, for incorporation into one or more layers of the template. More particularly, the system may be configured such that one or more advertisements or advertisement components, such as a template, text, image, or other media rich creative asset that may be collected and/or otherwise entered into the system, and may be published or posted, such as via transmission through a user accessing a suitably configured user account, e.g., at the group, individual level, and/or the like. In various instances, the advertisements and/or advertisement components may be scored and stored, such as in a structured and searchable database prior to use.

Additionally, in creating an advertisement, one or more parameters of an advertisement campaign may be set up. For instance, the desktop interface may be used to select one or more objectives for the advertisement campaign and its generated advertisements, such as increasing brand awareness, extending reach, surging traffic, generating views, looks, shares, likes, lead generation, increasing inferences and conversions, and the like. Particularly, the project dashboard 22 may be configured for allowing a user to control a variety of different actions pertaining to the building of an advertisement campaign including the generation and distribution of advertisements, such as with regard to selecting one or more objectives for the advertisement campaign, such as: brand awareness, reach, page or content likes, engagements, conversions, e.g., web conversions, lead generations, web traffic, image or video views, and the like. However, in various embodiments, these factors may be determined by the system, autonomously generated, and simply provided for approval and selection by the user. Likewise, audiences for targeting can also be selected at the GUI.

For example, a recipient or an audience to be targeted may be selected based on a user's, e.g., potential consumer's, online activities, including what websites they have visited, what online products they have purchased, what online searches they have performed, or audiences may be determined based upon known customers that have visited the promoters webpage, follow the promoter, or have otherwise informed the promoter that they are a customer or are interested in receiving information from the promoter. In particular embodiments, the audience group to be targeted may be imported from one or more known customer lists, such as via a suitably configured customer relations management (CRM) tool, a social media following, and the like, for instance, via an application programming interface (API) or software development kit (SDK) interface. Lookalike audiences may also be set up.

Accordingly, in various embodiments, the system may be configured for allowing a user to create one or more specific audiences to be targeted with the generated advertisements. Such audiences may be specified by a number of different characteristics and/or identifiable demographics, which may be selectable based on one or more ranges, e.g., related to one or more of: age, race, gender, language, income, interests, locations, behaviors, or other such user characteristics and demographics. Such data may be useful because it allows for dynamic targeting of advertisements to particular users based on demographics, including selected geographic ranges.

Furthermore, the advertisement and social media accounts to be used in setting up the advertisement and running the ad campaign can all be configured, e.g., at the GUI of the dashboard interface. In this manner, the desired social media account can be assigned to a selected ad account, and individual locations and groups for targeting the campaign can be selected. Various metrics for evaluating and determining the success of the advertisement campaign can be presented at the dashboard interface. Particularly, the system may include a data collector 12 and/or employ webhooks, such as a web crawler, that may be employed to determine the successfulness of the advertisement and/or the campaign.

Additionally, a geographic range may be defined so as to distribute advertisements within a defined radius, location, region, and the like. The range can be defined by the user or be determined dynamically by the AI of the system, such as based on a desired reach or other advertisement campaign objective. As indicated, other data may also be considered when determining an appropriate audience to target, such as with regard to their prior online use data, including their search histories, the websites they have visited, the searches they have performed, the products they have purchased, and the like. Hence, the system, e.g., via the dashboard interface 22, can be used to create and save audiences, including custom and look alike audiences, for the promotion of highly targeted advertisements.

Additionally, as can be seen with respect to FIG. 1C, the communication being built, configured, and formatted can be rendered substantially real-time, such as for display via an in application review panel. For instance, the desktop interface may be configured in a variety of manners so as to present a multiplicity of options to a user with respect to building, generating, and/or distributing a communication to one or more defined audiences. Particularly, a format selector may be presented so as to allow a user to select a format for the media components to be employed in generating the advertisement, such as in a dynamic text, image, graphic, video, carousel, and/or other media rich content format. Such content can be generated by or otherwise uploaded into the system. In various instances, the media rich content may be configured dynamically, e.g., by a generation engine of the system, such as to be automatically.

Likewise, various texts elements may be encoded and/or added, such as by entering free-form language into a text box, as depicted in FIG. 1C, such as for describing a headline, setting forth an interactive URL or call, such that when a viewer of the advertisement, e.g., a consumer, interacts with the advertisement, the consumer is brought to a website, e.g., a seller's webpage, for viewing. The advertisement may also include one or more links that may be interacted with by the viewer. One or more objectives for the advertisement and/or campaign can be selected as well, such as with regard to increasing brand awareness, reach, traffic, views, impressions, conversions, page likes, and the like. As indicated, a preview display may also be presented so as to show how the advertisement will look and fell as each element is selected and defined.

Metrics may be generated and/or displayed such as where the metrics may include the number of advertisements generated or to be generated, the amount to be spent, such as per advertisement, the reach to be gained or gained as a result of an advertisement campaign, the cost per result, and other results, all of which may be displayed and controlled by the dashboard. Additionally, various different recipient characterizations and/or demographics, such as of the target audience and/or the audiences who responded to the advertising campaign, can also be presented for review by the user. Such demographics may include: age, gender, economic status, occupation, biographical information, characteristics, and the like. In particular instances, various metrics may include the above references, such as engagement and reach and the like for men vs. women and/or for the following age tiers: 18-24, 25-34, 35-44, 45-54, 55-64, and 65+, and various combinations of the like. Such engagement data may include consumer data in response to the advertisement and/or its contents, including: comments, shares, posts, likes, page likes, link clicks as well as volume of placements per social media modality.

As indicated, in various iterations, the system 1 and one or more designed conversation generation engines, e.g., smart chat bots, may be configured for automatically and/or autonomously generating the advertisement. Particularly, in various instances, the advertisement may be generated, automatically and/or autonomously, in accordance with the users instructions, whereby the project builder 22 implements the received instructions. Specifically, the conversation builder may be configured for automatically and/or autonomously selecting a media component from the memory, e.g., based on its score and/or determined effectiveness results data.

For instance, in various embodiments, the platform may be configured for autonomously generating and/or distributing advertisements. Particularly, the system 1 may implement and/or otherwise use a scoring regime by which to select media elements in generating the advertisement. For example, the system may be configured for using high scoring media elements, such as media components, in the generation of advertisements and/or other communications. In a particular implementation, the platform and/or its systems may be configured for collecting content, evaluating the content and/or scoring it, such as based on metadata collected that pertains to the media elements collected and/or the website and webpages from where they are collected. Specifically, the system may be configured to evaluate the media elements, e.g., the media components, such as based on collected metadata, and may score and rank them for easy storage, access, and use by the system when generating an advertisement or other communication.

More specifically, the AI module, e.g., a machine learning engine, of the platform may be configured to analyze the content items, determine their subject matter, and an inference engine of the system may be configured to evaluate the content for use as an advertisement and/or other communication, and an AI associated autonomous project builder can then generate the advertisement and/or communication in such a manner as to express the same or similar theme to the data collected and/or the source from where it was collected, such as including the same or similar subject matter, tone, look, feel, and the like. In various instances, the new advertisement and/or communication can be generated autonomously, or manually, into a completely new communication having content similar to, but different from the collected content elements but expressing the same general idea. Particularly, collected and/or scored data may be automatically and/or autonomously embedded with code, formed into one or more of a template and/or media components, and can be compiled so as to generate a communication, which can then be distributed to one or more system defined target recipients.

Accordingly, in view of the above, the system provides a platform, such as a single user interface, which integrates all the various communications taking place throughout an organization, such as with regard to generating, reviewing, and transmitting, e.g., distributing, communications. Such communications can include any form of content, such as pertaining to advertisement content, which content may be directed to one or more potential consumers, e.g., communication recipients. The system, therefore, may be configured for not only generating communication content, but also for tracking its transmission throughout an "offline" and then an "online" environment.

Particularly, communications, and the content from which it is composed may be tagged and tracked throughout an organization, and once incorporated into a communication, it can be tracked throughout its distribution. More particularly, the present system is configured for tracking a transmitted communication throughout its engagements along with those who interact with the transmitted communication and its content, such as with regard to the leads generated thereby and the tracking of all of the interactions that subsequently result from the initial contacts being made. In various instances, the tracking may be facilitated by one or more keywords or sentiments upon which the content is built.

A particular advantage of the present system is its unique hierarchical processing infrastructure that lends itself to increased scalability. Particularly, the system may include a computing device, such as one or more servers, such as a server bank, that each includes a series of processing engines that are configured for collecting, scoring, generating, distributing, tracking, and evaluating content, as well as those who engage with that content, throughout a large number of offline and online environments, such as social media pages of a wide range of locations, and with respect to a great multitude of online consumers. In this regard, the system is configured for communicating and tracking a number of customers of a business, over a wide variety of geographical regions, substantially simultaneously, but with unique catered messaging.

Accordingly, in one aspect, provided herein is a system for not only generating communications, but also for tracking their transmission. Further, not only are the communications themselves tracked, further, the sentiments those communications provoke by its recipients is also tracked, especially with respect to the sentiments they evoke, such as where those sentiments affect the reputation of the communication generator and/or the business organization they represent. Further still, where required to enhance that reputation, the system may additionally engage in an automated responder to autonomously generate and/or transmit a follow up communication to one or all of those who have engaged with that communication.

Specifically, the system may be configured to track the reputation of the communicators, and where it is deemed useful, the system can respond by recommending and/or generating responses so as to buttress, protect, and/or to enhance the reputation of the communicator with regard to those communication recipients who respond with their own communications, such as in a negative or positive manner to the original communication. Particularly, the system may employ a variety of methods by which to keep track of how communication recipients conduct themselves online with regard to the platform users and the communications they transmit, such methods may include keeping track of the purchases they make, e.g., the point of sales data, keeping track of their engagements with the communicator, such as via a consumer resource management (CRM) module, based on the loyalty programs of which they are a members, and the like.

As explained in detail herein below, therefore, is that in various embodiments, those who engage with the communications of the system may be tracked and scored as a manner of determining the level and frequency of individualized response by the system, such as based on the score for each individual communication recipient. Accordingly, persona scoring may be implemented by the system so as to determine the type and level of individualized attention to be directed to individuals that not only receive the communications generated and transmitted by the system, but also engage with them in some meaningful manner. In various instances, social data, e.g., based on a user's interaction with one or more social media platforms, pertaining to communication recipients can be used to authenticate users and to generate a persona evaluation and score for those individuals that engage with the system and/or the communications thereof.

Hence, the system may be configured to not only track communications, but also to track those who engage with those communications, how, when, and in what manner, e.g., with regard to the sentiments conveyed and/or actions taken, in response to receiving the original communication. More particularly, in various embodiments, the reputation of the communication recipients and/or responders, such as with regard to the way and how much they engage with the communication as well as their social influence. For instance, the system may take into account the online presence of the communication recipients, what products and/or services they have purchased, how much they have spent and how often, as well as what kind of products and/or services they have engaged with or viewed online, and further, what kind of brand loyalty they have evidenced.

Likewise, where certain communications are performing well, the system may perform an analysis and increase reach and engagement by boosting the communications number, style, and frequency of the same or similar communications. For example, where a company has made an investment in a certain amount of advertising that has evidenced signs of success, the system may make a determination that by increasing the investment in further like advertising may result in additional gains. Thus, the system may not only determine and allocate a budget, such as for running a communications campaign, but may further perform an analysis and recommending re-allocation as well as increasing or decreasing the budgeted allocation, such as based on needs and/or performance. In a manner such as this, one or more determined objectives, such as increased sales, brand awareness, and consistency in messaging may be ensured and optimized by the platform of the system.

Particularly, the system can perform a predictive analysis whereby content, new or previously used, may be evaluated along with one or more audiences, and based on those predictions the system can suggest not only what to post, but who to post it to, what to post it on, e.g., which social media platform, how to post it, such as within which context, as well as when to post it, e.g. based on the peak times for that poster, to those audience members, and upon that determined platform. Hence, all of these variables may be determined, weighed, and/or scored when determining the parameters with regard to distributing content, such as via mass distribution, private posting, and/or direct messaging. These analyses may be made a new for each posting and/or each poster, or may be follow up analyses, and the analytics being run may be for a given period, such as over a day or days, week or weeks, or months or years, and the like.

Accordingly, for these purposes, the platform may include a dashboard interface, such as for interacting with one or more computing and/or storage facilities, e.g., servers or other computing devices, of the system. In various instances, the dashboard interface provides a number of tools for setting up and running the system as well as for directly engaging with and controlling the communication generation and distribution process, in a uniform manner. In order to perform such consistent but unique communications tasks, it is important that all communication content, e.g., messaging, for a brand across business entities and locations be performed through the integrated communications platform of the system. Hence, a key feature of the platform involves one or more user interfaces that allow for rapid and intuitive onboarding of all company entities along all various different locations so as to access a customizable dashboard by which communication elements can be viewed, manipulated, configured, and transmitted.

The present platform, such as via the dashboard interface disclosed herein, is configured for allowing a user to generate, or to auto-generate, new communications by which to respond to messages conveyed by recipients in response to original corporate communications online, such as via personalized response generation and/or the implementation of a canned response system. The system, therefore, may be configured for allowing a communication generator, e.g., system user, to review, edit, and change or otherwise modify content prior to distribution to a consumer recipient, based on a number of factors, such as a performance score, recommendation model, and/or conflict check. These factors may be particularized to corporate considerations, local community conditions, geolocation on a national or communal scale, based on company messaging or messaging to one or more particular consumer's or consumer types, such as loyal customers and/or social influencers or company goals, as well as based on frequency and content of prior messaging, e.g., conflicts checks.

For example, such company goals to be achieved by corporate communicators may include increasing brand awareness, reach, impressions, engagements, conversions, driving sales, and the like. Particularly, these considerations may be used in evaluating and/or scoring content to be used in creating and/or editing communications, such as where the communications are to be generated and/or reviewed individually by system users or autonomously by the system itself. Such generating, reviewing, editing, and/or otherwise modifying of content and communications can include using one or more of the above referenced, or other suitable considerations, for determining whether particular content, such as text or image content, should be used within a given context, such as for delivery to a particular recipient, e.g., based on a determined personal characterization profile of the recipient, e.g., regarding their social influence. Further, if various content is determined to not be adequate to achieve a particularized purpose, or if a conflict arises, the content may be modified, or be suggested for modification by the system, whereby the identified content to be changed may be swapped or substituted with content that is adjudged to be more suitable, e.g., given a particularized context and/or goal to be achieved.

In these instances, the present platform is useful for both small and large companies and even individuals that need to ensure very consistent branding across their entire portfolio of locations, so as to have very specific, coherent language throughout their organization, but may also want to be able to customize that language to each location and/or to customize messaging to each specific recipient. Specifically, as presented herein, the desktop platform provides optionality with regard to how communications are generated, allowing them to be constructed free-form by a system user, providing recommended content to the system user, or for generating the communications themselves, either by providing a user interview to determine the objectives of the communication or by an automated communication generations module, such as via the intelligent smart bot communications system provided herein.

For instance, the communications platform of the system, being employed by an organization may receive an incoming communication from an individual, e.g., a consumer, the system may then parse the communication for identifiable characteristics of interest, which may then be flagged for immediate or future follow up. Particularly, in various instances, when an online consumer accesses a communications portal of the organization, in response thereto, the communications platform can then access the identity of the consumer and pull up data particular to that consumer. This data may then be fed into the content generator and may be used in catering a response to the consumer's communication, either by freehand or by system generation, where the response may be finely tailored to the particularities of that consumer.

All of these and other such interactions and communications, with respect to the messaging of the platform, can be tracked by the system, and the results of this tracking can be stored and fed back into the CRM so as to further be used to characterize the recipient, messaging proven to be effective in relation to the consumer, and in view of the same, better structure its business relations with each individual consumer. However, although useful for aiding in communication generation freehand, often times, the amount and extent of communicants needing to be communicated with, and thus, the amount of communications needing to be generated and/or otherwise run through the system, be reviewed, approved, and transmitted, can overwhelm an organization. The present platform solves this problem, in part, by use of automated communication generation engines, e.g., bots that, in particular instances, rely on a dynamic artificial intelligence unit that both provides on-brand message consistency but also ensures individual communication specificity catered to each given recipient in a manner that scales.

Not only do the bots in question generate and/or transmit communications, the communications are engineered to evoke a conversation and then to drive that communication toward a determined and/or selected outcome, the results of which may also be tracked by the system. For instance, this process may involve sequestering inbound replies to communications from consumer recipients of messaging, the replies may be parsed, such as by a natural language processing element, e.g., based on key words or phrases used, and through the directed selection and/or generation of responses can intelligently direct the conversation toward an end goal so as to funnel the consumer conversant to a desired action. Such natural language processing may be keyed off of keywords, phrases, expressed or implied sentiments, feedback, and the like.

Accordingly, in various instances, the communications of the system, whether autonomously generated or generated free hand, may be crafted so as to not just answer a consumer's inquiries but to also funnel a communications recipient toward engaging in a determined action. The action can be any determinable action such as taking those actions that advance the commercial interests of the business, such as increasing impressions, e.g., viewing an advertisement, reach, engagement, conversions, making a purchase, booking an appointment, sign up for an email, and the like, and in response thereto, where a consumer engages in the desired action then a determined reward, e.g., a coupon, may be transmitted to the consumer for engaging in the desired behavior. The system can then schedule a more individualized and/or in person follow up such as involving a follow up phone call, email, or other message being sent, e.g., a coupon or other discount being proffered, so as to encourage the purchasing of a product or service.

Particularly, the system may be configured for not only generating communications, but for generating an advertisement campaign along with all of the activities pursuant to running the campaign, including the development of one or more workflows that may be implemented in running the campaign, which workflows may include data collection and aggregation, generating a context for a communication, generating a communication, e.g., via a communication builder, calendaring all of the events leading up to running advertisement campaign, as well as scheduling the mass distribution of advertisements and other communications, performing one or more conflicts checks, such as based on content, geography, timing, and location, and tracking and determining of how the communications are received by one or more recipients.

Accordingly, in another aspect, the system platform may be configured to perform social listening such as for the purpose of protecting and enhancing the reputation of business communicators as well as to drive internal and/or external chatting toward a chosen goal. Likewise, in various implementations, the communications of the system, both original communications and responses to the replies thereof may be set up to be reviewed and approved prior to being sent out. However, in various instances, there may be a pre-approved content and messages, such as is selectable from a library of preapproved communications, that can be sent without the need for further review and/or approval, such as where the responses are selected from a prefabricated list of pre-approved communications.

Provided herein, therefore, is a platform that is configured for intuitive content recognition, recommendation, and/or autonomously generating and transmitting numerous messages to numerous customers at numerous individual locations all at the same, or a different, time, where the messages are particularly and uniquely accommodated to the individual recipients, their individualized situations, but also consistent across brand locations globally. As indicated, the messages and/or other content to be generated can be personalized to the recipient based on one or more of their location, their online presence and/or activity, communications they have sent or responded to, and/or one or more advertisement campaign particulars currently being administered by the system.

Particularly, in various instances, the system is configured for generating and/or transmitting communications, e.g., an advertisement, to one or more recipients, where the transmitted communications can be designed to provoke a reaction from the recipient, such as to funnel the recipient, e.g., consumer recipient, through a decision tree to a final decision to act in a proscribed manner. The communication may be any form of communication, from a simple message response to a query to a lead generation form, to a full-blown correspondence. Likewise, the communication can be generated for mass distribution, transmission to a group, or even directly to a specific consumer, such as via direct messaging. For instance, the communication may be an advertisement, including a lead generation form, which is designed to elicit an indication of a degree of interest of the recipient of content being advertised for sale. In such instances, the reaction of the recipient may be an engagement with the communication, where such engagement may be tracked by the system, and may indicate that a follow up communication personalized to that individual may be useful in consummating a transaction.

The system, therefore, may be configured for generating a communication, or other communication content, that is focused on the particularities of the individual and the context of their earlier interactions with the messaging of the system. Such particularities may include a characterization of the individual, including their characteristics, their past online usage, purchases they have made or not made in response to advertisements received or other communications they have had with the communications generators, and the like. All of this data may be collected and analyzed so as to generate a persona score for the individual, which score may then determine how and by what manner the system or its operators respond or otherwise reply to the individual. Such user and/or use data, including point of service data, may be tracked, stored, scored, ranked, and/or made accessible to the CRM system of the organization.

This information, and other such data collected by the system, can all be used to inform or recommend user crafted communications and/or to automatically and autonomously generate a communication by the system that is personalized to the individual characteristics of the individual consumer. For these purposes the system may include a series, e.g., a pipeline or daisy chain, of processing elements that are arranged in a manner so as to implement instructions for data collection, data aggregation, historical analysis, such as collection and analysis of customer resource management and/or point of sale data, customer tracking and persona scoring, such as for determining what type and/or form of communications to generate and/or transmit. Accordingly, in view of the above, the system may be employed by a company selling a product or service so as to manage communications throughout the system, and in so doing, the system may be configured to access and retrieve data from, such as through direct connection with or over a network and/or suitably configured application programming interface, a customer relationship management module of the seller.

Figure 2:
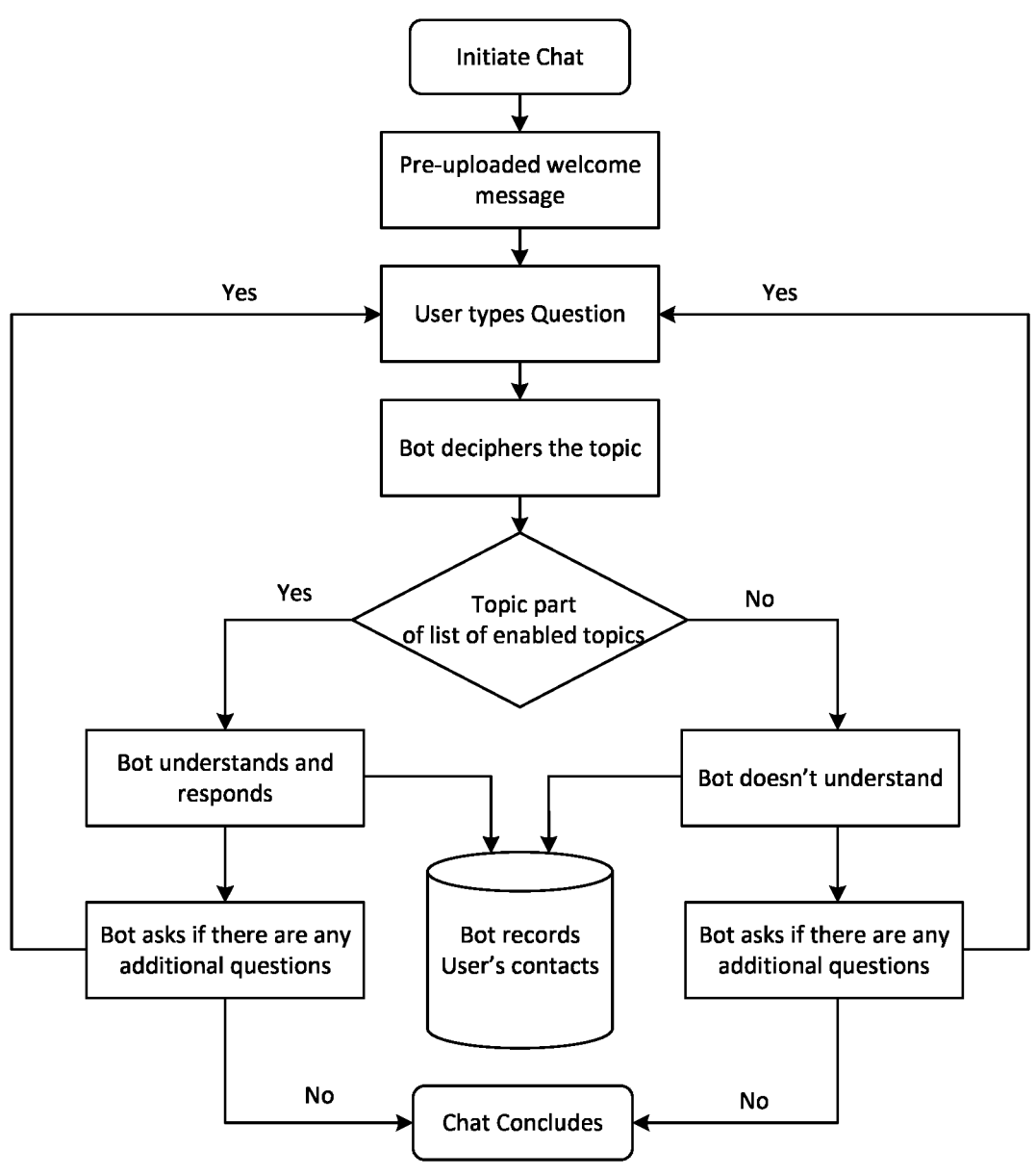
FIG. 2 is a process diagram for an implementation of an autonomous communication generation methodology of the disclosure.

Accordingly, as can be seen with reference to the above, and with respect to FIG. 2, a method is provided whereby a goods and/or service provider may employ, or the system itself may employ, an automated communication generation module, which in some instances, may be a chat bot interface that may be configured to communicate with a consumer visiting a web page of the goods and/or service provider. Specifically, in one use instance, a potential consumer may land on or otherwise engage with a local webpage, e.g., a social media page, of a business organization, such as of a local franchise of a large multinational conglomeration. Upon arriving at the webpage, a communications moderator may engage with the consumer, or in other instances, a chat or smart chat box interface may be presented to the consumer on the webpage or social media platform, and a pre-uploaded or newly generated message may be delivered to the consumer via the moderator or chat box interface. In particular instances, the message may be specific to the location serviced by a local business provided by the organization and may be particularized to the consumer, such as where the consumer has previously engaged with the system and/or been previously identified. Particularly, as indicated, these steps may be repeated sequentially or simultaneously for any number of viewers engaging with, or otherwise accessing, any number of pages of the business being serviced by one or more system administrators and/or chat bots of the system.

In response to the initial messaging from the business entity, e.g., the opening greeting, the visiting consumer may type a question in freeform format, or may select from a menu of previously generated questions from which they can select a topic of conversation. Such prefabricated topics of discussion may be directed to commonly asked questions, such as including hours of operation, location, direction, inventory availability, appointment times, and the like. Any of a number of topics may be authorized for response by the human moderator and/or autonomous chat bots of the system. Particularly, the automated portion of the platform may access an analytics and/or artificial intelligence module that is configured for scoring, recommending, and/or generating communication content over a number of different issues related to the selling of the goods and/or services of a business organization, such as based on corporate and/or local standards and rules.

Specifically, whether a communication is to be entered into the system by a user, selected from a preapproved list of responses, and/or suggested or generated by the system itself, the communication, or its content elements, may be subjected to a predictive model so as to determine a performance score for the content and/or for the recipient. In a manner such as this, a user, e.g., communications generator, may type in freehand or select content elements by which to generate a communication, and a substantially real time score may be given evaluating how that combination of content elements is expected to perform, and one or more suggestions may be made by the system so as to enhance the score by changing the various content items. For instance, suggestions may be made based on a predicted costs bases versus projected return on investment, whereby all the different variables may be weighed and shown how making one or more changes affects the scoring and/or return on investment.

Hence, the communication campaign may have layers of scoring and costs that can be counter-balanced by an increasing return on investment, such as based on a page by page and/or platform by platform model. These models may be generated via a machine learning module of the system, which model may be used to generate one or more predictions, such as to how a communication will perform, such as how closely the communication will meet the needs of one or more recipients, which predictions may be based on prior actions taken, communications responded to, by the recipient. Consequently, in an automated use model, performing the function of answering the questions of consumers, such as consumers visiting the corporate or a local social media webpage, the autonomous chat bot may be trained to recognize the subject of the question, determine the appropriate corresponding topic, and the question in need of being answered with regard to that topic.

In such an instance, the chat bot may be configured as a smart bot that may then access the AI module of the system, and the appropriate answer to the question can be searched and looked up, such as in a structured database. Likewise, the appropriate, e.g., best fit, answer may then be returned to the chat bot, or in some instances, to a communications moderator of the organization, for approval and/or presentation to the consumer. Particularly, in various instances, a chat bot may be provided, such as where the chat bot may be provided with intelligence, and thus, may be a smart bot. Specifically, as disclosed herein, a smart bot is an intelligent communication interface that may be run in conjunction with a content generation module of the system so as to generate autonomous, intelligent communications in response to consumer queries.

Accordingly, in one embodiment, a series of processing engines may be arranged to form a communications interface through which communications with a consumer may be conducted, by one or more smart bot clusters. More particularly, these processing engines may be inter-related and arranged to form one or more smart bots that form a module that is configured for aiding a service or goods provider with regard to automatically and/or autonomously controlling communications with their consumers. For example, in one implementation, the smart bot may be an interface that presents a chat box to a consumer who may be interested in purchasing a good or service from the webpage with which they are engaging. Direct messaging may then take place between the consumer and the system, or a live person utilizing the system on the backend, so as to answer the individual's immediate questions and/or help them through the purchasing of a product in an intuitive manner.

In certain implementations, the messaging content is configured to be constructed in a manner that allows for the rapid generation and deployment of communications, such as by using a distributed communications architecture where by a generalized template is generated and constructed to have several different layers, where each layer may include one or more containers, e.g., functionalized containers, into which content can be called, such as from a structured data base, such as in response to a consumer query. The calling of content can be made even more rapid by the natural language processors, image recognition, and the tagging of content, phrases, sentiments, keywords, and the like, and storing them in a dynamic, structured database, such as a nearest neighbor data structure, such that based on the tagging and/or a score associated therewith, rapid communications can be assembled, and based on the distributed architecture of the template, the communication can be rapidly distributed, broadcast, or otherwise transmitted across one or more social media platforms by one or more chat bots of the system. In such an instance, one chat bot may service tens to hundreds to thousands of locations.

Likewise, because of the dynamic nature of the texts and images deployable by the system, the communications can have a general, universal look and feel, but may also be location and/or consumer specific. In a manner such as this, a single dashboard interface, and/or a single chat bot interface can manage thousands of communications across a thousand of pages, across a single or multiple platforms, such as where the template may be the same but the content may be particularized. Such individualization can be with respect to individual communication recipients, locations, addresses, prices, images, specials and coupons being run, and the like.

However, as previously implemented, often times the chat bot interface was manned by a live person. But, given the advanced artificial intelligence module of the system, and its system wide accessibility, in the present iteration, a chat bot of the system may be partially or completely automated and run 24 hours a day, 7 days a week. This task is complicated in and of itself and is made even more complicated when it is not only one but thousands of consumers communicating with not one but thousands of locations from not simply one but tens to hundreds, to thousands of brands or associates thereof. Nevertheless, in typical iterations, chat bots are not capable of being deployed in a mass manner and/or across social media platforms, because such bots are typically built for a single use and customized for a specific platform only, such as for handling correspondence for a single location. This is made even more problematic when handling the mass communications of a national brand having thousands of locations, which would require thousands of chat bots, which would be prohibitively expensive. The present autonomous smart bot module therefore is configured for overcoming these problems, and are thus, configured for being scalable, upwards and downwards to handle the online demand across the system, where one or more different automated chat bots may be responding to communications being run across several different interfaces of a national brand, each dealing with an individualized consumer in a personalized, localized, and catered manner, such as where answers to various queries can be generated and given in a personalized and location dependent manner, autonomously, such as via an autonomous, intelligent smart bot.

In essence, live chat bots being run by live humans, as well as thousands of chat bots being developed and run across a single platform are expensive to manage, maintain, and keep up to date with the most pertinent information across a company's broad consumer base. Nevertheless, it is important in these instances that the corporate brand representatives have a clear and consistent messaging throughout the organization and particularly with its consumer base across the nation. The instant autonomous chat bot module includes a plurality of processing engines that collectively are configured to work synergistically to ensure consistent messaging across a platform in an economical, efficient, and consistent manner across all brand locations, such as when answering consumer inquires.

Accordingly, the present system is configured for rapidly determining subject matter of interest, determining a query related thereto, and expeditiously selecting an answer so as to answer the query. Once an answer has been rendered to the consumer, the consumer may then be asked if the returned response answers their question, and/or to rate the response, this rating may then be fed back to the AI module so as to better train the machine learning and/or inference engine units, to thereby better generate one or more predictive models, and/or to answer any further questions the consumer may have, such as by repeating the process. If a question and/or topic thereof of a consumer is not recognized, the chat bot may kick the query over to a live agent, e.g., communications moderator, to respond thereto. In such an instance, the data derived therefrom may be used to further train the model to recognize the topic, question, and answers in the future.

Consequently, the chatbot may be configured not only for mass deployment, but also for funneling conversations toward a determined objective. Likewise, as discussed with respect to FIG. 2, a chat bot of the system may have access to a company's CRM and/or consumer database having location and consumer specific data, whereby various local consumers may be tracked, such as with respect to their interactions with the local or global brand, and with regard to how they respond to messaging therefrom, what kind of communication they engage with, what kind of products they buy, and how advertising has affected them and their behaviors in the past. For example, the system may be configured to follow the and evaluate the social media posts of its consumers, whereby various words and/or sentiments they express can be tracked, such as with regard to products they review, products they say they need, sentiments they express as regards to products or services, based on words they use, images they post, reviews they posts on other sites, such as YELP®, FACEBOOK®, TWITTER®, INSTAGRAM®, and the like.

In various instances, the topics the smart bot is enabled to engage with may start with a few pre-defined topics, but as the number of consumers and/or the number of bots interacting with the consumers of the website, or one or more webpages thereof increases, the topics under discussion, and the replies determined to answer their inquiries may increase, and the smart bots, once their training is increased, may be used by the system to generate further topics and responses thereto that can be addressed by the smart bots of the system, such as via a suitably configured machine learning and/or predictive inference engine model of the system. Hence, a variety of ancillary and/or related topics can also be identified, and once identified the system may be trained to recognize and effectively respond to queries being made in relation to those topics. This process may be repeated until the consumer has no further questions, and all engagements with the consumer during this process can be tracked and fed back into the system, e.g., to a CRM module thereof, to better define one or more characteristics of the consumer, so as to better craft personalized messages to that consumer in the future. In such instances, the consumer in question may be flagged as a lead for future follow up, and/or for direct action being taken, such as by immediately offering them a refund, new or revised product, and/or a coupon (such as in the case where a competitor has issued them a coupon).

In a manner such as this, consumers may be tracked throughout the course of their engagements with the organization and the communications thereof, and as introduced above, in certain instances, the consumer may be scored, such as with respect to the quality and extent to which they should be engaged with via human or machine crafted communications and follow up. For instance, a unique problem has arisen whereby advertisement functionaries of various consumer brands are faced with an inundation of content they can use for generating communications to be sent to their consumers, but often times have no way of evaluating that content. So being, the system can overcome this problem by evaluating and scoring content that can then be categorically stored within a library of the system, and may be made available for use by the system, or a user thereof, in generating one or more recommendations to the user of the system that is generating communications.

In such an instance, various communications content can be recommended and presented to the user via the dashboard interface, such as where the content to be recommended can be scored, and a predictive analysis, as explained herein, can be associated with the content and can be presented to the user so as to give them a basis as to what the predicted outcome of employing the recommended content in the communication is likely to be. Such recommendations can be made based off a number of different factors, such as one or more identified characteristics of a message recipient, and/or a correspondence between the identified characteristics and the page or platform to which the communication is to be posted. These factors can then be further correlated with the content to be recommended, such as by using a best fit scoring model so as to select the best content for the particular message recipient and communication platform.

In certain instances, the correspondence is based on one or more tags, such as based on keywords of relevance and/or other embedded content. Tagging, in this instance, helps personalize the various elements of the system with respect to generating communications, and may be based in part on past behaviors of the system, its users, message recipients, and the like. These data may not only be used for generating communications, but may also be used in scheduling operations, calendaring communication approvals and distribution, and follow up with regard to message recipient. Such content and characteristics can be embedded with coding for identifying relevant categories for storage, identification, and recommendation for usage, such as where the content may include words, phrases, sentiments, e.g., likes, upvotes, comments, images, and/or abstractions of the same, etc.

Accordingly, in various implementations, a user of the system may be engaging the dashboard interface by typing in freehand content to be used in building a communication, the platform may be evaluating that content, e.g., substantially real-time, whereby the system may automatically suggest content, such as scored content, that has been evaluated so as to be of interest to that user, the business entity they represent, the message recipient, and/or the platform by which they are engaging with content, e.g., the social media platform. Hence, as the user enters words into a text box at the graphical user interface, the system performs a natural language analysis of the words, identifies relevant key words and images, and performs a search of one or more categorical data structures so as to return results that are analyzed and predicted to be of relevance to the communication being crafted, which results may be in text or image format.

Such searching and results may be based on tagged metadata and the natural language processing, as well as a scoring of correspondence where the more closely the entered data relates to the stored texts and image data the greater the score multiplier will be, and thus, the greater the weighting of relevance will be, and likewise, the greater the probability that the suggested content will in fact be relevant to the communication generator and/or the message being communicated. Where the suggested content is selected for use, its overall weight may be increased, but where it is not selected, its weighting may stay the same or be decreased. In this manner, the score may account for its past performance, and based on the score, content can be provided to the user for suggested use or not, which helps the user narrow down the options provided for review and selection. Hence, text and image data related to the text being entered may then be returned for review and selection for use by the user, e.g., such as where the results are filtered at a selected threshold.

Specifically, based on image and/or textual word recognition, a number of suggested textual or image data may be provided to the user, such as in a list of potential content to be used in the building of the communication. In various instances, pairs of words and sentiments may be evaluated and used to match and or create continuity of context for the crafting of the communication, which words, phrases, and/or images may be presented in a decision tree formatted data structure or other data structure. This content to be recommended may also be paired with recommendations for the audience to be targeted, the platform for distributing the communications, and the peak time for posting the content.

In various embodiments, the system may be configured for performing a predictive analysis on the communications, and data pertaining thereto, being generated and transmitted throughout the system. For instance, past communication messages and content items can be collected, they can be parsed, reviewed and analyzed, and each content element as well as the entire communication can be scored, the keyword elements can be identified, tagged, and used to store the communication elements, such as in a structured database. Particularly, past communications of what has worked can be reviewed, as scored and tracked with regard to its past performance, such communications can be broken down into its messaging content and component parts, and each element individually and the communication as a whole can all be evaluated and scored.

These communication elements can then be recombined and/or used to generate new messaging and based on their individual element score elements can be used to predict future performance toward achieving a defined system objective. For instance, communication elements can be reviewed and analyzed so as to determine what type and parts of messaging will work in the future, a score may be given to these messaging elements, and they can be stored in a nearest neighbor data structure whereby when a new communication needs to be generated, the database may be easily searched, communication elements identified and a new communication can be assembled in a manner that is predicted to evoke a particular type of response, such as based on its score. Particularly, the analyses engines described herein can identify the characteristics that make content good for particular users, the communications can be transmitted to end users, and feedback can be retrieved to determine how well the communications worked to achieve a predicted result, all of which data can then be fed back into the system to train the predictive models being employed by the machine learning engine, as well as to inform the inference engines.

As indicated above, not only may the content to be used in the generation of communications be scored, but the recipient to whom the communication is to be sent may also be evaluated, which evaluation may be used in determining the amount of attention to be given to any particular, potential communication recipient. Hence, the system my not just simply score content or interactions with content, but the recipients themselves may also be evaluated. For example, the system may include a reputation and/or social listening module for collecting sentiments and data by which to determine the social influence of one or more recipients.

Accordingly, in one aspect, provided herein is a set of predictive analysis engines that are arranged together so as to form an analytics and/or artificial intelligence (AI) modules for making one or more predictions as to how any given communication will perform towards achieving a determined result. For example, the system can be configured to evaluate proposed content to be used in generating new communications, to predict the performance of new communications, and can determine whether the proposed content is likely to be well received or not by an identified recipient, such as based on an analysis of previous performance. For instance, in one instance, in evaluating past performance, a communication recipient can be given an opportunity to evaluate the performance of the communication, or evaluations may be inferred by the conduct of communication recipients.

Such evaluations can then be used to evaluate of new communications being generated, whereby a user can submit a proposed communication write up for evaluation, whereby the system can compare the write up to past postings and thereby determine a percentage correspondence and likely response thereto and/or can propose new or modified content that the system deems may lead to an increased achievement of an objective. Particularly, the system can analyze generated content, score the content, and generate a recommendation as to whether to use the content or to modify the content. The system can also propose new content to be added and/or changes to the proposed content.

In various instances, this process can be repeated a number of times, and be subjected to a machine learning protocol, which when trained, can be used to autonomously generate and distribute automated communications. Hence, the system may be configured for not just determining what to post, but also predicting its likely successfulness for achieving a determined purpose, as well as predicting the best time at which to distribute the post. The content can then be tagged, tracked, and recipient response can be collected and used to evaluate the actual response in view of the predicted response and thus be further used to train the machine learning module and to better employ the inference engine in making predictive analyses. In this manner, a personalized identification, personalized evaluation, and personalized scoring and recommendation system may be presented to a user in need thereof so as assist users in the production of communications.

For example, the content to be evaluated, scored, and/or to be recommended to a user of the system may be personalized to the context of the user, the nature of their business, and with respect to one or more characteristics of their consumers, such as with respect to the goods and services they provide, their geographical locations, the webpages upon which the communications are to be distributed as well as the timing of its distribution. Specifically, in one use model, content to be recommended and/or integrated into a communication being crafted may be identified using one or more filters, such as a keyword, geolocation, content, subject matter, topical, categorical, or other type of filter, whereby as a user is crafting the communication the identifiable material can be recognized, which recognized material may then be used to search one or more of the structured libraries so as to easily locate material to be suggested for use in crafting the communication. The recommendation engine may then retrieve that material from the one or more libraries and present it as a recommendation for use in the communication, such as a popup file.

Particularly, in various instances, the system may include a reputation module 40 that is configured such that once distributed the reputation manager can screen for comments, postings, or other evaluations pertaining to the newly generated and/or distributed content and when occurring can collect and assess the posted evaluative data. For instance, the system may include a series of processing engines that can be configured as a reputation manager, whereby the reputation manager may oversee communication recipient response and filter for reputation sentiment of how recipients are feeling about the business organization communicator. Where a reputation significant communication is identified, the system may schedule one or more tasks to be performed based on the received feedback data, such as whether to use or not use the generated content again, or to modify the content, and/or feed the data to the machine learning protocol prior to further use.

Likewise, not only does the reputation manager evaluate the reputation of the business organization initiating the communication, but can also evaluate the reputation of those communication recipients that respond to the communication. Specifically, the reputation manager may be configured for assessing the reputation of a communicator, such as a person or company generating content to be distributed by the system, such as by being posted on a webpage, or a person commenting on a post. In either instance, user's engagement with the content can be tracked, such as with respect to the content itself and with respect to one or more characteristics of a person engaging with that content. More specifically, for a content generator, the system may analyze the usage models of the content generator, learn their business venture and their preferences with respect thereto, and can thus modulate the type of material being suggested to them. Likewise, for a person who reviews the content, and comments on it, the system may also track their online usage, the actions they take with respect to how they respond to the posted content, e.g., their engagement with it, how active they are, the kind of comments they make, their evaluations of the content, their impressions and conversions, how much they purchase, all of this interactivity can be tracked and used to evaluate and score those who view and/or otherwise engage with the content generated and posted by the system.

Accordingly, the system includes an analytics module that is configured for performing a variety of analytics using a larger variety of different factors whereby a determination as to how a given communication project will perform in the future, such as based on how the suggested material previously performed, and within which context, as well as its dynamic score, and the like. Particularly, once an analysis of a given communication, a given communication recipient, and/or a given context has been performed, one or more predictions pertaining thereto may be made and presented to a communication generator of the system. Various analytics may be provided, which may include evaluations, reviews, reputations, and the like, as explained herein. The reputation may be with respect to the content generator and/or with respect to a person commenting on and/or reviewing previously generated and/or published material, e.g., the communication recipient.

In a manner such as this, the user, e.g., communication generator, need not be inundated with too much content, without having a means by which to evaluate the usability of various content. Rather, the user can perform a search for content to be recommended for use, or may simply begin crafting a communication by inputting content for a communication into the system, and as that content is input into the system, its communication elements may be identified, e.g., by natural language processing, text, and image recognition, and the like, and as the content is entered it may be evaluated, new subject matter may be recommended, analytics pertaining there to may be displayed, such as scoring and/or predicted usability, all of which can be presented for consideration by the user or the system itself. Such personalization may be based not only on characteristics and/or particulars of the content generator, e.g., the advertiser and/or small or large business owner, but also may be based on the characteristics and particulars of the individual consumer, e.g., communication recipient, as well as with regard to trends determined to be related to a block of consumers having characteristics and/or particulars in common, such as based on past behaviors and predicted future behaviors.

Accordingly, as explained herein, the system may include a reputation manager that tracks what people are saying and responding to the messaging being generated and distributed using the system, which reputation manager may also track, evaluate, and score those who are potential customers, communication recipients, of the communications being generated. As such, the system may evaluate and score content, but also those who generate the content as well as those who engage with the content. Specifically, for these purposes, the system may include a persona scoring module, so as to allow the system to track and build a profile, e.g., a reputation profile, for those who post or otherwise engage with posted content, so as to score persons who engage with content, e.g., content engagers, such as consumers of products and services being proffered.

These engagement/engager scores may then be used to determine the level and type of response that should be generated and tendered to the content engager, e.g., consumer. Specifically, those consumers who are active, e.g., negatively active, and thus, do not make purchases may be weighted, scored, and classified in accordance with one level, e.g., a lower level, whereas consumers who make positive comments, and/or also make purchases can be weighted, scored, and classified with regard to a different level, e.g., higher level, where the greater the positive activity and level, the more responsive the system may be to comments being made. Accordingly, the persona scorer may be configured for scoring people and weighting them by their online activity, what content they interact with and for how long, as well as how they respond to the online content. For example, the system may review user engagements, such as the kind of reviews they make and about what, whether they are positive or negative, and how much influence they have with others, and the like.

In such an instance, the comments posted by a person with a high engagement level may be given more weight, and thus, based on the weighting, may be earmarked by the system so as to be rapidly and more positively responded to in a contextually relevant manner. A wide variety of online data may be tracked, collected, and used to weight various users, such as by tracking the web sites and webpages they visit, the content they engage with, how much time they spend with the content, what kind of commercial activities they engage in, e.g., point of sale information, their impact on social media and the like, where the firsts person's engagement evokes a chain of engagement by others in a similar and/or opposite manner. For instance, a social media impact factor may be generated for relevant users, and may be used to determine how each user should be weighted, such as based on their number of followers, how much attention their engagements evoke with respect to the engagements of others, their social influence strength, and the like, especially with respect to getting others to follow their influence.

In specific situations, those having greater weight may call for greater personal attention being given to their online postings and comments, and where there are a multiplicity of commenters, a list may be generated, and each person on the list may be scored and ranked based on the scoring, where those with the greatest score may be responded to first and with greater attention, while those with lower weight can be responded to at a relatively later time. For instance, where the consumer has a high social persona level, then a more personalized response to their engagement may be recommended and implemented by the system and its users, whereas for someone who is minimally or tangentially engaged, they may be responded to by a more autonomous communication generated by the system itself, such as an auto-response.

Accordingly, in one aspect, a persona scoring module may be provided whereby a message recipient is given or otherwise attributed a persona score, such as where the persona score tracks and considers a number of factors relevant to the consumer making the engagements, e.g., in response to received communications, and may be weighted by the words they use, e.g., keywords, the sentiments they express, including their tonality, the look and feel of their messaging, positive and negative comments they make, as well as how they engage with others and/or other webpages, and the like, such as via CRM and/or POS data collected. Specifically, persona identification, tracking, and scoring may be used to identify and stratify social influencers and or other high-level consumers such as based on their social activity and their product engagement, e.g., the purchases they make.

Figure 3A:
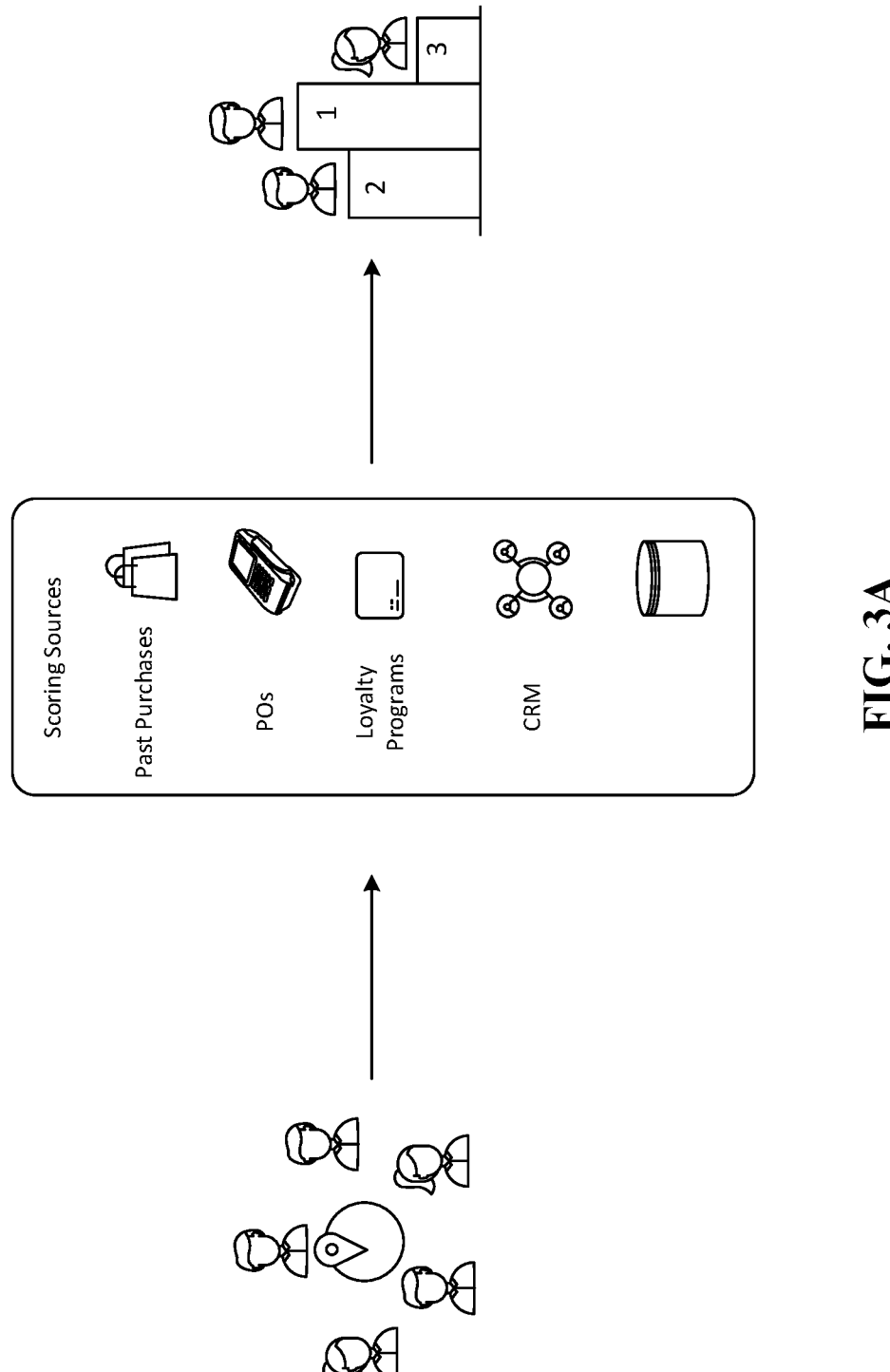
FIG. 3A is a process diagram for a first iteration of a communication and persona tracking and scoring methodology of the disclosure.

Hence, as set forth in FIG. 3A, in one aspect, provided herein is a persona tracking and scoring module for tracking, scoring, and/or ranking consumers and potential consumers, with respect to achieving one or more system determined objectives. For instance, as can be seen with respect to FIG. 3A, a large variety of online consumers may engage with a webpage or social media of a company, especially with regard to the communications they publish or otherwise transmit. The level of engagement for each prospective consumer, however, may vary on their needs and interest, and the probability that they will act on that interest in some manner will depend on their past propensity for making online purchases, such as spontaneously. The system, therefore, may be configured for evaluating and distinguishing between potential consumers, such as based on their assessed interest level and past purchasing history from the corporate office and/or from one or more local representatives thereof.

Specifically, the number of potential consumers that follow, visit, or otherwise land on a company's website or social media feed can often times far outnumber the company's resources to individually respond to each and every consumer's needs and interests and/or questions. Hence, as discussed herein above, in many instances, the system may employ a number of communications moderators and/or automated responders, e.g., chat bots, for engaging various consumers so as to answer consumer queries, such as where a smart chat bot may be utilized to generate communications where a more personalized and/or specialized engagement is not determined to be warranted, e.g., where more personalized engagement is not predicted to result in an increased interactivity with the product and/or to lead to a sale. However, in other instances, an increased engagement, such as one predicted to lead to a sale, may be flagged by the system for a more personalized, e.g., human, engagement.

For example, as depicted in FIG. 3A, a plurality of individuals may view, follow, and/or otherwise land on a company's webpage, but each represents a different level of potentiality to the sales organization. The ideal is to expend heightened resources only on those consumer's for whom it will lead to increased sales, so as to maximize their return on advertisement and/or communication spend value. A multiplicity of factors may be considered when determining a value to be attributed to various online consumers, such as past purchases they have made, point of sales they've transacted, whether and to what extent they are engaged with the company's loyalty programs, their level and type of engagement with the company historically over time, such as tracked by the customer resource management system, as well as any other form of online data that the system has identified, tracked, collected, and/or stored in its database.

These factors may be weighed and used, such as by a suitably trained analytics and/or AI module of the system, so as to rank the potential consumers, for instance, by the probability that by engaging with the customer in a more meaningful, e.g., personalized way, will increase the likelihood that a determined objective, e.g., increased impressions, conversions, engagements, sales, and the like, will result. In various instances, content that is collected or otherwise generated by the system can be subjected to analysis by the AI module of the system whereby the content can be run through one or more machine learning protocols and fed through an inference engine that scores the content and/or makes a prediction as to its ability to successfully achieve a selected outcome. Likewise, once the content is generated, scored, and a prediction as to its successfulness is made, the content can be distributed and tracked.

The actual results of the communication being sent to and responded to by a recipient can be collected and fed back into the machine learning component so as to be compared with the predicted results, and where useful the predictive analyses can be modified, a new model generated, and the new predictive model may be applied to new content to be generated and a new predictive result can be determined and tested. For instance, in various instances, the content to be evaluated may be weighed by one or more metrics, parameters, and/or other characteristics, by which the data may be scored and scaled, such as where the metrics may be used to evaluate the content itself and/or other's engagement with that content. For example, such metrics may include, comments, likes, dislikes, +1, -1, up votes, down votes, and the like. Such predictive analyses may be made for a number of different purposes, such as to predict impressions, engagement, reach, conversions, and the like.

In this manner, new characteristics may be determined, new weighting applied to the present variables, e.g., metrics, particulars, and the like, and new content can be generated in a manner so as to increase its usefulness and effectiveness. Particularly, once trained, any new or modified content can be run through the predictive system, and where necessary modified, either autonomously by the system or a user thereof, so as to better ensure its successfulness. Specifically, any text, image, and/or video content can be run through the predictive model and used to generate the communications disclosed herein. In various instances, particular high scoring content, e.g., text or image data, in an evaluated communication can be swapped with higher scoring content, or at least content predicted to be better performing within a determined context.

In particular instances, the scoring module may be configured so as to be particularized to a specified publication source, such as to a particularized webpage of interest, e.g., social media platform, at which the content is to be posted. In such an instance, the content to be generated and/or distributed may be scored in such a manner that the various metrics and/or parameters used to score the content are retrieved, weighted, and scaled in a manner that is particularized to the forum at which they are to be distributed. In a manner such as this, the reach of a communication, such as a post or comment to be published, may be reliably predicted, such as prior to its actual publication at a particularized forum.

More particularly, persona scoring helps an organization classify and segment their local audiences, at scale, by scoring individuals across a wide range of data points and meta-data. For example, a variety of metrics and other factors may be used to score each, or a group of, consumers. Specifically, one or more local audiences may be defined and scored across a variety categories, such as by demographics, e.g., based on the individual's background, such as where lead data and/or CRM, POS, and/or other online activity data may be collected and used to help categorize identified members of an audience at a high level.

Likewise, engagement or other activity levels, such as spend levels, social media engagement levels, and the like, may be tracked and used to determine a score for a consumer, or a group of consumers sharing one or more characteristics, such as by identifying those cohorts with the highest propensity to engage with the contents of the communication, such as by making a prompted purchase. Specifically, previous spending patterns, such as determined by a point of service (POS) adjunct associated with the system, may be used to help identify a consumer or audiences' habits, tastes, and other characteristics. In a manner such as this, individual's and/or groups of individuals, may be classified based on their past online activities and/or the purchases they made, which may include how much they spent, if they are part of a loyalty program or not, and the like.

Other data associated with each individual, including metadata, may also be collected and used to classify each individual, such as personal info and/or meta data such as age, ethnicity, address, how much engagement they have had on an organization's local social media pages, and the like. Any or all of this data may be used to rank each potential consumer based on the probability, determined by a weighing of these datapoints, that if engaged with in a determined manner by the system, the consumer will act in a predicted manner, such as to purchase a good or server from the sales organization. A weighted average of the various categories may be used to rank individuals based on the particulars of one or more compatible characteristics, which can then be used to help system users, such as global or local business owners, to better understand one or more cohorts they serve, and those who are likely to be their consumers. Likewise, the system and its method of use may be used to draw attention and focus of business or sales operations on consumers who are determined to potentially be high value clients.

Figure 3B:
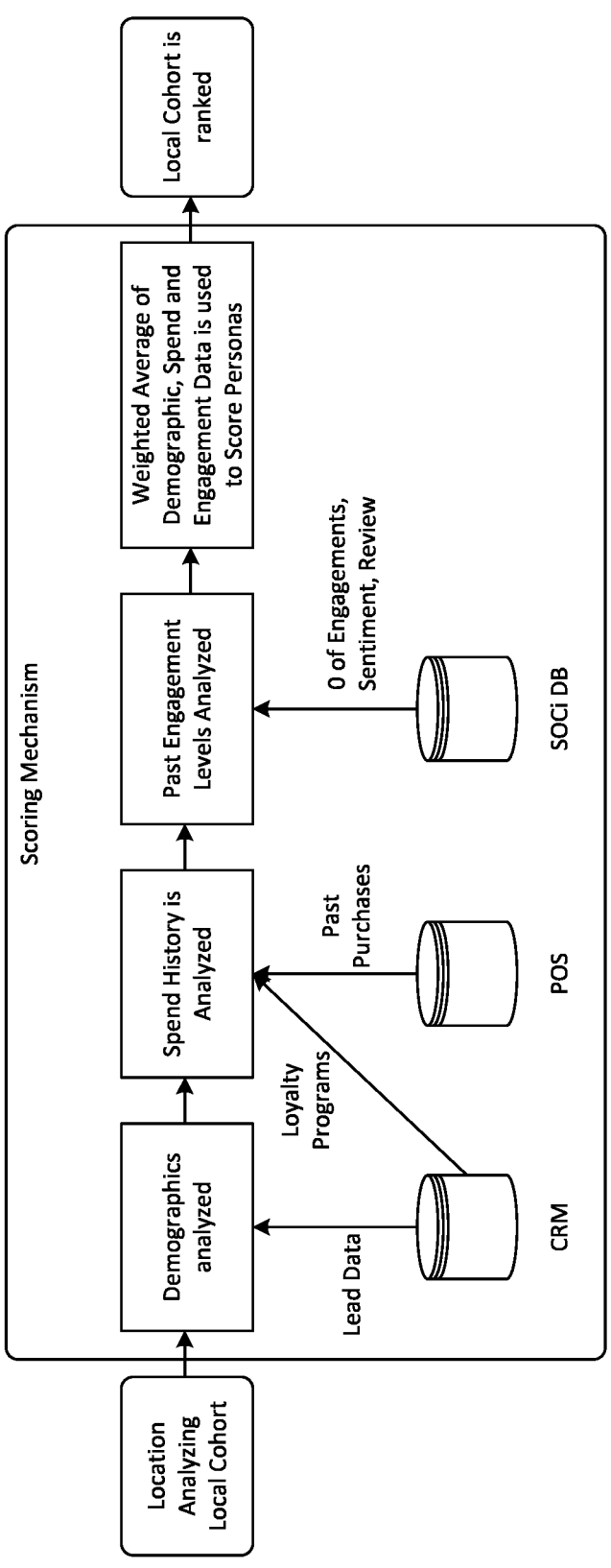
FIG. 3B is a further process diagram for a second iteration of a communication and persona tracking and scoring methodology of the disclosure.

Accordingly, as can be seen with respect to FIG. 3B, in determining a scoring, e.g., a persona score, for one or more individuals, e.g., a cohort, a number of metrics may be evaluated with respect to any particular location of interest. For instance, the demographics, spending habits, extent and particularities of engagements can all be evaluated, and used to generate a personal score for each potential consumer engaging with a local or corporate social media platform of an organization. Particularly, in a first instance, the demographics of each local cohort for each location of an organization can be defined, individually, with respect to each consumer within the cohort, as well as collectively for the cohort as a group. For example, a local audience engaging with an organization's local social media pages can each be defined with regard to how they engage, how often they engage, how positive or negative the engagement is, and/or whether the engagement leads to a sale.

All of this data, as well as any personal characteristic data, can be collected and stored by the system, such as via a suitably configured customer relationship management (CRM) tool. These data may include data generated by one or more lead forms that the consumer interacted with and/or a survey they may have filled out, as well as whether they are associated with the organization's loyalty programs, and the like. In various instances, this data may include the consumer's social media profile, pages, and feeds, as well as their email and/or their physical address. The characteristics of each consumer, therefore, can be defined, along with one or more particularities that can be used to define the group as a whole. These characteristics can then be used, in part, to make a prediction as to how much money the prospective consumer will spend if engaged with by one or more communications generated by the system. These predictions can then be tested, and based on the outcome, such as how closely the predictions match the actual results, the consumer can be given a score, for instance, where the score, e.g., a persona score, indicates how likely they are to perform in a predictable manner, such as with respect to being influenced by the messaging of the system so as to make a purchase. This score can be used as a leading indicator of how important they are to the organization, and how likely they are to continue to make further purchases, e.g., based in part on past purchases they made, and/or how likely they are to become vocal advocates for the business.

In these regards, point of sales (POS) information for the organization, or just generally based on their overall online purchasing activity, can all be collected, e.g., from across their online activities, and fed into the system and used for scoring the individual and/or making one or more predictions about them and their potential activities. This POS data may include the type of engagements the consumer transacts online, how much they spend, how often, the type of purchases they make, what they spend their money on, and the like. This data can give the system an understanding of their tastes, purchasing habits, and an approximate understanding of their income as well. Such POS data can further be combined with any loyalty information that can be retrieved from any accessible loyalty programs they belong to, which can be used to determine how willing they will be to stick with the business long term, such as for loyalty benefits.

Online engagement activity can also be collected by the system and used to score the individual, such as what they engage with, what pages they engage with, what items of the page they engage with, how they engage with it, e.g., approve or disapprove of it, like it or dislike it, whether they share it, repost it or re-tweet it, and the like, when they engage with it, the type of engagements they perform, and the like. Specifically, past engagement levels on local pages from a cohort can be analyzed, such as with respect to the number of consumer engagements, the sentiments expressed thereby, and/or reviews made. These social media engagement levels help identify cohorts with highest propensity to engage with the company.

All of these data may form nodes within a data structure, whereby each individual node can be weighted differently, an average may be taken for each of the factors, and a score may be generated for each person. Particularly, a weighted average of one or more of these categories may be used to rank potential consumers, and based on what metric is determined to be the most important in helping a business organization achieve a selected objective, such as increased sales, further reach, and the like, these different metrics may be weighted differently so as to better achieve an assessment that is more meaningful to the business organization. For example, if consumer spend is determined to be a key indicator for the business unit, then those indicators affecting a consumer's potential to make a purchase will be weighted more. Based on these persona rankings local businesses can better understand their cohorts and probable clientele, and grounded on the persona scoring can better allocate their business resources so as to focus on high potential value clients.

Accordingly, the system may be configured for tracking content, as it is generated, posted online, interacted with, collected, modified, and reused, and may further be configured for identifying and tracking those who engage with that content, such as in manner so as to generate a personal characteristic profile those who engage with the content, such as by responding to a call for action provided by the communication. However, along these lines, where the call to action includes a particular type of engagement, such as an impression or conversion, e.g., a purchase, the system can correlate such actions with such messaging so as to determine a cost for generating the communication with the responses that result thereof, such as to determine and/or predict an accurate return on investment and determine what type of messaging with which type of message recipients has led to the determined or predicted return. Hence, tracking can be used to track loyal customers, and for providing them unique messaging and/or discounts, based on the loyal customer's frequent engagement with company messaging, e.g., via CRM data, and/or their engagement and/or purchasing history, e.g., based on POS data.

Such messaging may be triggered in response to recent interactions they make, or in situations where they have not interacted in a while, and it is desired to get them more engaged in the future. Hence, the system may be adapted to track fluctuations in engagement and/or other interactivity, and to respond in a manner to encourage and/or reward future activity, and in some instance, the system can even recommend when various rewards and other such loyalty actions should be taken with respect to those who engage with content and communications of the system, and can even recommend how to interact with content engagers so as to produce a determined or predicted outcome. For instance, the system may determine that a particular loyal user engages with content for product Y, and thus, may recommend that a coupon, or other loyalty reward, be generated and delivered to the loyal customer, such as where the predicted outcome will be grater engagement and/or purchases being made, e.g., if a discount for product Y is sent to loyal customer X, outcome Z, e.g., a purchase of product Y, is 90% likely to occur.

In such an instance, that likely outcome may be a set threshold that if met will trigger the system to automatically generate the coupon and deliver it to customer X. Thus, consumer engagement with content of a company's messaging may be tracked on a personal level and in an overall global context, for instance, tracking may be performed from an initial message being crafted and distributed to a consumer interacting with the content to making a purchase of a good or service, e.g., point of sales or other customer resource/relations management data, to posting one or more comments about the good purchased and/or receiving further engagement from the seller of the goods or services. In such an instance, the level of the consumer scored persona may be determined, and may dictate the types, timing, and frequency of such loyal customer response, e.g., where the greater the persona level, e.g., the better the persona score, the greater and more frequent the rewards. This data may be tracked through business relations, e.g., LDE data, suitably configured APIs, internet collection, e.g., scraping, eliciting information directly from the consumer, voluntary information proffered by the consumer, CRM and POS data, following the consumer on their social media platforms, e.g., "friending" them, and the like. These and other factors may be used to generate a response or help a system user generate a response to their signs of engagement, and in such an instance, the response may be a canned response, a unique system generated response, or a user generated response, such as based on the generated persona profile.

Hence, the level and type of response, canned to generated to personalized, may be determined based on a scoring and a weighting made by the persona module. In various instances, the weighting may take into account a variety of aspects of the consumer's online presence, such as their social media presence and online following, this can be determined by a number of different metrics, such as the number of followers, the number of posts made, the number of posts engaged with by others, and the like. This can then be used to determine a social influence score, where the number of posts being made is one factor to be weighted, and the number of posts made and engaged with by others can be a parameter that is used to determine, e.g., increase or decrease, the weighting. As indicated, a range of scores may form a level of scales that can be used to generate a range of responses and response types. In such an instance, positive and/or negative engagements that reach a determined threshold may be given an encouraging responses and coupons, and the like.

Further to content and/or communication generation, as described herein, in various instances, a content generation and/or recommendation engine may be provided so as to review and evaluate messaging and give it a score based on prior or present engagements with that messaging. Hence, in another aspect, the platform may not only be configured for evaluating messaging recipients, but the messaging, and its content, as well. Particularly, as can be seen with respect to FIG. 4, once collected, content can be scored, categorized, and stored, such as for use in content generation and distribution as discussed herein.

Figure 4:
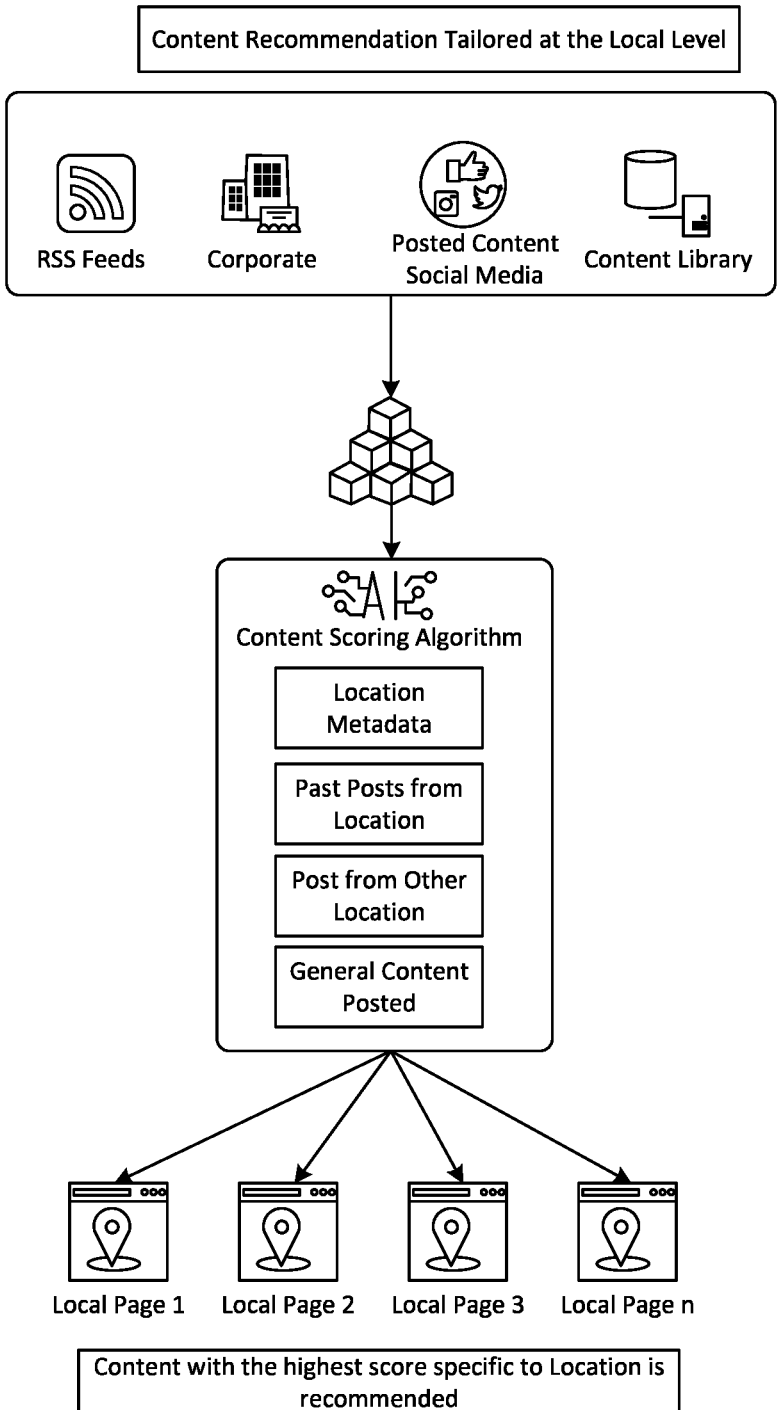
FIG. 4 is a process diagram for a first iteration of a content recommendation methodology of the disclosure.

For instance, FIG. 4 provides, in various instances, a system that may be configured for performing a search for content, such as across one or more social media modalities, or across other online content searching mechanisms, so as to identify content of interest to one or more system users, which content can be identified, evaluated, and collected by the system from a variety of different sources. This content may include content retrieved from one or more RSS feeds, e.g., to one or more websites or feeds of interest, it can be generated by the organization or an agency working therewith, can be collected from a social media platform, retrieved from one or more content libraries, and the like. The collected content can be evaluated by the system and users thereof, can be scored, and can then be converted into an embedded array.

For example, through one or more links, bridges, leads, or feeds, e.g., an API, LED, or RSS feed, content being published or otherwise posted, e.g., on a website, can be identified, such as via one or more filters. Once identified as being of interest, the content of interest, e.g., texts, image, graphic, video content, can be collected and can be converted from one form into another, such as into a numerical, binary form, and the various aspects of the content can be classified, tagged, and categorized, e.g., via a numerical representation. Such processing may be performed by one or more natural language or image processing operations, such as to produce a index or document embedded with relevant classified metadata that can then be converted to an embedding.

In a manner such as this, the system can differentiate content and its subject matter by assigning numbers to each content element by which the content can be classified and categorized. Specifically, the categorized content can then be entered into an approximate nearest numbers graph, or other data structure, and can be subjected to, or otherwise be evaluated by an AI module of the system, such as by being employed within one or more deep learning processes. For instance, the AI module of the system may evaluate each piece of content that is collected such as for the purpose of evaluating and/or scoring the content, e.g., against one or more metrics. For example, content can be evaluated and scored on an account by account, platform by platform, location by location, and/or audience by audience basis and/or with respect to one or more objectives sought to be achieved.

For these purposes, metadata may be collected along with the content of interest, such as where the metadata includes information surrounding the content and its collection, such as the webpage, resource, or online entity from which it is collected. Such metadata may include evaluation data, such as data characterizing the content, for instance, with regard to its reception within one or more online communities, such as with regard to how many likes, up votes, or down votes, +1s, −1s, shares, forwards, comments it receives, as well as evaluation data pertaining to from where the data was collected, such as from which website or social media platform and/or page it was collected.

In a manner such as this, the different data pieces of content can be evaluated, pre-processed, and/or converted into embedding and can then be entered into a data structure whereby they can be stored, plotted, and evaluated across multiple dimensions in space, e.g., in the form of a nearest neighbor cluster or tree graph, such as based on the assigned numbers. During this structuring and storing process, pre-processing of the various data to be entered and stored as potential content within the system may take place, whereby the various content items can be classified, categorized, embedded, or otherwise be encoded with a numerical value that can be associated with one or more categories and/or classifications of content items, such as for use in structured storage and/or retrieval.

Accordingly, the system may be configured for performing a dynamic storage operation whereby one or more libraries are configured and populated with autonomously generated, evaluated, and/or tagged content items, such as including categorized and/or tagged textual and image content. In so doing, content can be parsed, classified, tagged, and stored based on the tagging, so as to be easily identified, retrieved, and used for message generation. This process may include aggregating data across fields, performing various analyses on the data, such as pre and post collection, performing a historical evaluation of the content over time, tagging the data with respect to associated CRM, POS, and other like data, and scoring information.

Image and text recognition can be performed by a number of different mechanisms that results in the tagging of recognized, or otherwise identified, texts, images, video content, and the like, such as for the purposes of scoring and storage. For instance, the system may include various text and image recognition tools that may be trained by the system so as to generate one or more recognition models, or may employ recognition tools that have previously been trained. These steps may be performed in a manner so as to determine what content and communications are working for which class of potential consumers so as to better effectuate and evaluate a communications, e.g., advertising, campaign that is more closely tailored and aligned to the persona of the consumer being communicated with, e.g., engaged with, while increasing the return on investment for the content generator. In this way, a consumer receives information and offers that are more pertinent to them, and thus, are more likely to be engaged with.

Accordingly, past, present, and future posts that have or are predicated to work well with a consumer, or consumer group, can employ the same or similar content can then be evaluated one with another, such as with respect to the location characteristics to which the messaging is going to be directed, e.g., at the local, group, account, and/or corporate levels. Such evaluations may include determining the degree of one or more relationships to other data being evaluated and/or stored within a data structure of the system, such as in a manner that the data forms nodes in the data structure and the distance between the nodes denotes the strength or degree of relationship between them. In a manner such as this, content having a determined degree of relationality can be grouped together so as to form clusters, such as nearest neighbor clusters.

Particularly, the data structure may form an approximate nearest neighbor database, which can be used by the analytics and/or machine learning module of the system so as to train one or more of the content collection, scoring, evaluation, generation, and/or distribution processing clusters. The result of such training is that the system will become more efficient at recognizing and collecting content of interest, defining appropriate audiences for messaging, and better at selecting or otherwise generating of content to be targeted to the identified audiences. Particularly, the machine learning module may generate a predictive model, such as to the probable effect any given content will have on any identified audience so as to achieve a determined objective, and the inference engine may deploy that model, track the results of such messaging and to determine if the expected results were achieved or not, and if not may propose one or more changes to be made to the model so as to produce more accurate predictions.

Consequently, the system may be configured to assign the likelihood of success for each content item and for each group and/or cluster in the data structure, e.g., based on the evaluating and scoring intelligence. The AI system, therefore, can be trained to recognize and track online content, to evaluate the content's performance in the past, to predict its future performance, e.g., via a social post predictor engine, and based on that prediction to either use (or recommend for use) that content in new communications and messaging, to edit it, or to discard it. Where content is to be evaluated and/or re-used, it may be done so based on past performance and/or location, targeted audience, and/or its expected future performance at achieving one or more defined objectives, all of which can be fed into and be displayed in an approximate nearest neighbor graph, and used for new content recommendation and generation. Specifically, each neighbor's likelihood of success may be determined, and this information may be fed in accordance with a predictive model into a content recommendation engine.

In this manner, as can be seen with respect to FIG. 4, the system may include a content recommendation and/or generation module that is configured for evaluating and/or generating messaging and posts to be distributed to one or more targeted audiences within one or more defined communities. For instance, communications can be evaluated by their content elements and/or with respect to the location from which they were collected, or are to be targeted, or from other locations, and/or can be evaluated with respect to the audience for whom the messaging is intended. In various instances, one or more tests may be run where catered messaging is distributed along with messaging of a standard, more generalized type that has a predetermined known response, e.g., from previous posting and evaluation, and the effect of the catered messaging may be compared to the effects of the catered messaging, and this data may be collected by the system and used for scoring the catered messaging as well as the process by which it was generated, so as to determine if the messaging is performing well or not.

Accordingly, the collected content can be used, or be recommended for use, in generating new communications, which communications can be distributed to other potential consumers, e.g., within a defined community, such as for use in a lead generation or other advertisements that can be tracked. In this regard, the system may include a content recommendation engine that evaluates the communication content with respect to one or more of its use in communications to be targeted to a specific region, at a specific location, and to a specific audience. Consequently, the collecting, evaluating, classifying, and use of collected content can be performed with respect to different account levels as well as with respect to different locations, e.g., based on latitude and longitude, communities, and audiences, where different content elements score differently with regard to different locations, different communities, and different audiences, and the like. In particular instances, the content to be recommended may be based on a scoring that accounts for one or more, e.g., all, of these factors, such as where the content achieving the highest score, e.g., with respect to its probability of achieving a determined objective, may be selected for recommendation and/or use in crafting communications, which may be different based on a location by location, audience by audience basis.

For example, as depicted with respect to FIG. 4, content to be recommended may have different scores, and thus, may be different dependent upon the account level from which it is to be sent, the location to where it is to be distributed, and the audience for whom it is to be targeted, and in this instance, each location may receive a communication that as to its look and feel has a common theme, but with respect to its specific content are different, and in some instances, are vastly different. Particularly, collected content can be used in new communications that can be distributed and tracked and then evaluated with respect to its ability to achieve one or more objectives, such as increased brand awareness, enhanced engagement, a rise in impressions, a rise in conversions, increased sales, and the like. The results of these analyses can then be fed back into the analytics and/or AI module whereby the communications system can be further trained in identifying useful content, the building of more particularized communications, and can better predict and evaluate the return on investment in employing a planned out communications regime in a much faster, more efficient manner.

Accordingly, provided herein is a content evaluation, recommendation, and/or generation engine(s), which like the machine learning module receives content from a variety of sources, such as via an associated categorized library, structured database, or other database of the system, may be collected from content posted online, such as via a social media platform, or retrieved via an online interface, such as an API, RSS feed, network connection, and the like. These data feeds may be the same or different from the feeds employed by the machine learning module, and thus, the content can be the same or different than that employed in machine learning. As indicated, the content can be in any form such as in text, image, hyper rich texts and images and graphics, animation, video, and the like, and can be converted into text and/or otherwise embedded with coding, which may include metadata and other tagging information.

Specifically, the collected content can be processed via a natural language processing server, such as where image, video, and other forms of data, including metadata, are categorized and converted into a numerical value and/or fed into a nearest neighbor data graph, which graph can be queried in order to evaluate, categorize, score, and/or present the content, such as in a cluster form, for use in the generation of content. More specifically, the content recommendation engine helps clients with numerous locations to post localized content that will ensure maximum engagement from its cohorts and portray a strong local presence, it normalizes content from numerous data sources, and it allows for the efficient comparing of categories of classified content items. In various instances, the content recommendation may be based, at least in part, on a content scoring rendered by the system, such as where content is scored using metrics that help predict its engagement levels.

Likewise, in some instances, scoring of particular content items may be based on the particular audience and/or location to which the content is to be sent, such as based on location level metadata, such as where a location's cohort attributes, e.g., demographics, language, geography related preferences, and the like are used to score each content item. Past communications and scoring per location, e.g., from a variety of other locations, can be used as baseline factors by which to from an initial prediction as to how a typical content item should perform, such as with respect to their respective engagement levels. Additionally, one or more system identified trends can be identified, and where one or more trends shows an increase in activity velocity across one or more social media platforms, content adjudged to be the same or similar can be given increased weighting, e.g., a higher scoring, based on its probability of taking advantage of the velocity trend. In a manner such as this, content with the highest rank is recommended for the specific context and location.

As discussed above, in one aspect therefore, provided herein is an automated communication generation module, which module may be configured for implementing one or more chat bots for the generation of content to be recommended and/or used in communication generation. Particularly, in various embodiments, presented herein is an automated chat bot module that is configured for generating communications, such as auto-responses, to consumers visiting a retailer's webpage so as to engage consumers in a dialog that will lead the visiting consumer to make a purchase, or perform some other desired action. This engagement is centered at the local business level, but scalable upwards so as to engage with a variety of individual consumers in a personal way all at the same time and over several different locations, such as on the state, regional, and/or national level, while crafting unique, personalized communications that are catered to each individual consumer on demand.

In performing this function, a smart bot of the system may be equipped with both local page data, e.g., via the location specific database, and customer specific data, e.g., via association with a CRM and/or POS module of the system. This tight CRM/POS coupling provides the bot with all pertinent customer specific information pertaining to the topic of interest to that specific consumer. And as indicated, the bots can be equipped with a range of frequently mentioned topics that can be tailored to the local page and the individual consumer, and the topics the smart bot is authorized to handle may further be toggled up or down to the regional, area, and/or to the specific location level and through a variety of account levels.

Additionally, in various embodiments, the automated communication generation system, as disclosed herein, can be arranged so as to not only generate a communication, but to direct a series of communications down a determined path toward a decision or action to be taken by the recipient, which if they take the desired action they may be rewarded, such as by receiving a coupon or discount for a good or service, all of which can be performed on the communications platform upon which they are currently engaging with content without having to take them off of the platform and to the business entities website. Likewise, during these interactions, analytics can be performed so as to evaluate the strength of the interaction and from these interactions a prediction can be made, substantially real time, as to the probability that the message recipient will actually perform the desired action, such as making a purchase, and thus, the system can evaluate the interaction with regard to its potential return on investment. Furthermore, during the course of these interactions one or more workflows can be generated and scheduled.

For example, where the system determines that more communications and/or more discounts being offered will lead to an increased return on investments, then one or more communication and/or discount follow up workflows may be calendared, such as by scheduling a boost in advertising and/or a wide blast in communications with one or more recipients. Such workflows can be scheduled for autonomous implementation or via a human user of the system. In particular embodiments, the decision to boost or blast communications can be evaluated along with the budgeting allocated to the advertisement campaign, which can be allocated across platforms and consumer recipients, or can be specific to the specific interaction taken place at the moment, such as to boost sales at a given location in need or to boost communications in areas proven to best utilize the additionally budgeted communication dollars.

This dynamic configuration enables large and small brands to keep complete control over the type of topics that are addressable by the system and to what degree communications are to be automated so as to better cater the messaging of their franchises to the interests of their local locations on a granular level, while at the same time as ensuring message consistency across brand locations. In various instances, the control over brand messaging and the degree of freedom for going off-script may be based on the level of permissions and authorizations given to each location and/or to each communication moderator. A key feature of this module, therefore, is that in correspondence with the analytics and/or AI module of the system, the smart bots keep getting smarter on recognizing topics of interest and the answers to them through the constant training being performed by the machine learning unit, which may be supervised or non-supervised, as explained below, and the inference engine continually updating its configurations to account for the updated results of the learning module. In this manner, the results of all of these engagements may then be fed back into the CRM so as to complete the loop and strengthen the various components of the AI module.

Figure 5:
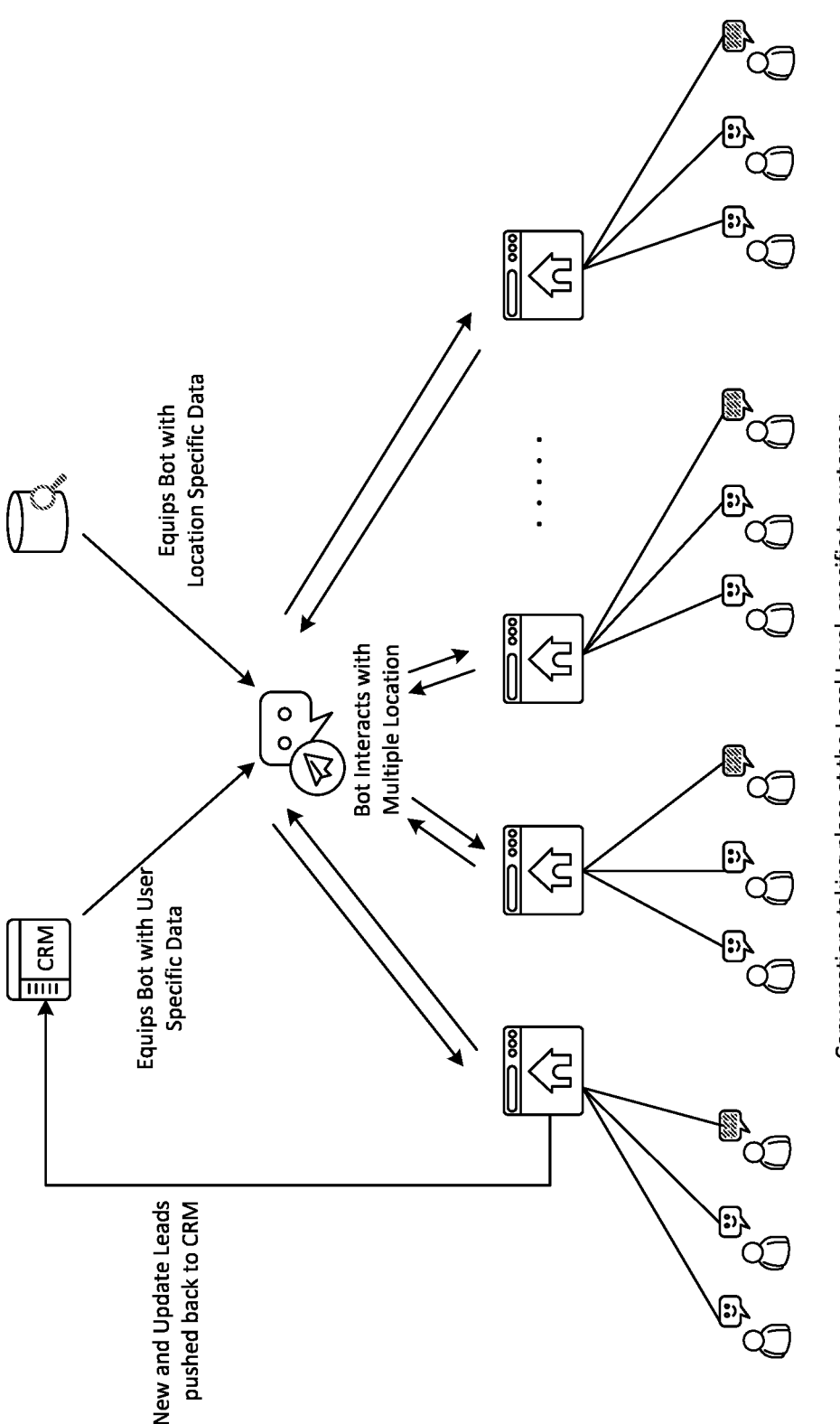
FIG. 5 is an iteration of a communications platform for automated and autonomous generation of tailored communications.

Accordingly, as can be seen with respect to FIG. 5, the system may include a communications platform that may be automated for the autonomous generation of tailored communications. The communications platform may include a plurality of modules that work together synergistically, such as in a pipelined fashion, so as to produce the communications of the disclosure. Particularly, in one embodiment, the communications platform includes an autonomous communications, e.g., a smart bot, module that includes one or more processing clusters that are configured for autonomously and automatically generating and crafting communications.

Specifically, in various embodiments, the system can autonomously scan and recognize content having been collected, scored, and/or stored by the system, or is currently in the process of being generated, and in response to that recognition can recommend content, such as text, image, and/or video data and the like, which content along with its associated evaluative data can be presented to the content generator so as to assist them in their generation of communications. Particularly, the system may include a recommendation engine that may be configured to perform a regular scan of content being generated, or otherwise employed in producing a communication, can recognize various categories of keywords and images, and can then run a search of one or more of the structured libraries, such as by using one or more keywords, identifiers, or geographical locators as a key by which the libraries may be accessed, searched, and content identified, evaluated, and recommended for use in communication production. Additionally, the communications platform can be configured for increasing or decreasing the degree and extent of automation with respect to autonomous content and/or communication generation, such as at 10 to 25%, up to 35 or 50%, including between 60% or 75% to 85% or 90%, all the way up to full automation at 100%. In various embodiments, the smart bot module, therefore, is configured for accessing one or more databases and/or other modules of the system for aid in crafting tailored communications.

For instance, as can be seen with respect to FIG. 5, the smart bot module may be configured for interfacing, either directly or over a network, with a customer relations management module, CRM, a point of sales database, and a geolocation targeting module of the system. In these instances, the CRM, POS, or other customer database resource, provides data regarding each particular individual to whom a communication has been generated, so long as they have interacted with one or more systems of the company distributing the communications at one or more times previously. This information may be used by the smart bot module so as to generate communications personalized to the individual, such as based on the tracking of their online interactions and the engagements they have had previously with the company, specifically, or the communications system generally. Likewise, the geolocation module may provide location specific data to the smart bot, such as where the location specific data may be data specific to the location of the community of the individual as well as data specific to the local goods and services provider, e.g., local franchisee, serving that community.

For example, in various instances, two or more module systems may be present that track data, such as a first and second or more types of data. Particularly, a first type of data that may be tracked may include customer identification, interaction, and/or previous purchase data, which may tracked by a suitably configured system CRM and/or POS or other RSS feed, and location data for all of the respective locations of the organization, such as with respect to their location and community demographics that may be relevant to the identified consumer to be communicated with. In such an instance, the CRM and/or POS module may track, collect, and store personal information related to consumers, their online activities, habits, preferences, prior engagements, purchases, demographics, social circles, social networks, and the like.

In this instance, all online activity that can be associated with an identified consumer and tracked may be collected, analyzed, and stored, such as for personalized communication generation. Where the consumer to be interacted with is new to the system, a new file and customer identification can be generated, and their future activities may be tracked. Accordingly, as discussed above, those who engage with the system and the communications thereof may be tracked, so as to ensure they receive the level of customer service that their engagement earns them.

Hence, to facilitate the determination by which to provide customized messaging to a consumer, their participation in a loyalty program may be encouraged, whereby the loyalty program may track their purchases, the reviews they post, and/or any comments they make regarding the product or service may all be monitored such that when there is a problem or a superior review, the loyal customer, or any customer, can be immediately responded to directly by the automated system, or may be flagged for human interaction follow up. Likewise, where a loyal customer hasn't engaged with the system for a period of time, such as where they haven't made a purchase within a predetermined period the system may flag this customer for enhanced attention and increased messaging. Hence, a consumer or group of consumer's purchase histories can be tracked, the velocity of purchases can be measured, and where such velocity can be increased by boosting communications, then the system can initiate or flag for initiation approval, a boost in messaging.

In certain instances, the communicators loyalty program can be accessed in implementing the boost. Likewise, the purchase history for each consumer, e.g., their average purchase price, can be accessed and used to deliver them a coupon to bring their proposed purchases, such as within their shopping cart or wish list, within their predetermined price range, such messaging may be based on a single or a group of consumers, such as to a customized group or audience. The system therefore is configured for monitoring over all fluctuations in consumer interest and engagement, such as with respect to articles of goods and services being purchased, price changes, time periods, all of these can be triggers for generating a boost in communications, targeting a group of consumers, and generating new catered communications to be directed to those identified consumers, all of which steps can be automated.

Likewise, during these periods of boosting communications, the content to be generated may be engineered to generate a corresponding boost in sales, such as where the wording, subjects, and images are used for the purpose of enhancing and promoting such increases in sales. As indicated above, the boosting regime can be tracked to determine if an actual return of investment comports with a predicted return on investment. A service location may also be associated with the identified consumer so as to better indicate which segment of the business may be most relevant to that consumer. The geolocation system module may also track, identify, and store, location specific information, such as of business segments, e.g., corporate partners or franchisees, which information may include information of a franchisee that serves various communities within a geographical region.

In various instances, consumer information may be associated not only with and identified consumer, but also with a franchise that may have a location pertinent to the location and/or needs of the identified consumer. In this manner, the smart bot can access information pertinent to the individual's engagement with the systems of the company, as well as their location, and their local goods and services provider that is in direct engagement in that location, so as to generate a more personalized, tailored communication that is deemed to be more directly relevant to the context of the individual to be engaged. Particularly, these two sub-systems together enable the smart chat bot to make intelligent conversations at both the individual and location level, which communications can be transmitted at the individual or group account level, such as via a local social media interface of the local account of the franchisee, or even regional and/or national account levels.

Typically, deploying a chat bot is problematic, such as where in order to deploy the bot in the context of a social media platform, each bot is individually configured, uploaded on to the platform one at a time, and built only for a specific purpose. This process is made even more problematic where a specific brand includes thousands of franchisees servicing thousands of locations, and building individual bots for generating auto-responses for each of these locations would be incredibly burdensome to build, prohibitively expensive, and extremely difficult to manage on a location-by-location basis. This problem can be overcome by generating a universal bot interface that is configured for mass deployment in a plurality, e.g., all, locations, where the system feeds locally collected and scored content that can be used to generate a single template into which individual, localized content may be uploaded or otherwise integrated within the template.

In such an instance, a universal structure is provided that can serve all locations where the structure includes containers into which individualized location relevant information may be called and integrated, e.g., autonomously by the system, in a mass generation, location specific manner that is capable of being mass distributed through a number of social media or other online platforms. In such a manner as this, communications, such as auto-responses, can be generated via a universal bot, whereby a collective template is employed that is capable of being deployed by the bot across several online, e.g., social media, platforms, while at the same time being individualized to location, and including specific messaging that is incorporated into the template so as to give the communication a personalized look and feel that is adapted for not triggering filtering or other limitations typically applied to mass deployment of messaging by the social media platform provider. In various embodiments, the bot may be a chat bot that is configured for rapidly receiving inputs and inquiries, targeting content for response generation, as well as dynamically generating natural language messaging and responses that are individually catered to recipient characteristics while at the same time being capable of being mass deployed, across several internet based social platforms, in a prompt manner.

More particularly, in one aspect, the system may present a communications platform that may be employed by both large and small companies having several tens to hundreds or thousands of locations to a small local operator having one to a handful of retail outlets, where each organization and each individual location thereof may have separately run social media pages, and thus, any organization may have any number of social media pages they are running as a mechanism by which to engage their local consumers. Given this wide number of social media modalities that may be run at the corporate and local levels, all of which may have their own individual social media accounts, keeping messaging consistent and efficiently managed is very difficult, especially across accounts across locations nationwide. So the present communications platform allows a variety of users to access the system and manage all, or a subset, of these accounts with respect to the incoming and outgoing messaging thereon, such as on the corporate, e.g., overarching level, the group level, and even on the individual account level.

Specifically, the present communications platform allows various users within an organization, with the appropriate permissions and authorizations, to access all of the official social media interfaces of all of the retail outlets from the corporate to the local levels, and to manage the messaging taking place there on at a single or multiple client computing devices. For instance, at the corporate level, the maximum authorization may be permitted such that global access is allowed, whereas at the group or regional level only a subset of accesses are permitted, and then at the local level, access may only be given to the local franchisee's social media pages at one or more specific locations servicing a local community. In a manner such as this, as exemplified in FIG. 5, each of the consumers who are iterating with, or otherwise engaging with, the local social media interfaces of a local franchisee, or other retailer serving a local community, may receive personal communications that are locally relevant to them and catered to their own personal characteristics, preferences, and previous online engagements.

Practically, what this means is that each consumer is receiving information, such as answers to their queries, which are relevant to their demographics and location. In this manner, a selection of local social media pages, from a diverse grouping of retail locations, may be accessed by different consumers, whereby one or more smart bots of the system, or system administrators, may be communicating with a plurality of unique consumers all in different locations, and yet all receiving personalized communications that may be unique to them and the locations servicing them, but may be based by a common communication structure, e.g., a universal template. And when any particular consumer is a return customer that has been previously identified, their information, including any prior purchases or inquiries they made, may be accessed or otherwise provided to the smart bot so as to more particularly cater communication to that customer. For instance, upon return to the local retailer's webpage, a consumer may be greeted, thanked for returning, and asked about their previous purchase or inquiry. And this may be repeated for all the visitors of all the local pages being serviced by any particular smart bot.

Accordingly, in particular embodiments, a system chat bot may be provided. In certain instances, the chat bot may be provided with intelligence, and thus, may be a smart bot. Specifically, as disclosed herein, a smart bot may be an intelligent communication interface that may be run in conjunction with an artificial intelligence module and may be configured for performing or otherwise be associated with a content generation module that is adapted for generating communications of the system. In various implementations, a smart bot may be a module that is configured for aiding a service or goods provider with regard to automatically and/or autonomously controlling online communications with their consumers.

For instance, in one implementation, the smart bot may be configured as a chat bot that presents an interface, e.g., a chat box, to an online consumer when a user of the Internet lands on a webpage in pursuit of a potential good or service they may be interested in purchasing. In such an instance, a chat bot may be generated and presented at the webpage to the consumer whereby direct messaging may take place between the consumer and the system. In one implementation, the chat box may be an in-screen popup that is generated when an individual web searcher lands on a web page, and the chat box may be presented so as to answer the individual's immediate questions and/or help them through the purchasing process in an intuitive manner. Often times, as previously indicated, the chat box may be manned by a live person, e.g., a communications moderator, however, given the advanced artificial intelligence module of the system, and its system wide accessibility, in the present iteration, the chat box may be partially or completely automated and run 24 hours a day, 7 days a week. This task is made complicated, however, when it is not only one but thousands of consumers communicating with not one but thousands of locations from not simply one but tens to hundreds, to thousands of products, from one to multiple brands.

Accordingly, the present autonomous smart bot module is increasingly scalable, upwards and downwards, as needed, given the online demand across the system, where various different automated chat bots may be responding to communications being run across several different interfaces of a national brand, each dealing with an individualized consumer in a personalized, localized, and catered manner, such as where answers to various queries can be generated and given in a personalized and location dependent manner. This flexible system smart bot architecture overcomes many problems. For instance, live chat bots being run by live humans are expensive to manage, maintain, and keep up to date with the most pertinent information across a company's broad consumer base, especially where the company includes tens, to hundreds, to thousands of franchisee locations, each of which are pushing communications across a large number of online messaging platforms, e.g., social media platforms, such as FACEBOOK®, TWITTER®, INSTAGRAM®, and the like.

It is important in these instances that the corporate brand representatives have a clear and consistent messaging throughout the organization and particularly with its consumer base across the nation. The instant autonomous chat bot module is configured for ensuring such consistent messaging in an economical, efficient, and consistent manner across all brand locations. This consistency may be ensured across locations and across social media platforms even when each location has a completely different communications methodology. In such an instance, the present platform may be configured for monitoring the communications coming in, the conversations taking place, the messaging being generated and transmitted, and may further be configured for presenting a dashboard interface where all of these communications can be received and presented to one or more users of the system for review, editing, and approval prior to distribution.

In addition to the above, presently there are problems with online messaging with regard to driving communications so as to evoke one or more actions by the communication recipient. For instance, currently, messaging drives recipients to a webpage, and then the webpage drives them to an action, making the engagement a multistep interaction, which allows for easy drop-off, which is problematic for the provider of goods and services. The present system, however, overcomes this problem by catering the messaging to funneling the recipient to direct action by engagement with the messaging within the social media platform.

Accordingly, in various embodiments, the chat bot, or other system generated response, may be adapted so as to encourage the recipient to take one or more prescribed actions upon receipt of the response, rather than requiring them to leave their communications medium, traversing to the business organization webpage, and engaging with the business entity via their webpage, instead of engaging them within the context of the social media platform. Hence, although in certain instances, the system may automatically and/or autonomously generate responses to posted, or otherwise published inquires, in other embodiments, beyond just answering questions, the generated response may include a call to action, such as an action to make a purchase, fill out a survey or questionnaire, book an appointment, provide contact information and/or availability for scheduling a follow up, to apply for a coupon, or respond to one or more incentivized actions, which call to action may be made then in their without having to leave the communications platform they are currently engaging with. These actions may then be fed into the scheduling module of the system so as to schedule the received response and/or set up and calendar follow ups thereto, which once scheduled can be fed into the workflow management system for implementation thereby.

Where generated or other content has performed well, the content can be earmarked and/or scheduled for use again, such as when triggered or on a regularly calendared schedule. More particularly, content that performs well under various defined circumstances can be used again and again where those same or similar circumstances occur time and again. In such an instance, the response may be selected from a number of canned responses. In such an instance, various of the content can be generated or otherwise selected and may be calendared for distribution, such as on a regular scheduling, and in a manner that is particularized to all locations, but also avoids conflicts amongst locations, times of postings, content of postings, and the like.

In various instances, generated, scored, and analyzed content predicted to do well for increasing reach, engagement, and the like, can further be analyzed with respect to when the content should be distributed so as to further enhance its reach and engagement, e.g., by determining when will be the optimal timing for distribution. In such an instance, the workflow manager may not only determine what content is to be generated and used with respect to particular social media or other Internet platforms, but can particularize the communication content and the scheduling of the distribution of the content so as to optimize one or more determined goals, such as increasing reach, increasing sales, increasing positive recipient response, and the like, such as where the scale of such operations may be from a single content generator to a content generator functioning within a worldwide market serving sever thousands of locations serving distinct and far ranging local markets. The success of which communications can be predicted beforehand and verified afterward, with respect to each local market.

For instance, the predictive processes herein described may be implemented in such a manner as to be able to indicate to a content generator and/or publisher thereof that if X amount of advertising dollars are spent, using Y types of characterized content, a Z amount of reach, impressions, engagements, conversions in an identified market can be expected to result. The results data of the prediction can then be collected and analyzed, and if necessary, e.g., where the prediction falls outside of a determined range of results, the model and/or its variables, such as the weighting thereof, can be changed so as to better train the predictive analysis and further enhance the ability of the system to effectuate more effective predictive results. In various embodiments, the communications being generated and transmitted to a determined recipient, may be constructed so as to achieve a defined objective, such as in a manner to funnel the conversation toward a predicted action being taken by the communication recipient.

Particularly, in various embodiments, provided herein is a process for funneling a conversation, e.g., autonomously, toward evoking a response, e.g., a predicted response, from a message recipient. For instance, in particular embodiments, an in-bound message may be received by the system, such as in response to an initial communication being sent to the messenger, and once received, the inbound message may be analyzed, such as where a natural language processing module parses the inbound message, and in response thereto a range of responses may be previewed, and an appropriate, personalized response may be selected, or generated as a reply to the inbound message. Particularly, when parsing the inbound message, keywords, phrases, and expressed or implied sentiments may be used to determine the type and level of response. In these regards, the social listening module may also inform the content generator as to what the appropriate response should be.

In order to ensure consistent messaging throughout an organization, especially with respect to human and/or automated message generation, the platform may include an approval's module 42. Thus, a series of system permissions and authorizations each having very specifically defined access permissions is provided. These permissions may be formed in a cascading/rank order manner such that corporate headquarters have the broadest range of permissions and accesses where local franchisees in smaller markets may have the most limiting and restrictive permissions and accesses provided.

The system itself may evaluate messaging and/or sales performance and may generate the permissions and accesses or otherwise provide a user of the system the accesses and permissions it recommends after an analysis of the pertinent data. Hence, local franchisees can be given permission to access the system and generate communications to be distributed locally, where the national brand headquarters has permission to access all messaging platforms of all locations at all times, and can create messaging templates that then get pushed down to sub-locations across the platform, globally. Of course, permissions may be segmented so as to be controlled exclusively by each location and/or region or account level. In various instances, approvals may be required prior to distribution of massages with consumers, and so likewise, a cascading system of approvals may be set up whereby the higher up the chain, the less approvals, if any are required, whereas further down the chain more approvals are required. And as indicated, all of the messaging generation permission, and approval systems can be adapted to take place autonomously or with human intervention on any or all levels.

For instance, in particular instances, prior to communication distribution, one or more approval's may be sought by the system so as to receive permission to transmit or otherwise post the crafted and/or generated communication(s) to a social media modality for publication thereby. For example, as can be seen with respect to FIGS. 6A and 6B, the system may include an approvals module 42, such as where an approval hierarchy within the system is configured so as to correspond to an authorized hierarchy of the business organization. In such an instance, an organization may employ a communications department having a number of communication managers or moderators that are responsible for managing a workflow of communications as they travel through the system from content collection to communication generation and distribution. So being, one or more communications managers may be authorized to review communications from 1, 2, 3, or "n" number of locations to be distributed to local communities.

Particularly, a communication manager or moderator may be authorized at the specific location level, whereby they may be in charge of controlling and/or approving communication generation and distribution at the specific local community level. Likewise, a communication manager may be authorized at the group or regional level, such as where the manager may be responsible for managing communications flow throughout one or more groups or regions of business units. Using the communications platform of the system may allow one or two moderators to manage communications across tens to hundreds, e.g., 100 to 500 or more, such as 200 to 400 or more, including about 300 locations. However, knowing what messaging is being generated and distributed as well as managing so many communications from so many different locations without the present platform would be overwhelming, especially across a multiplicity of social media modalities.

Figure 6A:
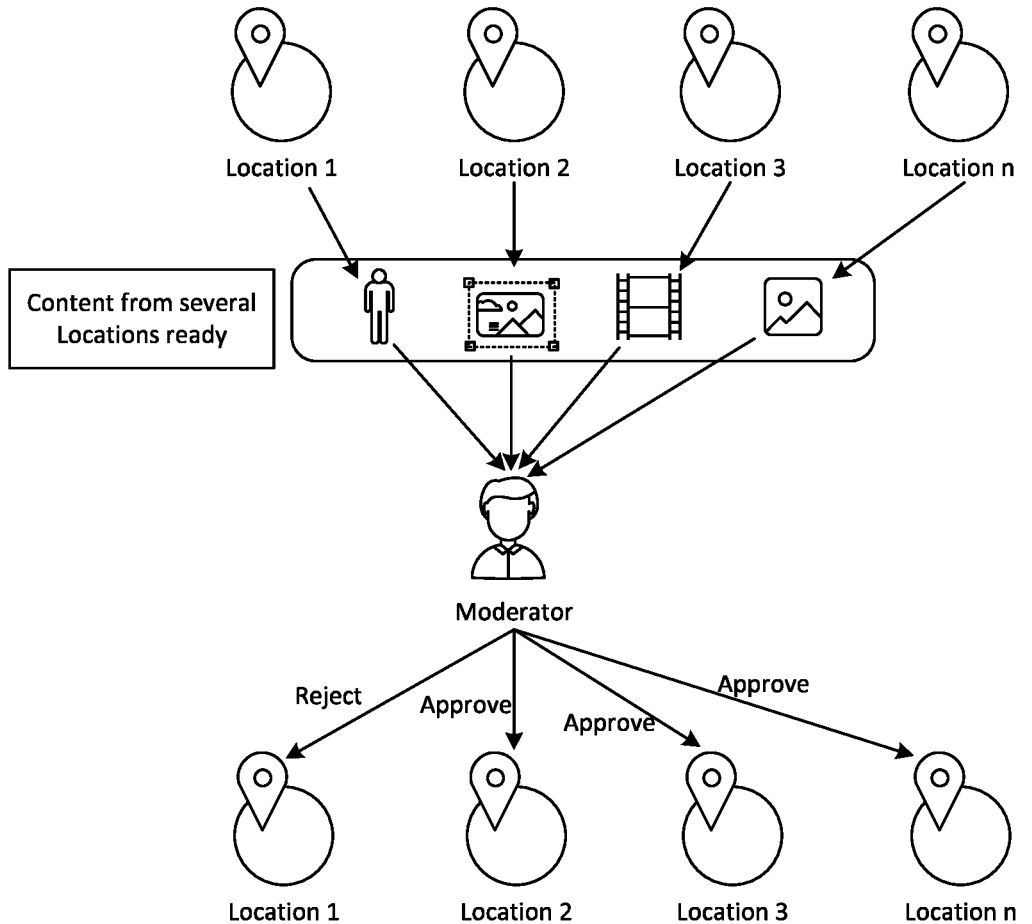
FIG. 6A is another iteration of a communications platform for directing, monitoring, and managing a communication campaign from a single dashboard interface, e.g., of a client computing device.

Consequently, as exemplified in FIG. 6A, using the present communications platform, the messaging from multiple locations of a sales organizations can be monitored and managed from a single dashboard interface of a client computing device. As exemplified, locations 2, 3, and "n" all want to post content that can readily be approved, whereas the content proposed by location 1 includes inappropriate content. In such an instance, a moderator, or the platform itself, may access and review all the content proposed to be distributed within an organization, or a portion thereof, and can make a rules based decision to approve or disapprove its distribution based on its content and/or company publishing rules, all from a single interface.

In certain instances, the system may flag any content that breaks one or more publishing rules set by the organization, may take corrective measures to remediate the same, such as by suggesting substitute content, and/or seeking moderator interjection and/or approval prior to distribution. This is exemplified in FIG. 6A at location #1, where one or more filters, such as a word filter, e.g., a profanity filter, has tagged a post by breaking a rule against using offensive language, and in response to identifying the offensive language the offending post has been sequestered and flagged for further review. In this instance, the moderator is an account holder, which can be at the local community account, the group account, or the corporate account level, such as where an account holder is the "owner" responsible for the messaging being conducted at one or more locations of the business organization.

Figure 6B:
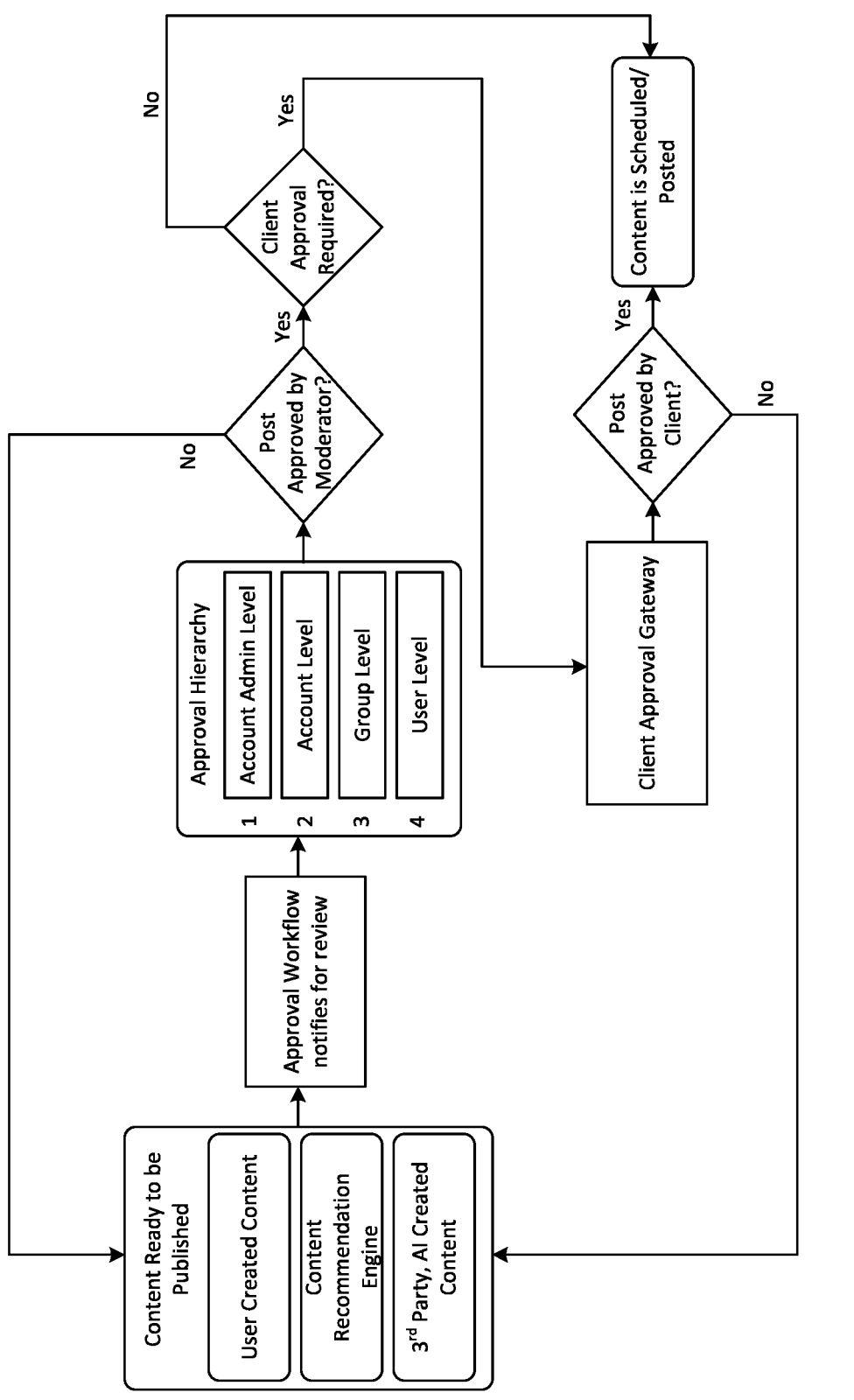
FIG. 6B is a further iteration of a communications platform for directing, monitoring, and managing a communication campaign from a single dashboard interface, e.g., of a client computing device, in this instance directed to a methodology for approving the generation and distribution of communications.

As can be seen with respect to FIG. 6B, the system may be configured so that any given moderator may be authorized as an overarching communications manager or director, e.g., from the business headquarters, may be in charge of overall messaging. In such an instance, the local and/or group account level moderator can be authorized to approve all messaging, or the system may be configured such that a higher authorization, such as from the group or corporate moderator needs to have final approval prior to messaging distribution. The opposite can also be true, where it is the local account holder that has the final approval authority. In any of these instances, as can be seen with respect to FIG. 6B, communications that have been created by a content generator and which have successfully passed the conflicts checks and are ready for distribution, may be transmitted to a communications manager, e.g., a communications moderator, for review, correction, and/or editing, prior to distribution, such as in a communications workflow process.

As indicated, such a moderator may be at the location, group, and/or account level, and such approvals may need to be attained from one or more of these levels before being approved, and upon rejection, the system or moderator may give feedback as to what would be necessary in order to put the communication in a condition for distribution. In effectuating an approval process, all of the flagged communications can be collected, the rule-offending and/or conflicting content can be highlighted, suggested remediations may be made, and all of this may be presented to the moderator, e.g., relevant stakeholder, in one or more screens or windows of a dashboard interface. In such an instance, the moderator may scroll or toggle through the messaging, review highlighted subject matter of conflict, and be presented with one or more options for correcting the conflict and approving it for distribution. The content can be user or system generated, such as by a content moderator and/or by the content recommendation engine, and/or can be $3^{rd}$ party AI created content.

In a manner such as this, a moderator can oversee the communications of a variety of locations, e.g., from a single interface, and can correct the messaging, e.g., by making an appropriate selection or implementing corrective modifications directly to the messaging so as to normalize communications throughout an organization despite there being multiple locations serving a variety of diverse needs. Particularly, the dashboard interface will give a user the ability to edit messaging to their preference, and while editing will flag any content that abridges a pre-selected rule of the communications system. In various instances, once edited the message may be re-sent to the content generator for review and/or for implementing corrective instructions.

The data for tracking this iterative process can then be fed into the AI module of the system, and/or of a $3^{rd}$ party system, so as to better train the system in recognizing offending matter and also providing more pertinent corrective measures to remediate the same. This information can then be fed into the content recommendation module for use thereby. For instance, in various instances, the system may include a content collection 12 and evaluation 14 modules where online, e.g., social media, content can be searched, identified, collected, evaluated, and be prepared for use in new communications. This content can be collected in a variety of different manners, such as over a network or API interface or RSS feed.

The use, modification, approval, rejection, and re-modification data of this type of content can then be fed back into an associated analytics or AI system, such as in a feedback loop, so as to better train the content collection, identification, evaluation, and communication generation models of the system. In various instances, the communications architecture can be split between organizations, such as where the business organization contracts out the messaging creation to a communications agency, but retains the permissions and approvals authority, whereby the agency may hold one or more local or group account authorizations, while at the group or corporate level retains final authorization for approval. Hence, in certain instances, two or more keys, e.g., local or group and corporate permissions, are required for approval. Any number of keys can be required for approval and distribution.

In another aspect, once the communication has been generated and/or approved, the communications platform may be configured for determining a peak time by which to post or otherwise distribute the various communications being broadcast by the system. As can be seen with respect to FIG. 7, the system may be configured to determine exactly when the peak time is for a local brand's customers to be maximally engaging with that brand's social media modalities, such as FACEBOOK®, TWITTER®, and the like, and thereby determines a schedule for when various crafted communications should be posted, on which social media modality, and to which audiences so as to get the maximum number of engagements with the posted communications. Specifically, the system may be adapted for determining, e.g., via a suitably configured API, RSS Feed, or the like, exactly when the peak time is for a local brand's customers to be maximally engaging with that brand's social media modalities, and thereby determines a schedule for when various crafted communications should be posted, on which social media modality, and to which audiences so as to get the maximum number of engagements with the posted communications.

Figure 7:
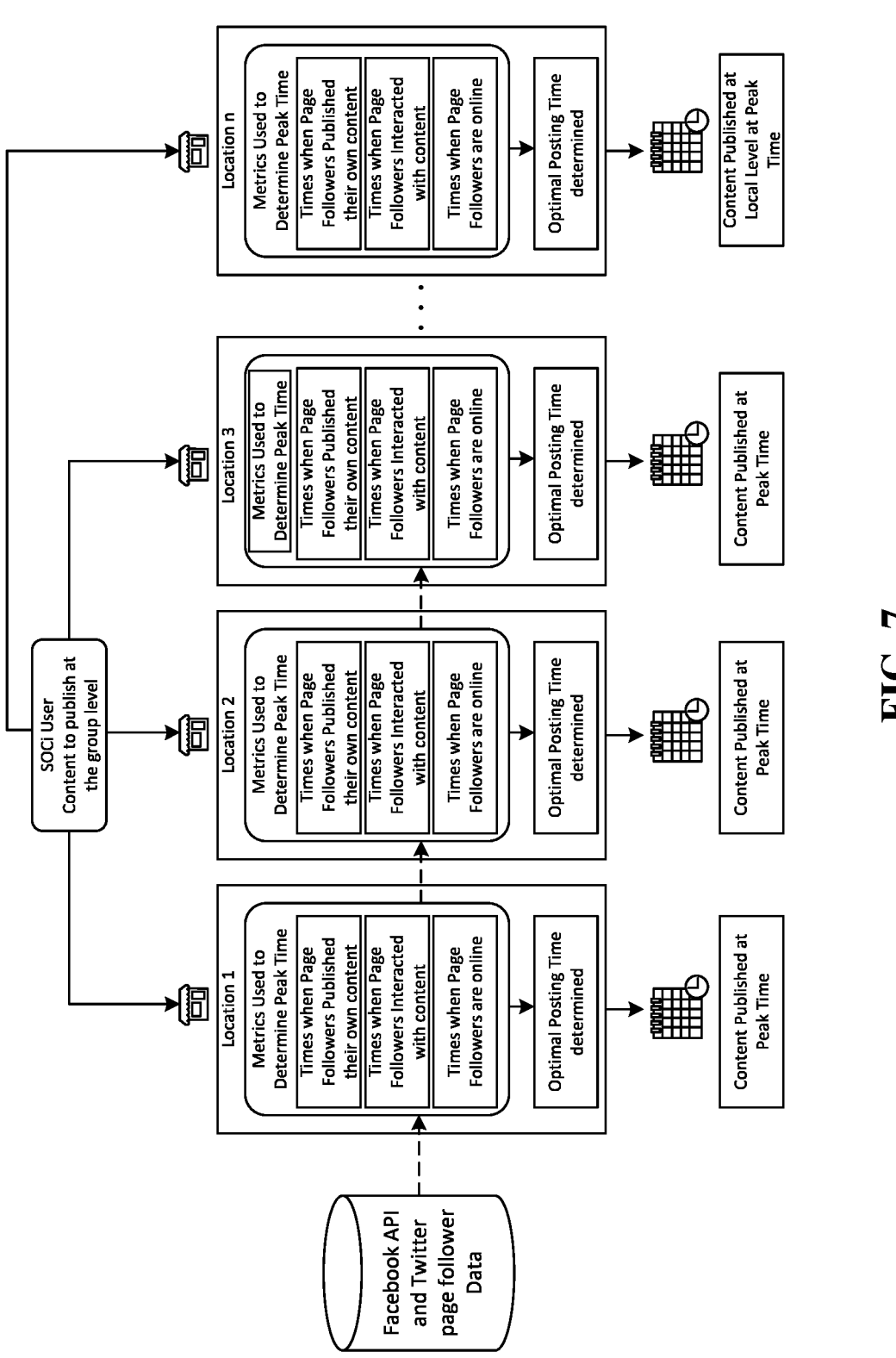
FIG. 7 is another iteration of a communications platform for determining a peak time at which to distribute generated communications.

Particularly, in various instances, as depicted in FIG. 7, the communications platform may be associated with an AI module of the system, together these modules may be configured to determine a level of traffic at each webpage at each website for each account level for all of the locations of an organization. In this manner, the system can determine one or more trends and patterns in the timing of posting for any particular location for a brand employing the communications platform so as to determine when the optimal time for distributing a communication will be, such as a point in time at which webpage traffic in a community market place is at its highest. For instance, a statistical analysis may be performed whereby an optimal time for distribution of the communication may be determined so that such transmission may be made at a time when it has the highest probability of being seen and/or interacted with, e.g., peak time. Such a determination can be made system wide, for all locations, where messaging is desired to be distributed, whereby a separate, independent analysis of each location's individual characteristics, and the various metrics that define them, can be employed to determine peak traffic times during which a given communication, and the content it contains, has the highest probability of being engaged with, which may in part determine the type of content to be included in the messaging based on a correspondence between the characterizations and/or metrics of the peak time online users, e.g., as a group, and various characteristics, and/or metrics, of the communication content that are designed to reach those online consumers.

As depicted in FIG. 7, the structure of one or more of the dynamic databases and/or the system authorizations may be configured in a hierarchical structure that matches the corporate or business hierarchy. In this instance, the corporate or other business head office, represented as being at the top of the hierarchy in FIG. 7, has the maximal authorizations and those who handle communications from the business headquarters, e.g., at the group level, may be given full access, and the permissions by which to access all modules of the system as well as to authorize the granting of access and controls to all those down the hierarchical structure, such as at locations 1, 2, 3, and "n". Accordingly, the chief communications officer in the head office has authorized three+sub offices, such as franchisees serving local communities, the authorization to generate and distribute communications via their own local social media accounts to the consumer's in their local environs.

In this instance, the local franchisee owners, e.g., serving San Diego, Los Angeles, and San Francisco, have the freedom to generate and send their own messaging within a determined rule set and within their local region, but they do not have the authorization to send messaging outside of their defined region nor prevent content from the head office from being pushed downwards and out through their franchisee social media pages. There may, however, be group or regional communications directors that can send communications at the regional level, e.g., all of California, whereby any messaging at this intermediate level gets pushed out to all of the local offices, but the group level may not necessarily have access to push messaging outside of his or her region. It is understood with respect to this example that only three locations are provided, any number "n" locations can be included state, nationwide, and globally, and messaging can be controlled at different levels with regard to any number of differing sub-groups. Hence, although in this instance, only 3 levels, e.g., the account or corporate level, the group level or median level, and the location, e.g., local account, level are provided, a number of levels may be provided in a variety of sub-divisions. Here, the account level would be the highest level having permissions that extend to all access.

Further, prior to distribution, such messaging may be subjected to a conflict check so as to ensure message consistency, and once successfully completed, the communication can then be posted or otherwise distributed. For instance, the system my include a conflict checker module 44 for performing a conflict check, such as where the conflict checker 44 may be engaged, as described herein, so as to ensure that the same recipients and/or commenters, within the same region, are not receiving the same, e.g., canned, responses at the same level within the same range of time, and the like. Where content is recommended for use, its implementation may be effectuated by a number of different mechanisms, by which the recommended material may be selected and integrated into a communication, such as by an integration engine 24 of the system, whereby the conflict checker 44 analyzes the communication being generated to ensure the same or similar content has not been previously employed within the same region, at the same or similar time, with respect to the same content being incorporated within the same communications being crafted.

For example, the selection and presentation of content to be incorporated into a communication may be analyzed with respect to its previous use, and where there is no conflict, content may be presented to a system user whereby a selection of available content may be made by clicking on the suggested material, dragging and dropping the material into its selected region of integration, and the like. However, where proposed content conflicts with previous communications, it may not be presented to the user for selection, or may be presented but not made selectable. Hence, in particular instances, the integration engine may work with the recommendation engine to not only recommend content to be included in the communication but to also suggest where the content should be included, can then perform the integration, such as where there is no conflict. Such content can be a word, a sentence, a paragraph, several paragraphs, an entire document containing several pages and images, and the like. Therefore, a conflicts checker 44 is another useful module of the system, whereby consistency in brand messaging may be monitored, controlled, and assured.

Figure 8A:
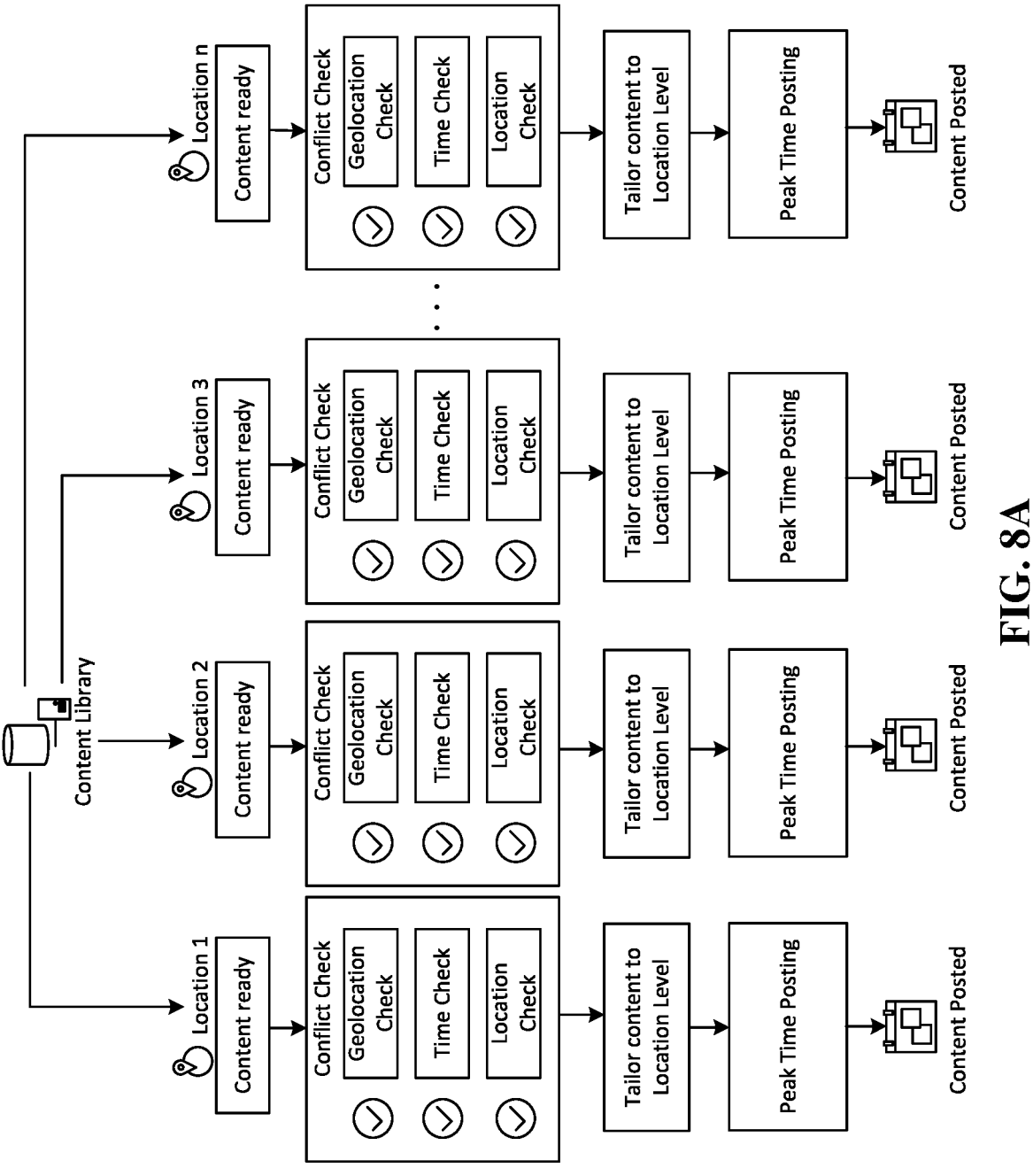
FIG. 8A is a first iteration of a communications platform for determining whether there is a conflict with regard to communication distribution.

For instance, a conflict checking module 44 of the system may be configured for monitoring and tracking messaging being crafted and/or transmitted by the various different branches of an organization employing the system and the business arms that are employing the system to manage their communications. Particularly, as can be seen with respect to FIG. 8A, the system may be configured for determining both duplicate and conflicting messaging, flagging and correcting such conflicts, and preventing such messaging from being transmitted when a non-resolved conflict condition is determined to be present. In various embodiments, the system may be configured for performing a routine and persistent rules-based conflict check, such as where the rules to be applied can vary dependent on the global demands of the system, while at the same time accounting for the specific particulars of each local community outlet. For example, in various instances, it may be useful to configure the system such that duplicate or conflicting messaging, e.g., sales offers, not be sent out within the same market, at the same time, and to the same audience, because in doing so such duplications and conflicts may cause confusion and a loss of engagement in the target audience. The content and/or conflicts module 44 checks and manages the communications flow from the various content libraries and throughout the system, can flag conflicts, suggest remediation for such conflicts, and ensure that all messaging being sent out through the system is fresh and conflict free.

In a manner such as this the communications platform of the system may autonomously provide each account at each level with a broad range of content for each social media platform so as to generate an automatic loop of messaging content generation, distribution, tracking, collection, and evaluation. Given the hierarchical framework of the various processing engines of the computing system, as well as the expansive operability of the AI module of the system, content flowing out, in, and through the system can be rapidly checked, evaluated, and transmitted on a location by location basis all at near real-time. For instance, in one exemplary embodiment, 70,000 (or more) messages may be in the process of being posted at over 30,000 locations, through a variety of social media platforms, whereby the conflict checker assures that all messaging is consistent and non-duplicative, system wide. Consequently, in various embodiments, every time a post is assigned to be transmitted by a specific location, before or after that post is actually approved so as to be allowed to be posted to that page, it may go through a conflict check.

Hence, in a first step, the system may perform a geolocation check, such as by determining the global positioning of a given location utilizing the system, such as with regard to its position both latitudinally and longitudinally. In such instances, this data may be employed to determine the distance between the various locations of a brand serving the same or similar communities, and based on determined rules will determine whether the locations are too close to one another to distribute the same or similar communications, such as within 1, 5, 10, 25, 50 or 100 miles or more away from each other. This step is useful where there are multiple branch offices serving communities that are proximate to one another, and it is important that the messaging within these close knit communities is consistent, non-duplicative, and non-conflicting. Accordingly, the system will spread messaging out in such a way that locations in close proximity are posting completely different content for a determined time period prior to any kind of overlap occurring.

Then the system may perform a check for content that was posted by other locations within that vicinity and within a determined time period such as for duplicate or conflicting subject matter. Particularly, the second step may determine a time-check period within which duplicative messaging is prevented from being distributed, and/or during which messaging content may need to be structured in a manner that uses different wording to express similar content. For instance, a tag may be generated for each content element of each post whereby a unique identifier may be associated with each piece of specific content. The tags may then be tracked and traced so that the system can identify the exact history of every post containing that content, from which locations and in which contexts it has been employed, where and when it has been published, and the amount of engagement it has generated.

Hence, for each post its entire history from collection, evaluation, scoring, to its use in crafting new communications, as well as its effectiveness once posted may all be tracked, traced, and evaluated. This may apply to subject matter used as elements within a communication as well as the communication as a whole. And in various instances, part of this tracking may include determining when, where, and if, communication content has been used too frequently for a location, audience, or time period.

An additional conflict check on a more granular level may include a specific location by location or message by message check, so as to determine when any particular message is posted at any particular location on one or more social media platforms conflicts with prior messaging at that location and within a same or similar time period. During this granular conflict check it may be determined if and when a proposed message to be distributed conflicts with a prior message at this location that has already been distributed. At times, it may be of particular importance not to have duplicative or conflicting messaging being distributed by the same location at the same time.

The conflict checks module may be built on intelligence that is performed on at least 2 or 3 or more layers of checks that the system performs before a communication is posted. Controls for configuring these conflict checks can be set at any and all organizational and system levels. In a manner such as this conflict checks can go all the way to the account level (corporate), the group level (regional), and/or project level, e.g., at a single location, which controls can be set at each location. In such a hierarchy, the project level may be overridden by the group level, which may be overridden by the account level, or vice versa, dependent on how the permissions have been structured. Finally, the post history may be checked to prevent conflicting and/or duplicate posts or other messaging, and all of this can be performed nationwide in a scalable manner that helps avoid user error when posting across a large number of locations.

Accordingly, in view of the above, the system may include a conflicts check module 44, where one or more conflict checking processing engine evaluates the content of a communication, such as via implementation of a natural language processor, text and/or image recognition unit, and the like, whereby the similarity and/or difference between two different communications from the same or different users of the system, such as competing users of the systems with competing offerings, and within same localization, cannot post the same or similar content within the same or similar time frame. For instance, when multiple users of the system are generating and distributing messages, there should be a manner by which the system and its users can check for or otherwise determine a conflict in messaging, either within or between organizations. For example, in one use model, a user within an organization at one location may desire to post or otherwise distribute a piece of generated content, but would like to ensure that the content to be posted does not conflict with organizational approved messaging, previously posted content, or content posted by other organizations.

So being, the system may be configured for running a conflicts check. The conflict check may be based on filtering for use of certain keywords, content, geography, and/or other pertinent messaging. The system may be arranged so as to scan for words, e.g., from a list of hot or active words, used in posting material by the system or its users, for searching for phrases and/or the same or similar content previously used, as well as for postings made within a predetermined geographical location, such as within a determined radius of a previous content distribution, such as within a mile, 2, 3, 4, 5, 10, or more mile radius of a defined location of posting, and/or within a determined set timeframe, e.g., within 1, 2, 3, 5, 7, 10, 14, 21 days of one another. Such conflicts may be run with respect to all social media platforms, or for posting at a specified social media or other internet page.

Hence, there are several different types of conflict checks that may be run, such as with respect to content, timing, geolocation, and the like. In various instances, an alarm may be triggered where a conflict is determined as to content, time, date, location, and the like, and where a conflict is determined, the system may automatically prevent posting and/or may autonomously substitute or modify the content or its scheduled release date so as to resolve the conflict. In one instance, where a subject matter conflict is determined, the system may substitute one content item for another, such as by performing a search, identification, and selection operation from a content library of the system. This conflict checking, however, can be a monumental task in instances where the organization may have thousands of locations generating thousands of messages being generated and posted at various times of various days.

Figure 8B:
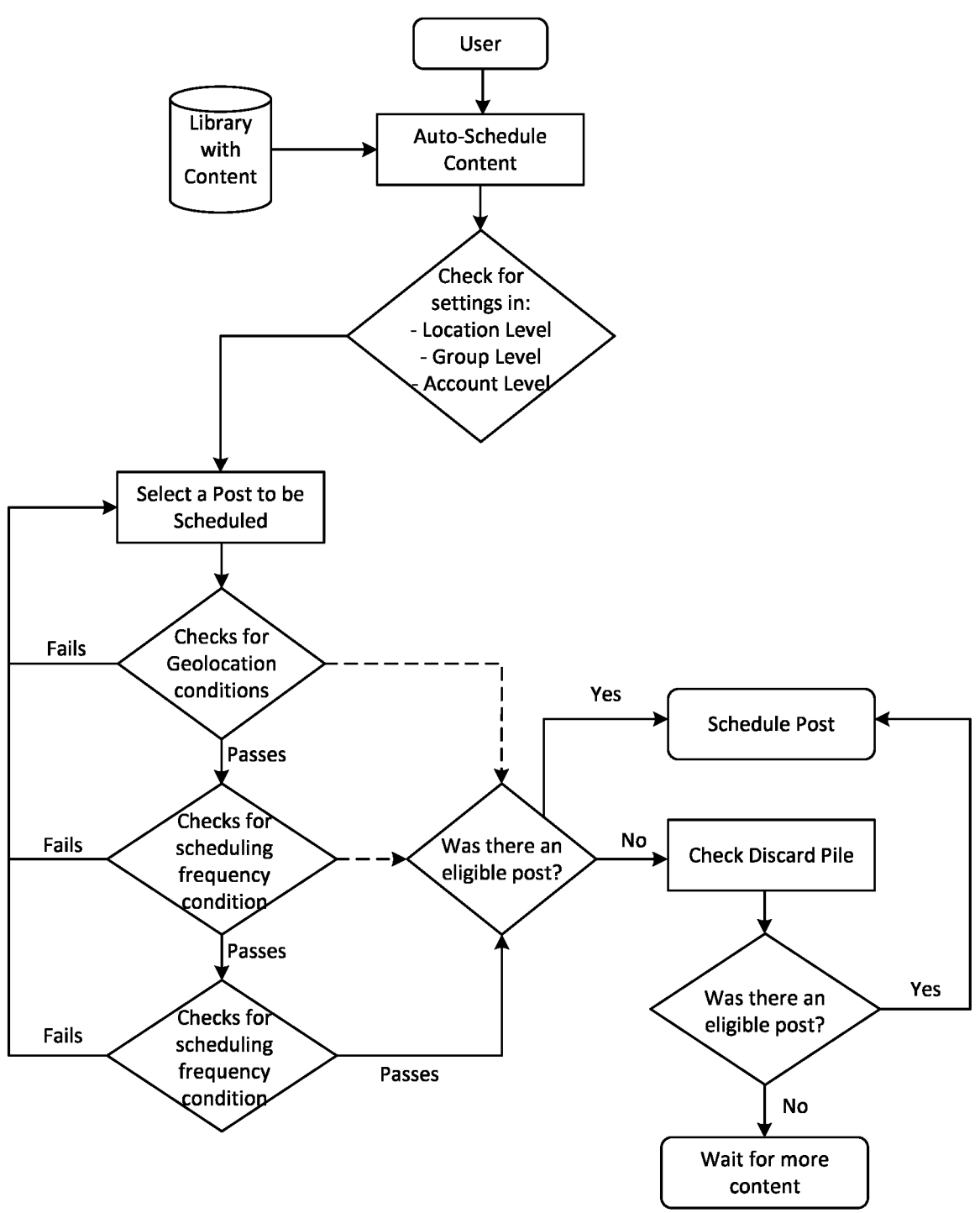
FIG. 8B is a second iteration of a communications platform for determining whether there is a conflict with regard to communication distribution.

In view of FIG. 8B, the system may include a conflict checking module whereby a user can access a client computing device so as to manage messaging generation and distribution over a multiplicity of social media modalities and across a large variety of locations, e.g., from a single user interface. The conflict checks module 44 provides an in-built intelligence system and controls for checking a post's historical attributes so as to prevent conflicting, repeated, and/or duplicative content being published. The controls can be set at every level, e.g., at the overall account, group, and individual location or project level.

In such instances, conflicts and duplications in messaging can be governed by a user selectable set of rules, such as with respect to the history of a post or its contents. Particularly, when generating messaging, e.g., to be included in a post, such messaging can be retrieved from a content library and can be scheduled for autonomous distribution, such as when one or more triggers occurs. However, prior to generation and/or distribution, a conflict check can be performed so as to evaluate a potential conflict within the messaging of a post with regard to three major elements including geolocation, e.g., regional area, timing, and specific location elements.

For instance, a geolocation conflict check may be performed whereby conditions related to the proximity within which content was last used can be evaluated. A time check may also be performed whereby conditions related to the duration of time that has passed since the content was last used may be evaluated. Additionally, the last time a specific location used the content in messaging a specific audience may also be evaluated. If any one of these conflicts checks fails, new, non-conflicting content, scheduling, and audience can be proposed by the system, and the checks re-run until all three conflicts checks are passed. Upon passing these, and any other, conflicts checks set to be run, the messaging can be scheduled for being posted at the determined time.

If the conflicts check is not passed, the messaging may be sequestered, the content, location, and or scheduling and modality of the posting can be changed, until all conflicts checks have been passed and the messaging posted. These conflicts checks may be preformed for all messaging across all locations to ensure content integrity and avoid duplication, so as to facilitate non-duplicative, catered content generation and distribution in a manner that avoids human error when managing large amounts of social media pages and feeds. In these manners, communications, e.g., advertisements and responsive messaging, may be generated and distributed through one or more social media platforms en masse. For instance, the present system architecture can not only handle but can also direct and manage thousands of messages, being generated and distributed, from a thousand different locations, with a thousand personalized and localized content and images, while also ensuring there is no conflict in messaging, approval is achieved, and messages sent at an optimal timing/scheduling.

As indicated, the communications can be distributed and tracked in a number of different manners, such as by being published, broadcast, multicast, unicast, posted, emailed, and/or otherwise transmitted over a network and/or an application programming interface. Specifically, in one embodiment, the system may track various generated and transmitted communications, individuals that have been identified by the system, as well as individuals that visit the webpages containing the transmitted communications and/or have interacted with them in some manner. This data may be identified, tracked, collected, and stored, such as via a suitably configured API that establishes an interface between the system and one or more social media platforms, such as via a FACEBOOK®, TWITTER®, or INSTAGRAM® API, and the like, where communication and consumer activity data may be tracked, retrieved, and stored.

In addition to using this information for the training of the system with respect to the generating, evaluating, and transmitting of communications, the collected data may also be used to determine communication traffic trends as well as use parameters and patterns, such as for determining high traffic times with respect to a given social media modality in a given location. In a manner such as this, the system can determine the optimal times when the most traffic is being experienced at a webpage of interest, such as a webpage to which a communication is to be distributed. For these purposes, a plurality of metrics may be collected and evaluated so as to determine peak time. For instance, one useful metric to keep track of may include the time when the greatest number of visitors to a page are posting their own content on the page, and are thus, determined to be the most active at that time. Accordingly, the system may assume that at that time, a communication from the company may have the greatest probability of being seen and/or interacted with.

Another similar metric to be tracked is when the majority of users on a given page or feed are engaging with content posted by others the most. A further metric to be tracked and/or evaluated depends first on determining an audience of interest, such as a group of interactive consumers that all share a common quality of interest to the business enterprise. The next data to be determined is when the majority of this identified audience interacts online, e.g., when they logon and logoff. This information is important especially in situations where a corporate communications manager desires to push communications downwards through the organization to all of the local communities being served by the organization, but does not know the particular demographics nor the time of greatest community engagement for each individual franchisee. In such a situation as this, a one-size-fits-all communication generation and transmission would not be efficient or optimally effective.

Accordingly, one or more, e.g., all, of these metrics and/or other metrics may be evaluated together so as to determine the best time at which to post content, for one or more individualized recipients, so that when posted it generates the greatest amount of interest, such as engagements, viewing a post, liking the post, sharing, and/or commenting on the post, and the like. For instance, webpage data for the platform upon which the communication is to be posted, may be collected via a suitably configured API or RSS Feed, such as where each of the collected data may be stored in a structured database of the system, and then, during the evaluation process the collected and processed data may be fed into a table or other graph like structure of the database, such as where each data point may form a constellation of nodes or branches by which one or more relationships, such as time and frequency of usage, may be determined. In particular instances, a nearest neighbor graph or other data structure may be implemented for these purposes.

The collected content can then be evaluated based on one or more metrics and/or factors, such as with regard to how well the content performs as measured by its reception by one or more online communities. Such factors may include the number of likes, up votes, or down votes, +1s, −1s, shares, forwards, comments it receives. Particularly, a frequency distribution, e.g., a histogram, may be determined for a first variable, such as the number of people, e.g., an identified targeted audience, online at a specific time may be determined, such as an initial starting point, and from this histogram a second variable, e.g., the time period, e.g., via collected timestamp data, at which the largest amount of selected audience members is online and/or posting data and/or otherwise interacting with posted data, may be plotted and a histogram generated by the system for each page or feed for each social media interface.

It is to be understood that although the provided histogram is being described with respect to determining peak posting time, such histograms are useful for performing other, e.g., all, of the different analytics of the system, such as with respect to geolocating, persona scoring, content recommendation, auto-responding, and the like. Additionally, once identified, the target audience may be tracked so as to determine the characteristics of their online activity, in order to build out a better persona database for the online consumer. All of this data may be collected via an API associated with the system and the social media platform, and from a statistical analysis of this data an optimal time and audience for message generation and transmission can be determined by the system.

Particularly, message recipient social data, e.g., what they post online, can be identified, tracked, collected, and used to produce an online persona of them, which online persona can be used so as to better identify products, goods, and services that may be of more import and relevance to the recipient. This data may be collected and stored in one or more databases of the system, such as in a structured database thereof, such as a CRM, POS, and/or other local database of the system. The collected data may be used to build a robust persona, which may be evaluated, weighted, and scored, such as based on their past engagements, e.g., impressions, conversions, purchases they have made.

In this manner, message recipients can be ranked one against each other and/or with respect to goods and/or services to be advertised to them. In such an instance, those with higher ranks can be delivered much more specific and specialized consideration and communications, such as including more specialized discounts and coupons. Such specialization allows for the consideration of more data points, more relevant and accurate keywords, better recommendations, as well as better predictions of the success of messaging and/or return on investments. For instance, in one implementation, a ranked recipient can be identified, their location defined, a product of relevance can be identified, e.g., based on past searches, impressions, or other engagements therewith, a local supplier of the goods and services can be located, and then a customized message may be generated, e.g., manually or autonomously, and then be delivered to the ranked consumer via their preferred social media platform.

In one aspect, provided herein is a further platform for generating an auto-response to one or more queries received at a user interface of a social media platform being engaged with by a potential consumer. Particularly, as can be seen with respect to FIG. 9A, in various instances, a given business organization may have a multiplicity of units servicing different local communities whereby each location may be conducting one or more conversations with consumers in their local society. Where the number of such units is small and the conversations few in number, then conducting a communications campaign may not be very burdensome. However, where the number of locations conducting conversations is large and the number of consumers being engaged with is numerous, then it may be useful to employ one or more specially designed chat bots for initiating and conducting conversations with any number of consumers.

As depicted, the system may include 1, 2, 3, or "n" number of locations that are configured for directing communications with any number of potential consumers in their local communities. In this instance 5 consumers per location are engaging with their local goods and services provider, where a chat bot of the system is simultaneously conducting communications with each potential consumer at each location, and is thus, managing 20 different conversations. Particularly, depicted herein is a chat bot communication module that is configured for running conversations, at the group or corporate account level, whereby all the potential consumers engaging with one or more social media platforms at the local level can be communicated with by the chat bot. In this instance, however, the chat bot is configured as an auto-responder, and thus, can receive and parse incoming inquiries from a large number of locations, e.g., 100, 200, 400, 500, 1000, or more locations, and in response thereto provide previously generated responses to the queries. The auto-response module 50 is useful in this instance for autonomously conducting communications where it would otherwise be overwhelming for one, or two, or a small number of employees to manage by themselves, and too costly to have a large number of employees handle the amount of conversations being conducted, such as where the number of potential consumers being communicated with may include 10, 100, 1000 or more per location, all of which may need to be communicated with on a daily basis.

Figure 9A:
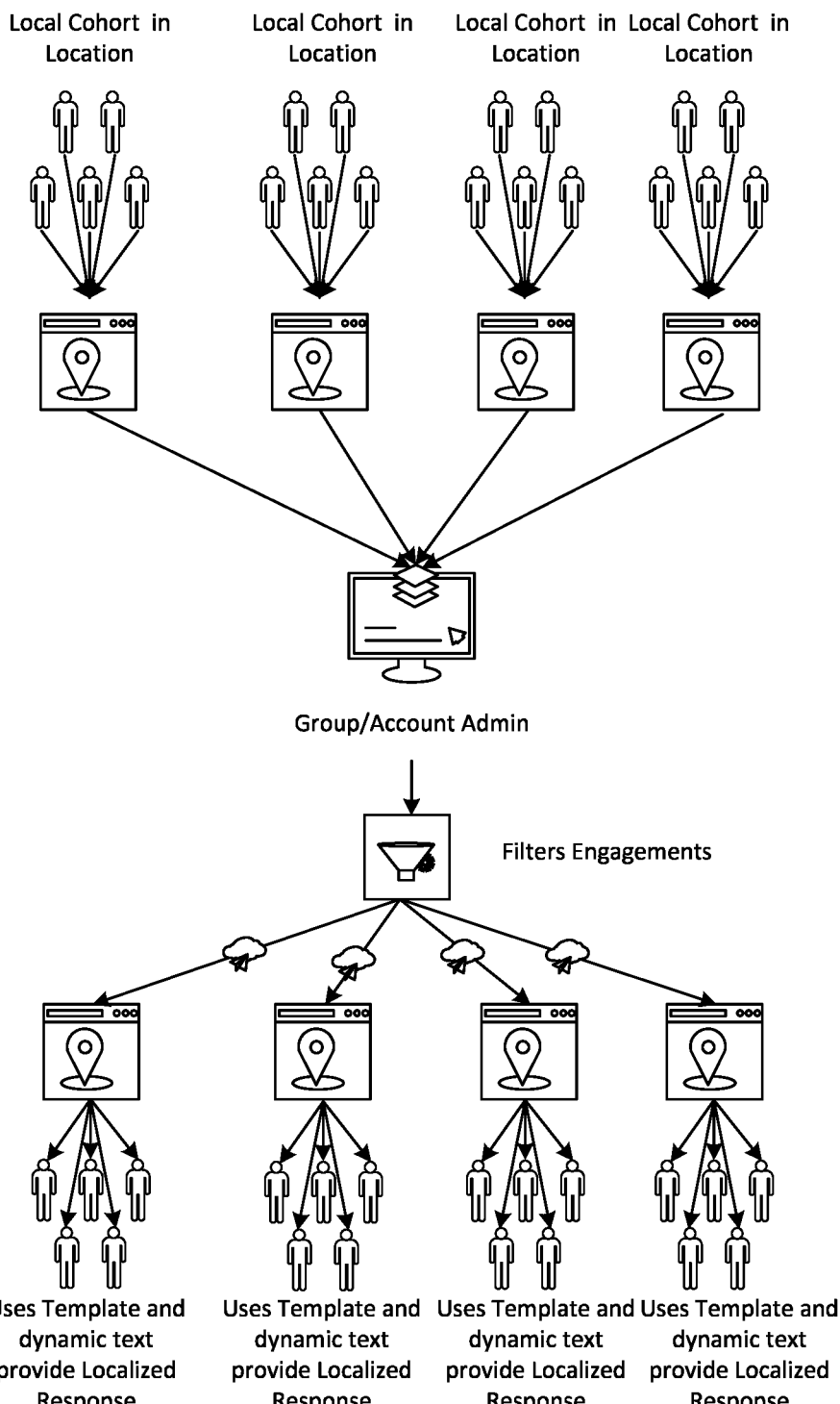
FIG. 9A is an iteration of a communications platform for implementing an autonomous communication generation methodology of the disclosure.

Particularly, as depicted in FIG. 9A, the smart bot auto responder 50 may include one or more filters, such as a key word filter that is configured for parsing incoming queries based on the wording used. Consequently, dependent on the words used, a number of basic categories of questions can be identified, and the pre-generated answers thereto can be searched and retrieved from a database by a smart bot of the auto responder module of the system, such as based on a number of designated rules. Any number of rules can be set up and mapped to any amount of responses, where the analytics and/or the AI module of the system may perform an analysis so as to determine the best match correspondence between the keywords of the query, based on the applied filters, and their relationship to one or more answers that may fit the query as a response to different degrees. Based on this correspondence, an answer to the question can be selected and be presented to each consumer engaging with the various social media platforms of an organization employing the system to manage their communications.

Accordingly, such rules may include simple responses to simple engagements, for instance, where a five star review is given, a positive response like a "Thank You," or a coupon can be automatically generated and presented to the consumer, where as a three star review may provoke an automated response like "I'm Sorry, please contact us at this email address or phone no. to discuss how we might improve." However, a one-star response may be flagged for human intervention and response. In a manner such as this, any communication that comes in that does not need to be flagged for personal review and response can be fed into the auto-response module for automated response generation with or without review and approval, such as where the responses are pre-generated, canned responses and not necessarily autonomously generated responses.

Hence, as can be seen with respect to FIG. 9A, provided herein is a communication platform for responding to incoming communications, such as autonomously. Particularly, the platform may be configured so as to include a dedicated auto-response module that is adapted so as to enable effective messaging consistency and reputation management, at scale, by automating a response workflow for engagements, which may be a rules based construct for crafting individualized messaging that adheres to user or system generated set of rules. For instance, with respect to the scaling of the auto-responder, it may be configured for effectively running communications all the way up from the centralized head office down to the group level and further down to the individual account level. This is important because the higher up the responsibility within an organization one advances, the larger the influx of messaging one must engage with and the greater number of engagement notifications one has to contend with that will need to be resolved, such as from the cohorts from numerous locations. A system that can be tuned to review and segment incoming engagements that can be responded to by an auto-responder from those that require personal attention, as presented herein, is very useful.

For consistency purposes, it is further useful for the system to incorporate a set of rules that can be consistently adapted and applied throughout an organization regardless of level and amount of incoming correspondence that need be responded to. Such rules may be applied by one or more filters that may be configured to narrow down the need for human response where it can more easily be handled by a chat bot, e.g., a smart bot, of the system, such as based on expressed indicators of positive, neutral, or negative engagement sentiment. For instance, incoming communications can be received from cohorts from any number of locations, and the various messages can be transmitted to a centralized repository where they can be parsed, e.g., based on sentiment, such as where neutral or good sentiments may be directed to the auto-response module, and the more negative responses can be flagged for more personalized, e.g., human, response.

Likewise, incoming messaging may be parsed based on rules pertaining to the sentiments expressed in a review, comment, mention, personal message, share, and the like, such as where a number of positive or negative indicators are used to separate messaging for human or auto response. Other factors to be considered in parsing posts and other communications may include time passed since message creation and/or posting, such as where engagements that are long overdue a response may be flagged for human intervention or may be given a first auto-response, and then be flagged for receipt of a more catered response, such as within a given time period. An engagement status may also be used to determine the level and quality of response, such as if the status is opened, resolved, archived, new, and the like. In such instances, where an auto-response is determined as being appropriate, the response may be prepared based on one or more pre-set templates and may then be localized using dynamic text, such as where localized data is called into one or more data fields or containers of a more generalized template. In certain instances, the auto responses may be generated and employed as a mechanism for saving time, effort, and resources.

Figure 9B:
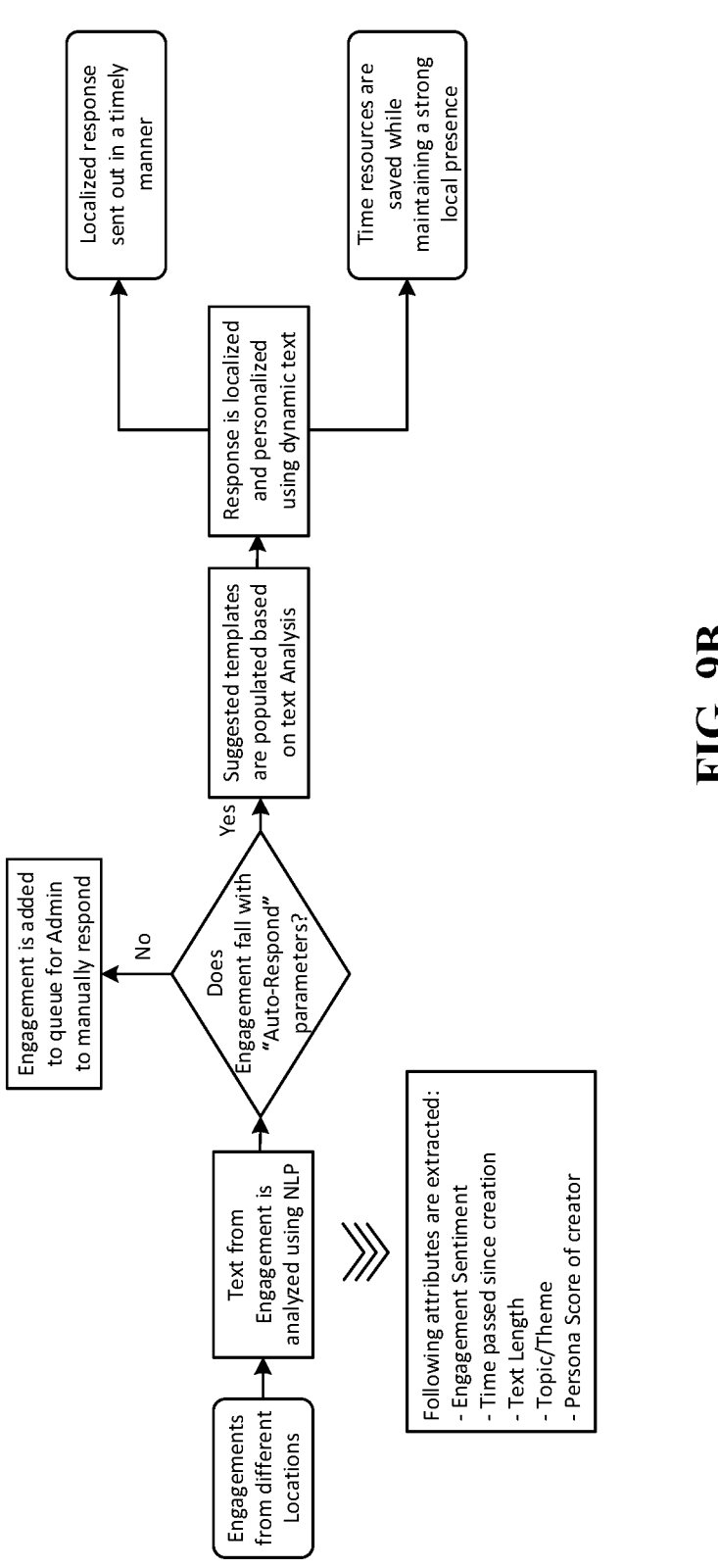
FIG. 9B is another iteration of a communications platform for implementing the autonomous communication generation methodology of FIG. 9A.

Particularly, as can be seen with respect to FIG. 9B, incoming communications in need of a response, e.g., engagements, can come into the system from a wide variety of locations. The system may then perform a character and/or image recognition assessment, such as employing natural language processing engine, to determine and/or extract, one or more attributes within the communication by which a level, quantity, and/or quality of a response can be determined, such as where engagement sentiment, time passed since message generation or receipt, text length, topic or theme can be used to determine if an auto-response is warranted, and to what extent, such as where it is determined if an engagement falls within the parameters of an auto-response, or if a more human intervention is necessary. If an auto-response is appropriate, based on the determined rule set setting, then the level and type of response, such as ranging from a canned to a more intelligently crafted response, can be determined, or if an auto-response is not appropriate, the engagement may be flagged and added to a queue for an administrator or moderator to manually respond, although, in such an instance, the system may generate one or more response recommendation for review and/or selection by the moderator.

Where an auto-response is appropriate, a more tailored response generation methodology may be employed, such as where a more personalized template may be selected by the system, such as via a correspondence between one or more characteristics of the recipient and the corporate, regional, or local orientation of the messenger, and further, the messaging content may be selected from a database of content that has previously been determined to be effective given the particulars of the parameters of the communication context. Hence, in such an instance, a suggested template may be populated with content based on a text as well as a contextual analysis performed by the system. Particularly, the text to be selected, or generated, for use in messaging may be localized, such as by utilizing a dynamic text module.

Once generated, crafted, or otherwise assembled, the communication may then be configured for distribution, such as in a timely, e.g., predetermined, manner across a variety of locations to a large number of cohorts where each member of the cohort receives the same general message format but with messaging content, e.g., text and/or images, that have been particularized to them. In a manner such as this, time resources may be saved while maintaining a strong local presence, and yet ensuring an overall consistency in messaging look and feel.

In various embodiments, the system may be configured for allowing for reviews of identified content, either content that was generated or collected, as well as for reviewing the communications produced from such content, either prior to or after such production. In certain instances, the sharing may be internal to the organization, such as where the content and communications are transmitted to an authority within the organization for approval thereof. Where internal reviews and approvals are requested with respect to content and communications of the system, the system may include an internal messaging routine so as to allow commenting back and forth, such as between system users with respect to the content being reviewed. In particular instances, a multi-level approval hierarchy may be implemented, whereby a number of individuals, such as at different levels of authority and/or responsibility in the overall business organization, may be required to be passed, e.g., approved, prior to a communication being transmitted. Specifically, content, once evaluated, and/or communications once generated and/or scored can then, if desired, be sent to one or more other system users for approval, such as approval for use as content in the production of communications, or communications that have been produced and are scheduled to be distributed.

Figure 10A:
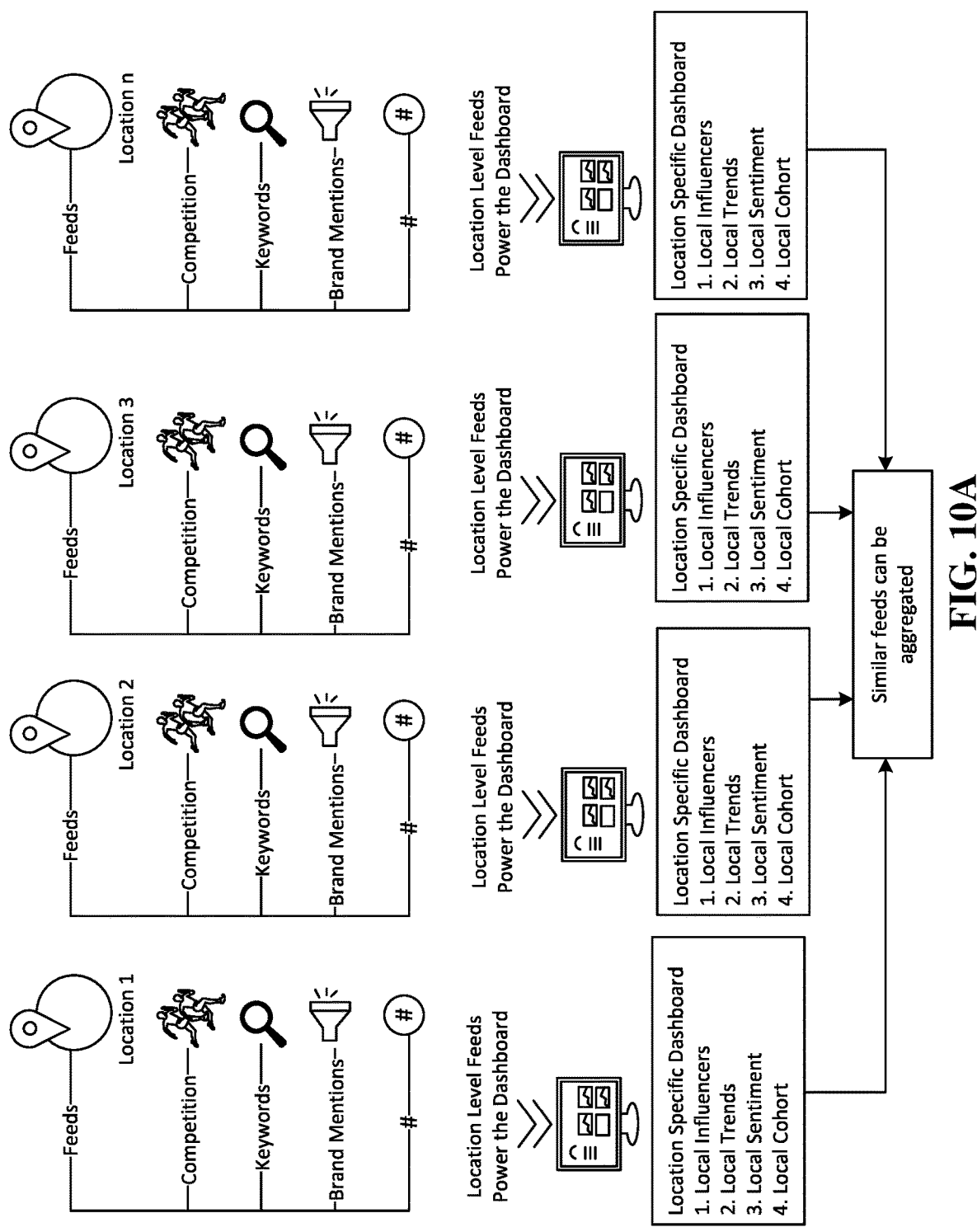
FIG. 10A is a first iteration of a communications platform for performing social listening with respect to determining the affect distributed communications have on recipients.

Once posted, or otherwise transmitted, the messaging can be tracked along with those who respond to the messaging. For instance, as can be seen with respect to FIG. 10A, another aspect of the platform is a social listening module that is configured for allowing both of global and local businesses to track and keep tab of the general sentiment around their reputation through collection, receipt and/or analysis of a constant stream of intelligent data pertaining to the quantity and quality of online communications that are taking place pertaining to that business. Particularly, in various instances, the system may be set up to regularly collect data, e.g., comments, from various online platforms, social media platforms, for comments and commentary regarding the business entity, such as with regard to their reputation.

With regards to reputation monitoring, the reputation of the business communicator as well as the reputation of the communication recipient can both be tracked and monitored, such as by a reputation module 40 of the system, which reputations can affect the range of scores being attributed to message makers and recipients, as well as the type of communications being generated and transmitted by and to them. For instance, the more a communication recipient engages with communications from a business communicator, the higher their score will be in a positive or negative direction depending on the sentiments they express. Accordingly, the system may be configured to determine the type of responses being transmitted from, and being received by, the system, and determining the response time period, and where the messenger is a communication recipient that is determined to be a social influencer, the type and timing of communications to such social influencers may be based on influential factors with respect to how much influence the commenter has over others with regard to the comments they make online.

The reputation manager 40, therefore, can track the comments and sentiments made regarding one or more businesses, and evaluate the social influence of those comments and commentators, such as based on a number of metrics directed at weighing the effects or influence those comments will have on others. And when a conflict arises between a provider of goods or services and a consumer commentator, the system may perform a search for various parameters that can be used to characterize the social influence of the consumer with respect to their ability to employ their particular social network to influence other potential consumers, and these factors may as well be considered when crafting return messages to the commenter. More particularly, the system may include one or more social listening and/or reputation management processing elements that are configured for monitoring and implementing one or more, e.g., a plurality, of feeds, such as local level feeds, which may be set up to keep businesses aware of their surrounding online commentary.

Such commentary may include any comments from competitors or competitor customers that express sentiments, engagement levels, business and/or reputational trends of competitors and their success, and the like, such as from a variety of locations having an online presence being monitored by a plurality of feeds. For instance, one or more keywords, virility, or velocity filters can be set such that when sentiments are expressed about a company, or other entity employing the system, may be set so that the system will then track and capture words, phrases, captions, commentary, and the like, which express sentiments about the company, or its competitors. These filters may be keyed to look for and retrieve content that employs critical keywords that correlate to business health and consumer or competitor sentiment, such as with respect to brand mentions.

The collected data can then be analyzed with respect to collected keyword and sentiment data, e.g., positive or negative brand mentions, such as the frequency and/or number of brands being mentioned and the sentiment attached to the mentions, and the like. For example, data pertaining to tags and hashtags that indicate the health of the business can be collected and analyzed, and in response thereto the data from one or more feeds may be compiled, analyzed, and be populated to the local, group, or account based dashboard interface for easy viewing, which can include one or more calls to action for responding to the collected analytics, thereby increasing proactiveness and awareness within the communications strategy being implemented by the company. As indicated, such feeds can be aggregated at the group, account, and individual level to get general brand health across regions.

Figure 10B:
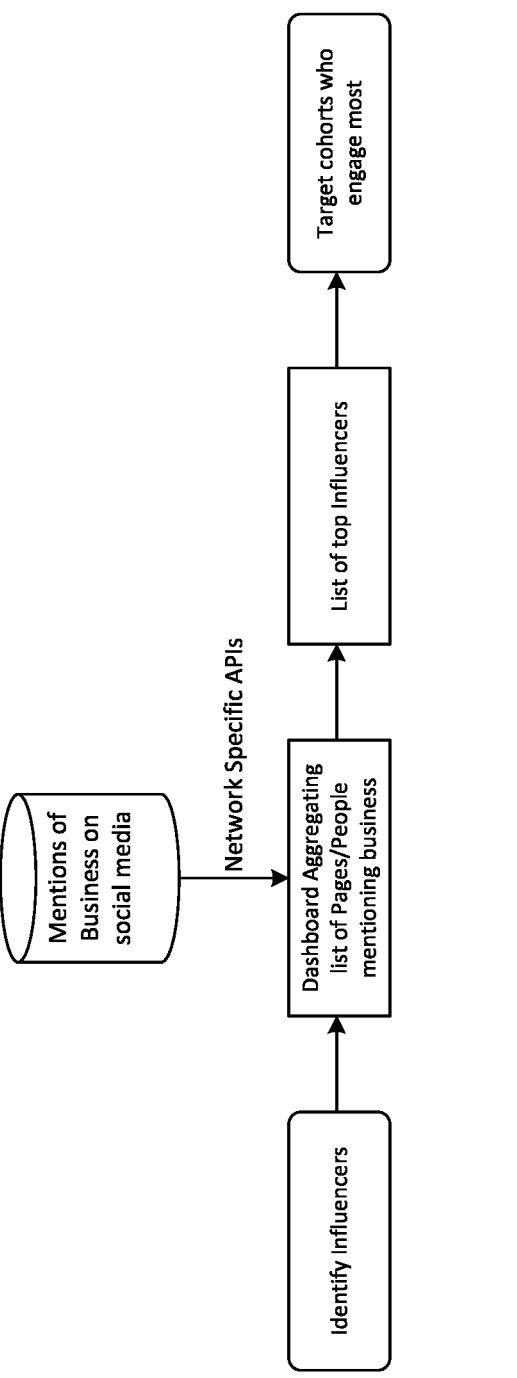
FIG. 10B is an exemplary methodology for determining the affect distributed communications have on recipients.

Accordingly, as can be seen with respect to FIG. 10B provided herein is a methodology for implementing a social listening and reputation management protocol. For instance, at a first step, a query can be sent so as to access, via one or more feeds, one or more social media platforms, for one or more mentions of a business, organization, or persons working or advertising therefore. Such platform access may be achieved through one or more suitably configured APIs, RSS feeds, and the like, whereby data associated with business mentions and/or affecting the reputation of one or more associated business entities may be collected, aggregated, analyzed, and presented to a user of the system such as at dashboard interface, whereby a list of relevant content, communications, pages, people who mentions the business concerns can be presented to the user, along with associated data pertaining thereto. One useful implementation of the present architecture as well as its method of use is that it allows the system to identify people, pages, and/or topics that may be relevant to the business that are trending, such as where messaging or communications related to them are experiencing increased virility and/or velocity of online interactionality, during which periods, the periodicity of messaging may be boosted or otherwise increased.

One or more processing elements of the system may be configured for performing analytics on the collected data, and therefore, may score, rank, and order the collected content with regard to those elements deemed to be influencing one or more popular trends, such as where those atop the list are evaluated as influencers to be followed, and where their followers may also be followed. In this manner, the system and its platforms can help lead a user, e.g., an account holder, to identify, collect and access information regarding cohorts to be targeted for increased or otherwise enhanced engagement.

Accordingly, in one aspect, a useful feature of the present system platform is an artificial intelligence module. For instance, as can be seen with reference to FIG. 11, the system may include an artificial intelligence unit that is configured for performing machine learning and predictive analyses, such as via one or more suitably trained inference engines. For example, in a first iteration, the AI system may be configured for accessing and utilizing the collected data such as for analyzing, scoring, and/or recommending content to be used, such as in identifying one or more trends in online usage and/or in generating communications to be distributed to one or more locations and/or to one or more target audiences.

For these purposes, the AI system may include a machine learning module that is configured for using collected data for the purpose of engaging in a series of training protocols so as to generate and develop a predictive model, such as for making one or more predictions about an outcome, e.g., of an advertising campaign, to be successfully achieved. Likewise, the system may include an inference engine, such as where the inference engine is configured for employing the predictive model in achieving the predicted result, and testing the ability of the model so as to successfully achieve the results. The inference engine may then propose one or more suggestions for modulating the predictive model based on how closely the actual results correspond to the predicted results based on the modeling.

Hence, in this instance, along with the machine learning module, an inference engine may be provided for the purpose of evaluating data, determining trends, scoring content, and/or recommending such content for use in generating communications to be targeted to a specific audience, such as where that content has been tested with respect to its usefulness in achieving desired and/or determined objectives. Consequently, as can be seen with respect to FIG. 11, in evaluating content, a first step may include the collection of content and/or data pertaining to an organization, its products and services, its consumers, and the like. Content can be collected from any suitable source, such as a source of online content, e.g., from external data, e.g., RSS feeds, one or more accessible content libraries, e.g., stored in a categorized data structure, s described above, or directly from content that has been posted on a social media platform.

In this instance, regardless the source, the content collected can be text, image, graphic, video, or other media rich content, which content can then be passed to a natural language processing system for processing thereby, such as for conversion into a textual and/or numerical format and/or embedding. For instance, in various instances, content data can be converted to embedding that may form one or more arrays of numbers by which content items can be classified, categorized, and/or compared one with the other, such as via a natural language processing unit. This may be performed on all collected content with regard to one or more subjects and/or classifications, and a list of all content being evaluated, including any metadata pertinent thereto can be generated and used by the system in the evaluation process. This data may be fed into a data structure, such as a knowledge graph, which may then be used to perform the various predictive analyses provided herein, which graph, or other structure, such as a table, knowledge tree, and the like, which may then be mined for data, such as through the analysis of one or more relations between data within the structure. In various embodiments, an approximate nearest neighbor analysis may be performed so as to mine the data structure and determine one or more multi-class classification operations, such as based on the various distances between the data points forming nodes in the graph.

For instance, in one particular implementation, the artificial intelligence system may be employed for analyzing and scoring a variety of data from a number of different intelligence sources. In such an instance, content collected and to be analyzed for use in generating communications and/or predicting one or more other consumer engagements may be general posted content and may include past posts by specified or other locations. In certain implementations, the scored content can be fed into a social post predictor module, such as for the purpose of performing a predictive analysis on the data, such as with regard to predicting how one or more identified and/or characterized consumers will engage with various scored messaging content. For these purposes, within the graph formulation, when scoring content, each neighbor's likelihood of success may be determined.

Figure 11:
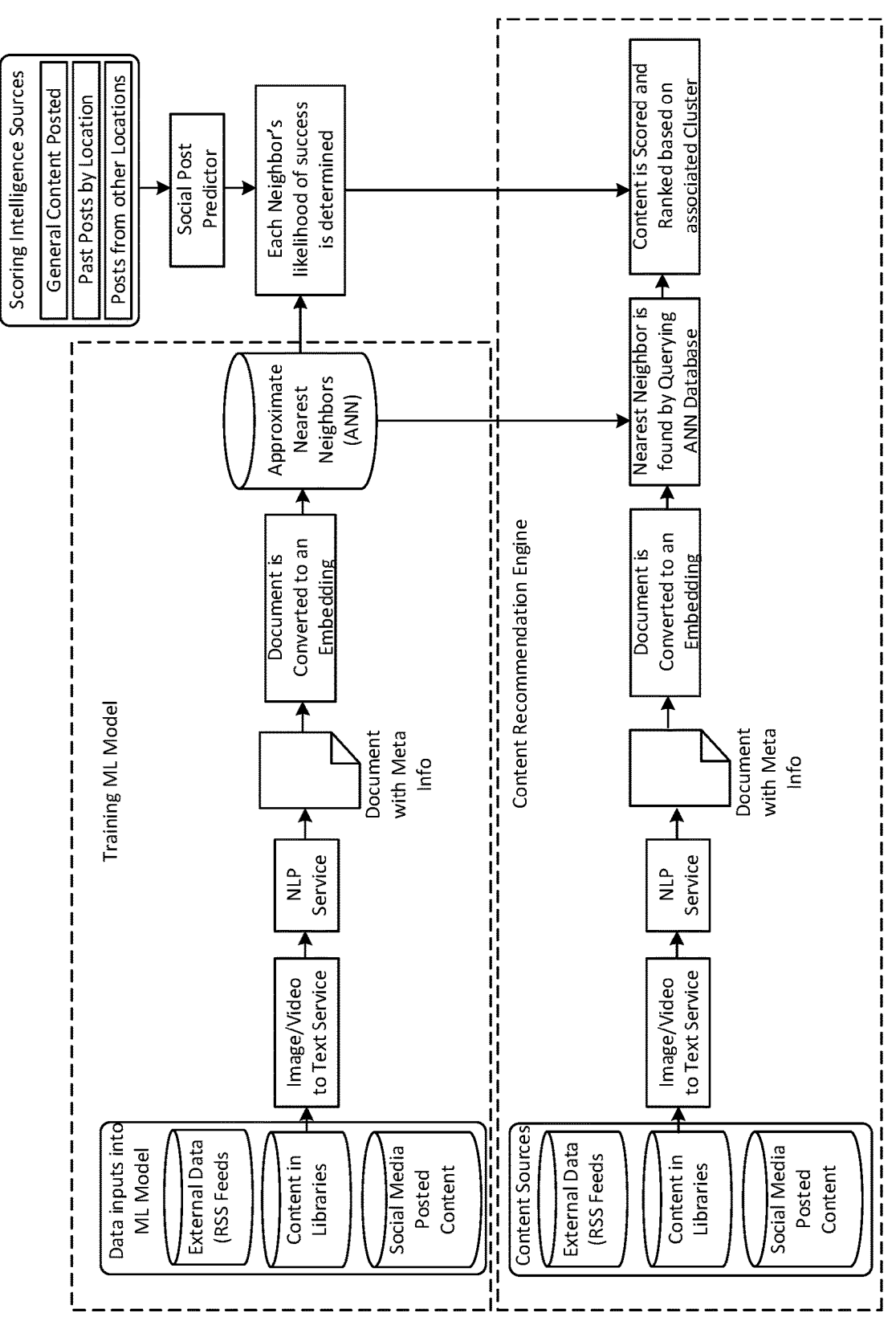
FIG. 11 is an implementation of an artificial intelligence platform for use in autonomous communication generation.

For example, as can be seen with respect to FIG. 11, in one particular implementation, a content recommendation engine 22c is provided. In such a usage model, content can be retrieved from one or more of an external data, e.g., a really simple syndication (RSS), feed, a content library, or content that has been collected from a social media platform. Image and/or text data, such as media rich content, can be extracted and analyzed, such as via a suitably configured NLP component, whereby the result can be embedded and fed into a data structure for an approximate nearest neighbor analysis, such as for facilitating the performance of one or more queries. In a manner such as this, content can be scored and ranked based on an analyses of the relevant associated clusters. This data can then be used, such as by a content generation module 16 of the system, so as to generate one or more communications for transmission, as discussed herein above.

Accordingly, in view of the above, in particular instances, it would be useful to have a system where one or more of the steps of identifying, collecting, and scoring content, as well as the use of that content to generate and distribute a communication is intelligently automated. For instance, it would be useful for the system to include a suitably configured artificial intelligence (AI) module 29. For example, the system may include a content collector, such as a web-crawler, which is configured for collecting data, such as data relevant to how particular content, for example, content that is part of an advertisement or other communication is performing. Such data may be directed to one or more customer reviews of a retailer, which reviews may be either good, bad, or indifferent, consequently, it would be useful to have a system that once such data is collected, it can be categorized as to being positive or negative, can be pooled with other such collected data, one or more negative trends may be identified, and where positive, those aspects of the data that are determined to contribute to the positive trends can be enhanced and amplified, whereas if the identified trend is negative one or more corrective procedures can be initiated. In various embodiments, the AI module 29 of the system may form a platform that includes a machine learning unit, having one or more processing engines configured for generating one or more predictive models, and further includes a predictive inference unit, also having one or more processors configured for applying the generated predictive model to collected data so as to make one or more predictions with respect thereto.

Accordingly, in various instances, it would be useful to have a system that can pool data, evaluate the data for content, recognize trends with respect thereto, make one or more predictions based on those trends, and then in view of the same take one or more responsive actions. In this manner, when certain online content to be evaluated evokes a negative response with targeted consumers, this negative trend can be identified, the cause of the negative reaction can be inferred, a list of corrective measures can be generated, and one or more corrective measures from the generated list may be implemented until the negative trend has been corrected. If need be, the list of corrective measures to be enacted may be prioritized as to their predicted impact for correcting the trend, and the corrective measures may be implemented, e.g., system wide, such as sequentially starting with the corrective actions predicted as having the greatest impact in the shortest amount of time for correcting the negative trend.

Therefore, a number of corrective actions may be implemented until the downward trend is reversed and/or corrected. A similar implementation can be engaged with respect to enhancing an upwards trend until the progress has substantially slowed or stopped. Hence, provided herein is a workflow system that can scan, collect, and evaluate content for positive and negative trends, and one or more actions in response thereto can be suggested and/or implemented. For instance, where a positive trend is identified as being the result of a particular content factor, the system may make the suggestion that future communications contain more of that positively trending factor. Likewise, where a negative trend is identified as being the result of a particular content item, the system may make the suggestion that future communications do not contain more of that negatively trending factor.

For example, where a company is associated with one or more market influencers, who produce online content, the system may identify talking points to and to not be engaged with, such as by determining the percentage positive or negative reach various online content has, and can then make a recommendation to the market influencer to talk more or less about a given subject so as to enhance or correct for any given trend. More particularly, where a market influencer has thousands of conversations being engaged in at any given point in time, the system may indicate a small number of conversations and/or content items that are providing the greatest percentage of reach, and may, therefore, suggest to the market influencer which conversations and content to focus on to maximize their influence in a manner that has its predicted greatest value to the influencer and/or to the brand(s) they represent, e.g., these three conversation streams represent 60% of reach, therefore, the system may be configured to focus more time and content generation that is directed to these conversational topics.

Accordingly, in one aspect, a key feature of the present system and methods, is their use in determining a consumer's actions with regard to making a purchase, such as to ensure that the decision to make such a purchase, or take a desired action or meet a determined objective, is actually due to having engaged with and/or viewed the communication, and not simply due to a the fact that the consumer was already predisposed and/or likely to make the purchase anyway. Specifically, in this context the system may be configured for determining and measuring how a transmitted communication affected a communication recipient, with respect to the meeting or not of a system determined objective. Such a measurement may be made to determine if a proposed consumer activity actually resulted in an increase in a desired result, e.g., an increase in sales in response to the communication, e.g., advertising, campaign, and/or one or more components thereof. Accordingly, the platform and its various systems may be configured for monitoring, measuring, determining, influencing, and optimizing a desired objective, e.g., increase in views, engagements, and/or sales and the like, so as to determine how any given communication element of a marketing campaign and its advertisements impacts the consumer in taking a desired action, e.g., the conversion rate.

More particularly, a predictive analysis may be implemented in a manner so as to measure how the designed communication campaign impacts one or more key metrics and/or objectives of the communicator, e.g., the advertiser and/or promoter of goods and services. Specifically, a predictive analysis may be implemented by the system in a manner so as to determine what effect, e.g., what direct effect, the communication has on a consumer's decision to act in a favorable manner toward the communication content. More specifically, a predictive analysis may be configured in such a manner so as to distinguish those who would have taken the desired action, e.g., made a purchase anyway, even having not been exposed to the communication, from those who took the desired action, e.g., made a purchase, as a direct, or at least as a proximate, cause of having seen the communication, e.g., the advertisement influenced them in making the purchase.

Hence, in one embodiment, one or more of the processing engines disclosed herein may be configured for determining an increase or decrease of achievement toward a defined objective that is due to the effects of a communication campaign on recipients, such as where a level achievement may be calculated as the percent increase or decrease in one or more reasons or metrics evidencing a consumer's amenability or interest in the objective who were exposed to a new communication campaign versus a control group. For instance, in a general sense, an increase or decrease may be determined by calculating a conversion rate for those having seen a generic communication content, e.g., a public service announcement, in control, and then subtracting that result from a test group that has been exposed to the actual communication. The increase result may then be divided by the original (control number), which may then be multiplied by one-hundred so as to determine the percentage increase due to a consumer having been exposed to the advertisement.

In various instances, those in the control group may be presented a public service announcement instead of the communication, e.g., advertisement to be tested, or may simply be analyzed to determine if they would have been exposed to the communication, and/or having been exposed to the communication if they would have been converted. In this manner, the system may be configured to perform a predictive analysis, and in receiving the results thereof, may score one or more of the communication content and design elements of the communication with respect to their individual contribution to an overall increase or decrease towards achieving the determined objective, e.g., increased views, increased sales, increased engagements, and the like. This score may then be used by the system, and or its users, when deciding which elements to use in making a decision as to which communication elements to employ in generating a future communication, e.g., advertisement.

In various instances, the results of the analytical analyses may be used so as to determine not only what the communication should say, but also how it should look, as well as the feel of the communication, so as to create custom and/or lookalike advertisements, such as for generating a national communication that is catered to a plurality of local audiences. Particularly, along with determining an increase or decrease, one or more of the system components may be configured for running a multiplicity of analytics of the collected and/or analyzed data. This data may be used in evaluating the collected content, so as to score it, such as with respect to its ability to increase in movement toward an objective in one or more consumer groups.

In other instances, the data may be evaluated in a manner so as to manage the reputation of the communicator, e.g., advertiser and/or company being promoted, such as by collecting data regarding the results of the communication campaign, determining if collected content from consumer's evaluations of the communications, and its content and design elements, are either positive or negative, and where positive weighting future use of those content items and/or design elements more heavily, and where negative decreasing the weighting of them or preventing future use of them all together. Particularly, the platform may include an analytics and/or AI module configured for performing a plurality of analytics, such as a predictive determination, a reputation management system, and for performing one or more other evaluation processes. In particular instances, the system may be configured for using the results of the analyses so as to derive one or more insights from the analyzed data, which insights may be reported to a user of the system, or may be autonomously used by the system so as to better select the communication contents, media assets, design elements, and the like, of the communications and/or advertisements to be generated. More particularly, the system may include one or more modules containing one or more processing engines that are configured as a content recommender, a communication generator, a social listening device, a reputation manager, an insights generator, and/or a reporting engine.

For instance, collected content and recipient responses thereto, the factors leading to them, and other data, such as objective data and recipient characteristic data, may be used in determining messaging content as well as a target recipient audience and/or a target region within which to distribute the content to be generated, which data may then be used to further determine communication content. For example, an audience within one or more geographical regions may be determined, and based on the characteristics of consumers within that geographic location, individual content may be selected to better reach that target demographic. Such demographics may be based on location and/or other factors, such as age, gender, wealth, commercial trends, ideologies, personal biographies, online usage and engagement, as well as posted online materials, and other such characteristics.

Accordingly, the system may be configured for generating, reviewing, and/or tracking the online activities of the system, those using the system, those engaging with the system, communication recipients, their social circle of influence, and/or its communications, as well as 3rd party online influencers who may be commenting on the communications and/or commercial transactions of one or more businesses, e.g., communication generators, of the system. Particularly, in certain instances, the system is configured for evaluating online communications, user engagement with those communications, and based on those engagements determining connections and patterns in the behaviors of the users of various social media platforms in response to those communications. The evaluating may be based on one or more selected or system determined objectives, such as with respect to increasing brand or product awareness, reach, engagement, duration, impressions, conversions, lead generation, and/or audience interests, as well as for determining a budget for running one or more advertisement campaigns.

The system may be configured for determining one or more audiences, e.g., dynamically, for receipt of a dynamically generated advertisement, as well as for determining one or more objectives by which to evaluate the effectiveness of that advertisement campaign. These connections and patterns may be directed to how communications and content are being consumed by online consumers, e.g., social media users, how it is being commented or otherwise acted on, and what types of actions are being evoked via recipient online engagement with the community, the communications thereon, and/or the system as a whole. Specifically, these evaluations may be made with respect to how given messaging, e.g., from a business, is being received and/or acted upon, such as by the sentiments it receives and/or whether or not it trends upwards or downwards or not at all.

The system, therefore, may determine and analyze this data, discern various patterns thereby, and develop one or more rules or objectives therefrom, which rules may then be used to either collect new more pertinent content and/or to craft new more useful communications. Other rules, developed from identified patterns of various relationships between online information consumers and online information providers, such as with respect to goods and services being provided, may also be determined and implemented, such as in evaluating and generating new content and communications.

Hence, one or more patterns may be determined by the system, specifically via a suitably configured analytics and/or AI module thereof, the pattern can be used to derive rules by which the communications system can be configured to generate new content and communications, in a dynamic manner. These patterns can be used to generate communications that can be more tailored to a target demographic and/or distributed to them in a more engaging manner. In such instances, not only one but a multiplicity of communications may be generated substantially simultaneously all having the same template and containerized architecture but containing different, e.g., localized, media components, assets, and other content, such as localized images and texts that are particularized to local economies, individualized recipients, and the like.

Consequently, one or more actions may be taken by the system, in view of the identified relationships and/or determined patterns, so as to make the system more effective and efficient at reaching its determined objectives in a cost-effective manner. For instance, the system may determine a relationship between the various communication recipients acting online and/or upon the system. The system may as well identify and/or determine the factors relating thereto, such as with respect to how certain content is being received by the online community and/or is trending online. Once a pattern with respect to how the content is behaving with respect to evoking user engagement, e.g., based on contained content and the determined objectives, has been identified and determined, the system may take one or more actions, e.g., increasing or corrective measures, to generate new content that either boosts successful messaging, or corrects unsuccessful messaging for use in generating and distributing new communications.

Accordingly, in view of the above, the system, e.g., an analytics or an artificial intelligence module thereof, may be configured for performing one or more analyses on collected content, communications built or to be built on that content, the audience to whom that communication is to be targeted, and the circumstances during which that communication is to be delivered, and one or more patterns may be determined by which an optimal communication content can be determined, an ideal audience for receiving the communication can be determined, and the peak time to deliver the communication, e.g., based on a per market analysis, can also be determined. Likewise, based on these analyses, the system may also be configured for evaluating the various content of the system, and given one or more of the other determined parameters, the AI of the system may flag and/or recommend ideal content to be included in the communication, recommend who should be included in the target audience, and when the communication should be posted, such as on a region by region and/or target by target basis.

Hence, once one or more patterns or trends have been established, a correlation between the communication and its achieved objectives may be determined. Such objectives may include the maintenance or generation of content interest, engagement with the content, and/or sales, factors affecting the attainment of that objective can be isolated. The content may then be used as a parameter by which other communications and/or an audience thereof, can be formulated, composed, and/or otherwise structured and/or recommended for use. High performing data and content, therefore, can then be scored and stored for later use by the system in generating new communications, as disclosed herein. The system may store the content based on the subject matter, categories, and scoring of the identified patterns, based on data derived from how online users are engaging with the communication and/or system as a whole, and/or other information that may be of use and/or applied to the later activities of the company, e.g., or other user, such as when weighting their future scores or other actions they take in generating new communications, interacting online with consumers, defining one or more audiences, and/or with configuring the system.

Accordingly, in various instances, the engagement of the communication target recipient, e.g., the defined consumer audience, with the transmitted online content and/or the system as a whole, may form regular interactions and/or patterns that may be recorded and tracked within the system. These patterns may be recognized and identified by the AI module of the system. In particular instances, the AI module may include a pattern recognition or machine learning platform, as well as a predictions module, together which AI module may be configured to recognize patterns, analyze them, and determine rules by which to re-orientate and/or calibrate the system.

Specifically, from these patterns, the machine learning and/or predictions module of the system may be employed to evaluate content, e.g., online content, and/or to characterize and define one or more communication recipients. One or more social media user's particular pattern(s) of behavior with respect to that content can also be evaluated. And a pattern in relationship between the two may also be determined, so as to then calculate the effectiveness and usefulness of the online content. Such evaluations may be performed for a number of different reasons, such as especially with respect to one or more determined objectives of a determined communication campaign.

This process is useful in situations such as where an online user's patterns of engagement with content and/or their use of the system appears to coincide or conflict with the patterns of usage of other users of the system. Specifically, the system may be configured for determining the presence of various factors influencing online engagement behavior, e.g., consumer behavior. In various instances, these may be a number of factors, such as factors pertaining to the ability of communication content to influence a consumer in making a purchase or other determined decision, as well as for determining which factors may be leading to that influencing, and to what degree.

Further, once these influencing factors have been determined, the system, e.g., via the suitably configured learning module, may then be adapted to produce rules or parameters that may be employed in generating a communication that capitalizes on such influences. For example, a predictive intelligence module of the system may determine whether the influencing factors are such that in view of them a weighting scale may be increased or decreased, which weighting scale may be used to weight both content and the connections between that content and its effect on the actions of communication recipients, such as may be caused by one or more identifiable characteristics of the target recipient. The system can also account for various influencing factors and other user actions that influence the outcomes of those actions that result. For instance, in various embodiments, one or more of these influencing factors may be included within the weighting regime.

Accordingly, in view of the above, when various patterns are formed, the system may learn these patterns, breakdown and learn the factors leading to the pattern, thereby determine the existence of and the reason for the presence of a trend, e.g., in communications, and/or predict a likely manner in which the communication recipients will behave. A level of confidence may be given to the predicted outcome, such as from 0.0, not very likely to 1.0 almost completely certain. Accordingly, when the system makes a correct prediction, e.g., that a given communication will result in a certain percentage increase in achievement toward an objective, such as a sales objective, the connection between the initiating action and the resulting action can be strengthened.

For instance, a first initiating event may be the identification of a target communication recipient demographic and/or defining an audience, e.g., with respect to one or more locations, and a second initiating event may be the generation and distribution of a communication to that target audience, where the communication dynamically includes elements known to positively influence consumer behavior, e.g., factors affecting movement toward a determined goal such as an increase in sales of an advertised product. A prediction may be made by the AI of the system as to the successfulness of the generated communication to achieve the sales objective with respect to the target audience. This prediction may be based on the strength, e.g., weighting, of the relationships between these various factors. So being, when a prediction is made, with regard to one or more initiating events, and the final outcome occurs, e.g., a communication recipient receiving and acting on that communication to actually make a purchase, the various connections that had led to the successful outcome may be strengthened.

In such an instance, when these same or similar conditions occur again, the system will be quicker to from predictions and based on those predictions generate communications and distribute the communications using these same or similar content types, with a higher prediction of their effectiveness. However, if the expected predictive event, e.g., sales percentage increase, is not reached or beaten, the system will then access the various weighted factors to determine why the model did not work, and corrections and/or recalibrations to the system and/or its component parts will be made so that a new predictive model can be developed.

Hence, in a manner such as this, when factors are identified as having a positive predictive correlation to one another, they may be deemed to be connected, and the strength of that connection can be increased. Further, the more the two items occur together, such as where a given communication results in an increased attainment of an objective, e.g., an increased number of sale for a given demographic, the weighting of that association can be further increased. Where the predictive model does not or ceases to work, the system may analyze the various factors and/or metrics, draw new connections, and re-weight the various defined connections so as to come up with a new predictive model. The new predictive model may then be used to generate new communications, with the expectation of increasing the objective outcome, e.g., increased sales or enhanced user sentiment, increased likes, increased engagement, increased consumer retention, increased reach, and the like. Hence, when a pattern is observed, and the predicted result occurs, the weight between the various elements in the predictive chain may be increased, making it more likely for this pattern to be propagated again and again.

However, when a pattern is observed, and the predicted results do not occur, the weight between the various elements in the predictive chain may be decreased and/or reorganized until a new pattern is observed or performed, such as in accordance with a prediction having been made. These predictive analyses are especially useful in determining the messaging and images and communication recipient characteristics that are to be weighted, scored, and used for generating communications, e.g., advertisements, dynamically. Particularly, the system can be calibrated such that a universal template, having an architecture that represents messaging, images, and a look and feel that is the same across the communications to be generated, may be employed as a framework, and within one or more layers of the template framework one or more localized containers can be positioned such that unique, individualized text and images can be dynamically called when generating the communication.

In such an instance, the advertisement may, therefore, include both a universal look and feel, such as representative of a national brand, but may also include location specific, geographically relevant images, text, and overall messaging. Likewise, these dynamically selected localized images and texts may be selected not only on the basis of their being relevant to a local audience, but can further be selected based on the scoring and predicted ability of their accomplishing a determined goal of a determined advertising campaign to be implemented by the system.

Accordingly, the connection between the action and a predicted outcome of that action, may be evaluated, such as by giving an estimation of a successful predicted outcome, e.g., an increased engagement, impression, conversion, increased positive sentiment, and the like, and when that estimation is proved out, the predictive model may be strengthened, such as for future implementation, and when they are not proved out, the connection may be weakened. Hence, in such an instance, messaging content, whether it be universal or localized, can be dynamically selected and employed in generating a communication not only on the basis of it having a high score and being relevant to one or more audiences, it can further be selected based on its ability to achieve an evaluated and/or predicted outcome. Particularly, predicted outcomes of messaging content may be made based on the totality of the variables being considered, such as where the same or similar messaging is being proposed to be used in a plurality of the same or substantially similar circumstances.

Thus, when a previous pattern is repeated the various variables identified by the system as leading to the pattern, and the connections between them, may be given more weight. Likewise, when a pattern is broken, less weight may be given to the various connections between the initiating action, e.g., the sending of a communication and various factors leading to the non-predicted outcome, and a new weighting and organization of the elements of the communication may take place until a new positive pattern is re-established. Changes in patterns can also be aggregated along various dimensions to group a plurality of communication content and target demographics together, and/or in the contrary, to group a number of social media users interacting online together, such as in a coalition, which groupings may be used to more precisely define and weight patterns of engagement based on their collective actions and/or interactions.

In a manner such as this, the system may be configured to keep track of the various content, communications, and/or social media users identified by the system, as well as their individual and/or group patterns of behavior, so that the various identified factors that may be influencing the emergence and/or maintenance of such patterns may be identified, predicted, and employed for a plurality of different uses, such as for dynamically selecting and employing universal and/or local images and texts, as well as other communication content, such as sentiments and the like. For instance, the system may be configured for determining and/or selecting the best content to use to form and generate the communications with respect to various defined target audience characteristics, which communications may be geared towards achieving a pre-defined, desired result, such as the increase in consumer sentiment and/or an increase in product or service sales, such as within a determined body of recipients. Hence, the system may be configured for selecting and determining a defined target audience, within one or more defined target locations, in accordance with one or more defined target demographics, such as within a multiplicity of target markets, and then uniquely catering generated ads so as to individually appeal to each recipient or recipient group.

In various instances, each advertisement to be generated may have dynamic text and images and newly generated communication content that are selected for use in generating communications, whereby the selections may be determined based on their ability to effectively achieve an objective and/or their correspondence between one or more characteristics of a target audience, such as where the desired objective may be the increase in target engagement with the communications and/or businesses of the system, to increase reach, generate new leads, and the like. Additionally, in various instances, the system may be configured for tracking effectiveness of the advertisement, and for taking corrective actions, such as to correct for communications and content that is not meeting its objectives. For instance, media elements, such as text and images for dynamically populating various containers of templates to be used in generating communications, can be individually evaluated, and those that work well can be given greater scores, whereas those that do not do well can be given lesser scores.

Specifically, the system may generate and employ one or more data structures that may be queried so as to predict an answer to one or more questions. For example, as described in detail herein, the system may be configured for receiving information with regard to the actions of one or more online, e.g., a plurality of social media, users. Such information may include website of interest information, content of interest information, target consumer identifying information, consumer social circle information, as well as social media engagement information, and the like. In various embodiments, to identify factors of particular interest to an online retailer and/or a consumer thereof, the system may present one or more users to a series of questions, such as via an automated interview process, the responses to which may be used to characterize and/or rank content that may be useful to a user of the system, such as for generating communications and/or for making purchases. Additionally, the system may track how various identified targets, e.g., consumers, engage with the content and/or the system itself, as well as the attendant data pertaining thereto, such as time, place, number of times per day, length of time engaged, who he or she messages or otherwise interacts with through an online social medium platform, who they follow, what events they engage in, what they purchase, what they post online, what they like or dislike, the sentiments they express, and the like.

All of this information may form data points that characterize any given content, message, communication, and/or any given social media user. These data points may then be employed as nodes within a data structure, which data structure may take any suitable form, such as a data tree and/or a knowledge graph, and the like. From these various data points, e.g., nodes, connections or relationships between communication content, users of the system, e.g., business, communication recipients, e.g., consumers, and their actions may be identified. These connections between the identified data points may be weighted based on the number and form of the interactions between them, and the various actions online users take in response to the communications they have sent and received may also be weighted. Hence, the more online user's interact with one another and one or more communications of the system, e.g., in a positive manner, the greater the weighting will be between the various nodes that may be employed to define their relationships and interactions.

Likewise, the more negatively the users interact with one another and the communications of the system, the less (or more negative) weight will be given to define their interactions. In similar manner, the more the user's interactions with the communications of the system are positive and comport with one or more other groups of the system, the more weight those various connections will be given, and the more the user's interactions with the communications of the system do not comport with one or more other groups of the system, the less weight those connections will be given. Further, in various instances, a user or the system may make a prediction as to an outcome that actually occurs, and in other instances, the predicted outcome does not occur, in such instances, more or less weight will be given to the system/user when predicting outcomes for future events, based on the successful prediction of outcomes of past events.

Accordingly, data points between the various nodes of a structured database of the system may be used to generate correlations between the nodes and to weight those correlations so as to build a data structure thereby, such as a knowledge graph or tree, which may then be queried to determine other relationships not previously known and/or to predict the influence of external factors affecting the usage of the system in generating communications, and/or to predict and weight potential outcomes of a conversational campaign based on a collective of usage patterns of how consumers are engaging with the various communications system. For instance, a data structure, such as a knowledge graph, may be generated by the system receiving known data about the various users of the system, e.g., a company, its franchises, and/or its employees and consultants, communications directors or advertisement agencies, and the like. The data structure may further receive data about various online users, who may be in some way related to or interested in the company, such as in a commercial way, e.g., they may be consumers or reviewers or commenters on the company.

Each of these entities may form nodes in the knowledge graph, and their interactions one with the other may be mapped and scored, such as where the interaction is positive, a positive score may be given for that interaction, and the same for the negative. Further, the various interactions may include the sending and receiving of communications, responses to communications, and actions taken, all of which may define lines of interconnectivity between these entities in the knowledge graph. This data may be received by the system such as via a suitably configured API connecting to one or more social media pipelines, and/or may be web or other data collector or crawler or data scrubber.

In a manner such as this, the system may be configured for building stars of data points that together form a constellation of relations, which relations are defined by a multiplicity of interactions that form webs between known business entities as well as their current and potential customers. Together all of these data points and their respective connections, one with the other, form a milieu of online and/or social media interrelatedness that can then be leveraged in forming as well as managing the social interactions of a company, especially with respect to successfully managing their communications within and outside of the organization, e.g., their consumer facing communications. These knowledge graphs and the various data points they represent may be used by the system to dynamically select messaging content, e.g., text and image data, in the generation of communications to be distributed online in a dynamic manner to one or more disparate audiences.

As indicated above, this data may be collected in a variety of ways, such as by system generated interviews of the various communication generators and/or communication recipients, system instigated accessing and review of social media usage by various identified targets of interest, as well as the usage by others of the internet, such as through postings of texts, photos, blogs, comments, searches performed, time spent in web-pages, web-page content, and other associated metadata through which a social media user produces a presence on the global internet, all of which data may then form various nodes of the knowledge graph. Such a procedure may be performed for a number of different user businesses and/or target consumers. Once online users, e.g., business, consumers such as communication recipients, and other interested parties (collectively "USERS"), have been defined and entered into the system, the users may be grouped in accordance with one or more system usage parameters, and known relationships may be determined between the various users in a pre-defined grouping.

The number of relationships between the various users as well as the strength of those correlations may then be determined and used to weight the known or fact-based relationships. Likewise, from these known fact-based relationships, previously unknown, inferred relationships may be determined, and weighted. In a manner such as this, the knowledge graph, or other data structure may be generated so as to include both known and unknown, inferred, relationships, which may then be leveraged to identify content that might be useful in enhancing engagement between the various businesses of the system with their perspective target consumers. Accordingly, once generated, the knowledge graph may then be queried along a number of lines so as to make one or more determinations with respect to the various relationships between the various nodes of the graph, as well as to leverage those connections so as to predict what actions may be taken to strengthen those relationships.

Essentially, in one implementation, the system can be configured to determine how a relationship between a business owner and its consumer may be strengthened, such as by engagement in a successful communications campaign that is directed to increasing consumer engagement and/or sales and/or the like. For example, the system may be employed to determine the content, both universal and particular, that should be used to generate communications that are particularized to a target demographic and/or configured for achieving a determined campaign objective. Particularly, the system may be configured to automatically be queried to determine if there is a pattern by which one or more users are interacting online with respect to one another and/or with respect to identified content, that may be identified and used to strengthen or weaken their relationships, such as by the messaging being sent from one to the other.

For instance, if one or more unrelated consumers appear to be engaging with the internet and posted content thereon, in the same or opposite manners, e.g., they are both making negative or positive comments about the same company or product, the system may flag their behavior for further analysis, a deeper dive into any possible relationship between the two users, their actions, and why those actions are similar or different, may be initiated, and a source of their possible correlation or dis-correlation, may be determined. From the strength of that relationship between the two users and based on the online sentiments they are expressing, a score may be given so as to weight the possibility the users may be evidencing a common theme, such as an objective or purely subjective experience of a business or product they are both commenting about. Such an interaction could evidence engagement, which may then be identified by the system, flagged for review by a system administrator, and/or the system can initiate corrective measures by which the consumer's engagement may be strengthened, such as by receiving positive communications from the subject company of interest, or they may receive corrective communications meant to correct their negative experience.

In various instances, the system may perform such activities automatically based on its own programming and/or in some instances may be initiated by an administrator of the system, e.g., a system operator, communications director, franchisee, or the like, may initiate such queries, and/or a deeper dive as to how various users are using the system and/or engaging online. Accordingly, in various embodiments, the system may be configured so as to be queried along a number of different parameters to determine and weight a number of different metrics and/or answers, and thereby make a variety of different predictions. These predictions may then be given a weighted score, such as to the probability of being correct, and based on that score, the system can generate communications and/or self-correct communications so as to properly account and/or correct for the predicted behavior of its users, such as with respect to their engagement with generated and distributed communications.

In a typical architecture for performing such functions, such as for performing a search query, e.g., for identifying useable content, the system may include a database of relevant content features. For example, one or more databases may be searched for content such as by employing a filter for one or more keywords, factors evidencing consumer's interests in a given subject business, communication recipient characteristic data pertaining to the consumers themselves, relational data pertaining to that consumer in relation to other online users, e.g., with respect to the messages they post online, and characteristic data pertaining to how the consumers have interacted with the communications of the system in the past. The system may also identify and/or pinpoint pattern data, as well as predictive outcome data of the past, present, and/or future, so as to narrow the search query and identify other characteristic data the system determines is relevant to the particular question being asked. In such an instance, the relevant data points may be identified and pulled from a general repository or dedicated database, and a localized data structure may be built.

Any data structure may be constructed and employed for performing the search in question. In various instances, however, the data structure may be a relational data structure, such as a Structured Query Language (SQL) database, which may be implemented via a relational database management system. For instance, in one implementation, the SQL database may be a table-based data structure, such as where one or more tables form the base structure wherein data, such as media content, may be stored, searched, relations determined, and queries run and answered in a structured manner. Particularly, in various embodiments, a table-based database may be presented, searched, and used to determine relationships from which answers to one or more queries may be determined. Typically, in such a data structure, identifiers, such as keys, are used to relate data in one table to that in another table.

For example, typically, SQL databases have a relational architecture. These constructions may be represented by a table structure. A series of tables or the word graph, explained above, for instance, may then be employed by which correlations may be made in an iterative fashion to identify keywords that may be of particular use in building a communication of the system. Specifically, with respect to whether a certain online user is positively or negatively engaging with a selected communication and/or company utilizing the system, such as with regard to a particular messaging campaign, a first correlation may be made between the subject's normal interactions online and those regarding the company and its communications. For instance, a first correlation may determine the nature of engagement with a company's and their messaging, e.g., in the past. This may be reviewed for a period of past engagements or non-engagements, and may be determined over a series of days or events, such as to determine a baseline for how well the consumer's interactions are consistent over time.

Then the results thereof may be compared to others treated in like manner to compare this subject against the mean or average of other consumer interactions overall (or with respect to their past interactions), such as described above with respect to the dynamic scoring and/or analysis module. This data may then be broken down and a first table, or other data structure, may be formed to record this data as a first use model sample set. Then, a second table, or other data structure, may be built whereby the subject consumer or a consumer group's current online use, with respect to a current communication campaign presently being performed, may be tracked and compared against the collective of current online users engaging with or otherwise responding to that campaign. The two data structures can be compared with one another so as to determine if the subject consumer's present interactions comport with their past interactions, and/or how their present use comports against the collective of relevant consumers, and then the different messaging involved with the two campaigns may be compared one to the other.

Where it is determined that a user's present use is outside of what would be their historical or predicted usage average, the system can flag the interaction as worthy of a deeper dive, and if necessary can begin to look for other correlations between this user and this campaign so as to determine possible explanations as to why this user's present interactions are outside of their predicted behavior. Specifically, where the data structure is a series of tables, the user's identifier may be searched and compared through a number of tables for a wide variety of correlations that may be determinative in explaining their present, aberrant experience with a given company's communications. Where a source of positive or negative interaction is determined to be present, the system can implement a corrective regime to enhance or correct for that experience.

Accordingly, a key may be used to correlate the tables, or other data structures, which key may be accessed in response to a question, prompt, or command, such as why the user's present use does not comport with their past use of the system. The key may be any common identifier, such as a name, a user ID or handle, a number, e.g., a RFID number, cellular identification number, a phone number, and the like, by which one or more of the tables may be accessed, correlated, and/or a question answered. Accordingly, without the key it becomes more difficult to build correlations between the information in one table with that of another. In certain instances, a table may be a hash table and a hash function may be employed in search the table for correlations with other data structures.

As indicated, a further architecture that may be used to structure a database is a data tree, e.g., a suffix or prefix tree, where various data elements may be stored in a compressed, but in correlated fashion, where the various roots and branches form divergent data points with respect to potential correlations. In other instances, a graph-based architecture may be structured and used to determine the results for one or more queries. Particularly, a knowledge graph architecture may be employed to structure the media repository, so as to enhance the performance of computational analyses executed using that database. Such analyses may be employed so as to determine whether a given online user's present activities comports with their past use and/or comports with how other users in general have or are presently interacting online, such as with respect to the various communications campaigns being implemented by the company users of the system. Accordingly, the sophisticated algorithms employed herein, are adapted for structuring the infrastructure of a relational database so as to enable more efficient and accurate searching, such as for identifying and evaluating and scoring successful online content, which content can then be collected, graphed, and predictions may be derived therefrom, such as via performing graph based analyses, as well as for performing table or tree based analyses.

Consequently, in one aspect, a device, system, and method of using the same to build a searchable, relational data structure, such as described herein, is provided. Particularly, in one instance, the devices, systems, and methods disclosed herein may be employed so as to generate and/or otherwise collect data, such as data pertaining to various online users and how they respond to various communications, e.g., advertisements, they receive from other online users, such as companies, over a variety of platforms, such as social media platforms. This data may then be used in developing communication content that may more effectively reach a company's target demographic in a more meaningful manner.

Accordingly, in one embodiment, methods for building and structuring a searchable database are provided. For instance, in a first step, data, e.g., online content, may be identified, scored, collected, scored again, cleaned, edited, and then be prepared for analysis. In various embodiments, the data may be labeled and/or categorized, and may then be structured into a searchable data architecture, such as a knowledge graph, table, or tree-like structure. And once the database is structured, it may then be populated with data, e.g., generated content, in accordance with the determined or inferred relationships. Such relationships may be notional, fact, or effect based.

More particularly, in certain instances, a machine learning protocol, as disclosed herein, may be employed so as to determine relationships between data points, e.g., related to communication content as well as those who liked and did not like the content, which may be entered into the database. Such relationships may be determined based on known facts, and as such the learning may be supervised learning, e.g., such as where known factors may be used to label, categorize, and store data, such as location, interaction, social engagement, sentiment, relationship, and/or usage, sales, and other related data. In other instances, the learning may be inferred, such as in an unsupervised learning.

For instance, in certain instances, the data to be stored may not be known, relationships between the data may not have been pre-determined, and the query to be answered may also not have been otherwise identified. In such instances, the data to be stored is unsupervised, and as such, patterns in data to be stored and their relationships, such as commonalities between data points, may be determined notionally, and once determined such patterns may then be used in forming the architecture that structures the searchable data architecture. For example, where a user's interactions with the system, e.g., posting a review or sentiment about a communication, breaks a pattern, the system may explore relational characteristics of the consumer and/or his or her online use so as to determine what pattern was broken and/or to correct for its effects, or to simply determine a new pattern of behavior is emerging, in which instance, a deeper exploration may not be warranted.

Particularly, a known sequence of patterns may be used to infer that if events A and B in a known sequence may be followed by event C such that if event C does not happen as predicted, a flag is set off for initiating a deeper exploration of the nature of the causes of the flagged event. However, where upon a first round of exploration, it is discovered a new pattern of behavior is being established, the flag may be removed and a deeper exploration as to the causes of the new pattern formation can be but need not be explored.

At the heart of the platform, therefore, may be a generated data structure, e.g., a graph-based database architecture. The data structure to be generated may be constructed on the fly by the APIs and/or skimmers of the system retrieving data points from a plurality of sources, and populating those data points into a suitable data structure from which relationships and/or correlations between the data points may be made. This is particularly useful when determining consumer response individually or en masse to an advertising campaign of one or more companies.

First, when populating the data structure known facts may be populated, then known relationships may be determined, and from these known facts and known relationships, otherwise unknown facts and/or relationships may then be determined. Such data points may include any user pertinent information, such as: user entered information, user determined information, such as with respect to how the user interacts with the internet, in particular, or how they interact with online companies generally, information derived from the user's social media, user posted information, such as texts they send, commentary they post, photos they upload, comments they respond to about the company, web-pages they visit and for how long, likes they make, up or down votes they make, purchases they make, video's or blogs they view, searches they perform, who they follow or are friends with on social media, and the like. Additionally, user location data may be determined and used to determine how close or far the user is from a given company running an advertising campaign the consumer is interested in, viewing, or otherwise engaging with. The user may be tracked by their online ID, name, handle, avatar, phone number, computer ID, user ID, their cellular ID, RFID, GPS, Cellular tower triangulation, their Internet Protocol ID, etc. In various embodiments, the system may track the user's online interactions, travel, locations visited, whether engaging with a company and/or its competitors, and the like.

Further, friends, associates, and acquaintances of the user may be identified and their online use of the internet may be determined and tracked, such as with respect to one or more companies of the system, and this information may be used as data points in determining one or more consumer's pattern of usage, trends, and sources of possible correlations, relationships, preferences, and the like towards one or more companies of the system may be determined and/or predictions therefrom may be made. Such persons may be identified directly by the user, by the user's online interaction with them, via the application or social media, via tagging, and/or via facial recognition based on being in a posted image in association of the user. In such a manner as this, a consumer's internet presence and/or social network may be leveraged and used as data points in the construction of a data structure, such as a knowledge graph, from which correlations and relationships may be determined, for instance, between various users of the system, and/or third parties, for example, by determining how these various entities interact with one another, with respect to one or more companies of the system and/or their communications. The type, quality, and/or quantity of these relationships may then be determined by the system, likes and dislikes (and/or other metrics) may be evaluated in terms of a company's products and messaging content, and the results may be employed so as to determine a predicted outcome, such as in response to a given query, such as for determining the potential effect an advertisement will have on a consumer's decision to purchase an advertised product or service.

Once the data structure is built, and the known and inferred facts and relationships determined and/or weighted, the data structure may then be queried, such as with respect to identifying content that is useful for building one or more communications of one or more companies of the system. Specifically, the system may be directed, such as by a system administrator or communications director, as to what the query is or should be, such as from a list of known query types, so as to perform a supervised search query, or the system itself may generate a query automatically when it identifies certain patterns that are worthy of greater explanation, and as such an unsupervised query may also be instigated.

More specifically, the various data points entered into the data structure may be labeled and categorized, e.g., based on known patterns, identified metrics and/or parameters, one or more filters, and a given search query may be performed with respect to the identified labels and categories, which have previously been determined to be important to the performance of one or more objectives of a user of the system. This is useful when the system has been primed in such a manner that it knows what it is looking for. In other instances, the predictive A/I module may itself identify patterns, commonalities, and/or other elements that form a relationship from which one or more labels and/or categories may be generated automatically by the system itself, and a query can be performed based on system generated prompting with respect to these unsupervised factors. This is useful when it is not necessarily known what is being looked for.

In particular, in various instances, the machine-learning module, as described herein, may be adapted to recognize how an output was achieved based on the type and characteristics of the inputs received. Specifically, in various instances, the present system may be configured to learn from the inputs it receives, the relationships it determines, and the results it outputs, so as to learn to draw correlations more rapidly and accurately based on the initial input of data received and/or the types, quality, and quantitates of the relationships it is able to correlate. Likewise, once the AI machine learns the behavior, e.g., of one or more users of the system, or one or more third parties with respect thereto, the learned behavior may then be applied to a second type of data, such as an inference engine, that is used to infer other various relationships and/or to predict the answer to one or more unknown variables, or heretofore unknown relationships.

There are several different types of relationships that can be determined. For instance, relationships may be determined based on what is known, e.g., they are fact based, and/or they may be determined based on the known effects of those facts, e.g., they are effect based, e.g., logic based; or they may be determined based on inferences, e.g., relationships that are unknown but determinable. Specifically, a relationship between two subjects, locations, interactions, and/or other relevant conditions of one or more users of the system, or third parties with respect thereto, may be inferred based on various common facts and/or effects observed between them. As described in great detail herein above, these previously unknown but inferred facts and/or relationships may be determined and/or used in predictive models by generating a data structure as disclosed herein.

Other known, e.g., fact, effect based, or inferred data points may also be generated, or otherwise entered into the system, and may be used to generate one or more nodes, e.g. a constellation of nodes, which may then be used in the determination and/or weighting of relationships. Particularly, the various data points of a data structure may be characterized in a plurality of different manners, such as with respect to being a subject, a predicate, and an object. More particularly, each node and the relationship between the various nodes will have properties by which they can be placed into one of these three categories based on a given query to be answered.

Hence, as the nodes are populated, they are also populated with one or more characteristic properties that more fully define and/or classify that node. Known facts, as well as their known properties, are first employed by the machine learning module (ML) to determine known outcomes, during which process the ML module thereby learns the patterns of behavior between the nodes and their relationships to one another, such as in a training process. This training may take place over a wide range of sample sets, until an acceptable accuracy has been established.

Once appropriately trained, e.g., via a deep learning protocol, then the ML module, may be given data points from which unknown relationships need to be determined, and unknown outcomes predicted. Specifically, once the ML module has learned the expected patterns of relationships, e.g., behaviors, with respect to known data points and relationships, it may then develop "inferred" rules by which it may classify and label new or unknown data points so as to determine and account for otherwise unknown relationships, so as to thereby classify and label and/or otherwise define the heretofore unknown data points, their properties, and relationships, which may then be classified and labeled. In such an instance, when the expected results are achieved, such as with respect to the user engagement with the system, the system status quo may be maintained, but when these new data points evoke a breakdown in patterns of relationships and/or expected outcomes, e.g., a user acts in an unexpected way or an unexpected result occurs, then a system alert may be triggered and a deeper exploration may be initiated.

Additionally, once the knowledge graph architecture has been constructed, the AI module may employ that knowledge graph to answer one or more queries of the system, and/or to make one or more predictions with respect thereto. For instance, the AI module may configure the data structure, and implement one or more functions with respect thereto, such as via one or more known or previously unknown facts, e.g., via the machine learning protocols disclosed herein, and thereby predict various consequences with respect thereto. Further, once the data structure is generated, e.g., by a suitably configured API or skimmer, it can continually be updated and grown by adding more and more pertinent data into the knowledge structure, such as data received from any relevant source of information provider pertaining to the subject(s) under examination, and building more and more potential nodes and/or relationships. In such an instance, the user may access the A/I prediction module, e.g., via a suitably configured user interface, upload pertinent information into the system and/or determine the relevant nodes by which to answer an inquiry, e.g., such as is there bias with respect to how a given user is engaging with the system and/or does their behavior with respect thereto fit within an established and/or otherwise expected pattern of behavior.

The ML and inference engines, e.g., predictive modules, of the system have many potential uses. In certain embodiments, the system may be configured for collecting online content that can be evaluated and stored within the system and used to generate a communication that may then be distributed to one or more target recipients. As such, the system may be configured for providing a platform by which a business influencer or other user of the system, e.g., communication recipient, or a national sales brand, service provider, manufacturer, and/or the like, may be enabled to more closely monitor and more effectively engage in promoting its products, services and offerings through a multitiered nationwide communications campaign that can be controlled from a single user interface, such as at their desktop or mobile computing device.

Specifically, in one embodiment, a downloadable application is provided, which downloadable application provides a graphical user interface (GUI) through which interface the user may more intimately involve themselves in producing an online advertising or other communications campaign. More specifically, the GUI may be configured to present a dashboard to the display of the computing device, through which display the user may be enabled to interact in the event environment in a more meaningful way. For instance, in one instance, the dashboard may present a display of the communication elements that can be crafted, real-time, into a communication that can immediately be sent out to any number of target recipients.

The real-time generation and display of the communications contents may be for already crafted and approved communications, or may be generated on the fly using approved communication elements, which once generated can be distribute easily, such as by the touch of a button. Such media content may be collected and transmitted to a server of the system, from one or more of various sources, the content may be cleaned, edited, and inserted into a template from which an advertisement may be generated and broadcast, streamed, downloaded, or otherwise provided back to the various targeted consumers for substantially real-time for their viewing. In various instances, the user may select from which content source they wish to view acceptable content for a communication, such as by toggling back and forth between viewing options on a display, such as via the downloadable application or "app."

The dashboard may also provide a platform through which users may message other users of the system, such as through substantially instant messaging, SMS, text messaging, i-messaging, sending of sounds, photos, videos, and/or may allow for the user to instantly send messages, texts, sounds, videos, etc. to one or more, e.g., all of their social media platforms, such as review and approval of the generated communication and/or posting thereof. Such messaging may be sent system wide or to one or more subgroups of the system, such as where the user has selected and formed a sub-group of system users with whom to share messaging and/or media content back and forth with each other. Likewise, the dashboard may allow users to interact with or otherwise respond to the messaging of others using the system, such as through likes or dislikes, up or down voting, or otherwise replying to messages posted across the system.

For instance, as described above, the machine-learning module may be employed so as to generate a profile of a company and/or a follower or consumer or potential consumer of the company, such as a defined communication recipient. The profile may be a list of properties, qualities, characteristics, and/or metrics that describe the company, their products or services, and/or their engagement with online media and/or the system. As such, the profile may be generated by a plurality of different methods, such as by providing an interview to the user and saving their responses, further characteristics may be determined based on their engagement with the system, specifically, or social media generally, such as by what they post, how and when they comment, the images they upload, and/or the activities surrounding the images they post, and the like.

Further characteristics may be determined based on how the user uses the system particularly, or the internet generally, such as by what searches they perform, who they follow, what pages they visit, the time spent on such pages, purchases they make and the like. Additional characteristics may be defined by where the user is located, the places they visit, such as on a routine basis, and/or the places they or their friends have visited. All of this data may then be collected for the consumers and potential consumers of a company and a knowledge graph may be generated with respect thereto so as to compare the company with its consumers and potential consumer. In various instances, once these characteristics have been determined, the AI module may determine various correlations between these characteristics, such as between the things or products the company and its consumers likes, the location where the company and the consumer is located, so as to generate a real-time advertisement that is generated in a manner to be specifically pertinent to the user, while at the same time generating interest in the event sponsors.

In particular instances, to facilitate one or more of the implementations disclosed herein, a software and/or hardware application may be present and executed by one or more of the system controlling and/or analyses devices and may provide a user interface that can display information from or about a communication to generated and/or an audience to be targeted and/or an objective to be achieved. The interface may further provide input portions that permit the user to enter information and/or commands. For example, to provide for interaction with a user, the subject matter described herein can be implemented on a computer having a display device, such as for example a cathode ray tube (CRT), or a liquid crystal display (LCD), or light emitting diode (LED) or (OLED) monitor for displaying information to the user and a keyboard and a pointing device, such as for example a mouse or a trackball, by which the user may provide input to the computer. In various instances, the display screen may be a capacitive sensing interactive touch-screen display. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), WiFi, and the Internet.

The computing system may include clients and servers. A client and server are generally remote from each other and typically interact through a communication network. The relationship of client and server arises by virtue of computer programs running on the respective computers and having a client-server relationship to each other. In various instances, the methods herein disclosed may be preformed in software and/or hardware implementations. For instance, a software application may be provided in the form of a "mobile app" for use on or execution by a mobile smartphone or dedicated device or processor thereof, or may be in the form of a software application for execution in a conventional personal computer (e.g., desktop or laptop or tablet) or enterprise computer system.

An exemplary software application may present a user with a one or more menus or screens configured at least for permitting viewing and/or selection of user preferences or settings, for viewing data received from or related to one or more treatment modalities and/or system component configurations and for controlling said functions and/or determining the positioning of the various components of the system. In addition to such control and presentation of wireless (or wired) communications, communication features may include transmission of commands and settings, receipt of sensor data, feedback data, and/or historical use data, alarm/warning notifications (e.g., at loss or attainment of proximity), etc., all of which may be collected by the system, be stored within a database, and be retrieved and analyzed by the system to suggest future use protocols.

Hence, in various instances, implementations of various aspects of the disclosure may include, but are not limited to: apparatuses, systems, and methods including one or more features as described in detail herein, as well as articles that comprise a tangibly embodied machine-readable medium operable to cause one or more machines (e.g., computers, etc.) to result in operations described herein. Similarly, computer systems are also described that may include one or more processors and/or one or more memories coupled to the one or more processors. Accordingly, computer implemented methods consistent with one or more implementations of the current subject matter can be implemented by one or more data processors residing in a single computing system or multiple computing systems containing multiple computers, such as in a computing or supercomputing bank.

Such multiple computing systems can be connected and can exchange data and/or commands or other instructions or the like via one or more connections, including but not limited to a connection over a network (e.g. the Internet, a wireless wide area network, a local area network, a wide area network, a wired network, a physical electrical inter-connect, or the like), via a direct connection between one or more of the multiple computing systems, etc. A memory, which can include a computer-readable storage medium, may include, encode, store, or the like one or more programs that cause one or more processors to perform one or more of the operations associated with one or more of the algorithms described herein.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. Other implementations may be within the scope of the following claims.

The methods illustratively described herein may suitably be practiced in the absence of any element or elements, limitation or limitations, not specifically disclosed herein. Thus, for example, the terms "comprising", "including," containing", etc. shall be read expansively and without limitation. Additionally, the terms and expressions employed herein have been used as terms of description and not of limitation, and there is no intention in the use of such terms and expressions of excluding any equivalents of the features shown and described or portions thereof. It is recognized that various modifications are possible within the scope of the invention claimed. Thus, it should be understood that although the present disclosed embodiments have been specifically disclosed by representative configurations and optional features, modification and variation of the embodiments herein disclosed may be resorted to by those skilled in the art, and that such modifications and variations are considered to be within the scope of this disclosure.

Any of the features or attributes of the above the above described embodiments and variations can be used in combination with any of the other features and attributes of the above described embodiments and variations as desired. From the foregoing disclosure and detailed description of certain disclosed embodiments, it is also apparent that various modifications, additions and other alternative embodiments are possible without departing from the true scope and spirit.

The embodiments discussed were chosen and described to provide the best illustration of the principles of the present invention and its practical application to thereby enable one of ordinary skill in the art to utilize the invention in various embodiments and with various modifications as are suited to the particular use contemplated.

All such modifications and variations are within the scope of the present invention as determined by the appended claims when interpreted in accordance with the benefit to which they are fairly, legally, and equitably entitled.

Specific embodiments have been described broadly and generically herein. Each of the narrower species and sub-generic groupings falling within the generic disclosure also form part of the methods. This includes the generic descrip-tion of the methods with a proviso or negative limitation removing any subject matter from the genus, regardless of whether or not the excised material is specifically recited herein.

Other embodiments are within the following claims. In addition, where features or aspects of the methods are described in terms of Markush groups, those skilled in the art will recognize that the invention is also thereby described in terms of any individual member or subgroup of members of the Markush group.

What is claimed is:

1. A communication system for generating an online communication for transmission to one or more target recipients of a social media platform over a network based on target identifiable characteristics of the target recipient, the system comprising:

a communications repository storing a plurality of communication assets and a plurality of communication templates, the communication assets being stored based on a number of product or service identifiable characteristics of a product or service being offered for sale via the communication assets; and a communications server having a network connection to communicate with a target recipient via a client computing device having a graphical user interface for displaying online communications, the communications server being coupled to the communications repository via the network connection and having at least one set of processing engines for generating an autonomous communication builder, the autonomous communication builder for autonomously executing a plurality of instructions that when executed by the set of processing engines performs a set of operations, the set of processing engines comprising:

an evaluation engine, the evaluation engine being configured for receiving one or more target identifiable characteristics of the target recipient, the evaluation engine being composed of a subset of processors for implementing a subset of the plurality of instructions of the communications builder directed to performing an evaluation operation, the evaluation engine further being configured for accessing the communications repository and evaluating the plurality of communication assets or the plurality of communication templates, the evaluating comprising comparing the received target identifiable characteristics of the target recipient to one or more product or service identifiable characteristics of the multimedia communication assets or communication templates;

a communication generation engine being configured for selecting a communication asset and a communication template, the selecting of the communication asset being based on a correspondence between the target identifiable characteristics of the target recipient and the product or service identifiable characteristics of the multimedia communication asset, the communication generation engine further being configured for coupling the the selected communication asset and the communication template, so as to produce an autonomously generated communication;

a formatting engine, the formatting engine being configured for formatting the autonomously generated communication;

a scheduling engine, the scheduling engine being configured for evaluating one or more social media platforms being used by the target recipient, to determine a high traffic time associated with the target recipient for the transmission of the autonomously generated communication so as to produce a scheduled time for transmission; and a distribution engine, the distribution engine being configured for transmitting the autonomously generated communication over the network via the social media platform at the scheduled time.

2. The communication system in accordance with claim 1, wherein the selecting, by the communications builder portion of the plurality of instructions, of the communication asset and the communication template is further based upon one or more target identifiable engagement parameters.

3. The communication system in accordance with claim 2, wherein the plurality of communication assets are ranked based on a number of the identifiable engagement parameters.

4. The communication system in accordance with claim 3, wherein the set of operations further comprises autonomously searching, by a content collector portion of the plurality of instructions, one or more social media platforms and collecting data pertaining to one or more of a multimedia communication assets and the target recipient, and further transmitting the data to one or more databases associated with the communication server and the communication repository.

5. The communication system in accordance with claim 4, wherein the set of operations further comprises retrieving, by an artificial intelligence (A/I) module portion of the plurality of instructions, the data pertaining to the one or more multimedia communication assets and the target recipient, evaluating the data, and generating the one or more target identifiable engagement parameters for use in ranking the multimedia communication assets with respect to the target identifiable characteristics of the target recipient.

6. The communication system in accordance with claim 5, wherein the set of operations further comprises autonomously performing, by a conflict checking engine portion of the plurality of instructions, a conflict check on the autonomously generated communication to be transmitted so as to determine whether there is a potential or actual conflict that may arise should the autonomously generated communication be transmitted, the conflict being associated with content of the autonomously generated communication.

7. A communication apparatus for autonomously generating an online communication for transmission to one or more target communication recipients of a social media platform over a network based on target recipient characterization parameters characterizing the target communication recipient, the communication apparatus comprising:

a communications server having a network connection to communicate with a target communication recipient via a client computing device having a graphical user interface, the communications server comprising a set of processing engines, each of the processing engines being configured for implementing instructions that when executed implement functional components, the set of processing engines comprising:

an evaluation engine for receiving and evaluating information about one or more characteristics of the target communication recipient to produce one or more target recipient characterization parameters, and the evaluation engine further being configured for autonomously accessing a communications repository, and evaluating a plurality of communication content elements based on at least one of the one or more target recipient characterization parameters so as to generate an ordered set of communication content elements;

a communications generation engine for autonomously accessing the communication repository and matching the one or more target recipient characterization parameters of the target communication recipient with at least one of the communication content elements to produce a selected communication content element, the matching being based on a correspondence between the communication content element and the one or more target recipient characterization parameters characterizing the target communication recipient, the communications generation engine further being configured for selecting a communication content template from the communication repository to produce a selected communication content template, and for autonomously coupling the selected communication content element with the selected communication content template to produce an autonomously generated communication;

a formatting engine for formatting the autonomously generated communication;

a scheduling engine for evaluating a social media platform being used by the target communication recipient, and based on at least one of the one or more target recipient characterization parameters, determining a high traffic time associated with the target communication recipient for the transmission of the autonomously generated communication so as to produce a scheduled time for transmission during the determined high traffic time; and a distribution engine, associated with the scheduler, for performing the autonomous and targeted transmission of the autonomously generated communication over the network via the social media platform to the target communication recipient at the scheduled high traffic time.

8. The communication apparatus in accordance with claim 7, wherein the communications server further comprises a content collector, the content collector being configured for searching one or more social media platforms and collecting data pertaining to the one or more characteristics of the target communication recipient to produce target recipient characterization data, and further being configured for transmitting that target recipient characterization data to one or more databases associated with the communications server.

9. The communication apparatus in accordance with claim 8, wherein the content collector is further configured for searching the social media platform and collecting consumer sentiment data pertaining to one or more sentiments expressed by one or more consumers evaluating one or more of the communication content elements, wherein the ranking of the selection of the plurality of communication content elements is further based on the consumer sentiment data.

10. The communication apparatus in accordance with claim 9, wherein the server further comprises an artificial intelligence (AI) engine, the AI engine being configured for receiving the target recipient characterization data, evaluating the target recipient characterization data to produce target recipient evaluation result data, and for using the target recipient evaluation result data to generate one or more target identifiable engagement parameters, the one or more target identifiable engagement parameters for further characterizing a target communication recipient with regard to their engagement with one or more online communication content elements.

11. The communication apparatus in accordance with claim 10, wherein the communication content elements are further ranked based on the one or more target identifiable engagement parameters.

12. The communication apparatus in accordance with claim 11, wherein the AI engine is further configured for receiving the consumer sentiment data characterizing the communication content element, evaluating the consumer sentiment data to produce communication content element evaluation result data, and for using the communication content element evaluation result data to further rank the communication content elements.

13. The communication apparatus in accordance with claim 12, wherein the communications server further includes a conflict checker, the conflict checker configured for performing a conflict check on the autonomously generated communication to be transmitted so as to determine whether there is a potential or actual conflict that may arise should the selected prefabricated communication be transmitted.

14. A computer implemented method for autonomously generating an online communication for transmission to a communication target recipient via a social media platform, the autonomous computer implemented method comprising:

retrieving, by at least one content collection module of a computing device executing a content collector protocol, web-based review content so as to form a web content collection, the web content collection comprising:

review content previously posted online, and characteristic data associated with the communication target recipient, the characteristic data including a plurality of communication target recipient engagements;

evaluating, by at least one evaluation module of the computing device executing an evaluation protocol, the review content of the web content collection, the review content having one or more evaluative characteristics, the evaluating being based on a correspondence between the plurality of communication target recipient engagements and the one or more evaluative characteristics of the review content so as to produce a set of ordered, characterized review content items based on the correspondence;

retrieving for transmission to the communication target recipient, by at least one distribution module of the computing device, from a communications repository storing the ordered, characterized review content items and one or more communication templates, a characterized review content item and a communication template to produce a selected review content item and a selected communication template;

coupling, by at least one communications building module of the computing device, the selected review content item and the selected communication template, so as to produce an autonomously generated communication;

formatting, by at least one data formatting module of the computing device, the autonomously generated communication in a transmission format based on the plurality of communication target recipient engagements;

scheduling, by at least one scheduling module of the computing device, the autonomously generated communication for transmission to the communication target recipient via a social media platform, the scheduling being based on a determined high traffic time for the communication target recipient of the social media platform; and transmitting, by at least one distribution module of the computing device, the autonomously generated communication over a network interface via the social media platform to the target user at the scheduled time.

15. The method in accordance with claim 14, comprising further ranking, by at least one data processor of the computing device, the characterized communication content with regard to a number of target identifiable engagement parameters characterizing the communication target recipient.

16. The method in accordance with claim 15, further comprising performing a conflict check, by at least one data processor of the computing device, on the autonomously generated communication to be transmitted so as to determine whether there is a potential or actual conflict that may arise should the autonomously generated communication be transmitted, the conflict being associated with content of the prefabricated communication.

17. The method in accordance with claim 16, wherein the method further comprises, receiving, by one or more data processors of the computing device, data pertaining to an online consumer sentiment characterization of each of a set of communication content being evaluated by the evaluation protocol, evaluating the online consumer sentiment data to produce online consumer sentiment characterization result data, and using the online consumer sentiment characterization result data to further rank the set of communication content so as to generate the ranked order.

* * * * *